United States Patent
Rozbicki et al.

(10) Patent No.: US 11,950,340 B2
(45) Date of Patent: Apr. 2, 2024

(54) ADJUSTING INTERIOR LIGHTING BASED ON DYNAMIC GLASS TINTING

(71) Applicant: View, Inc., Milpitas, CA (US)

(72) Inventors: Robert T. Rozbicki, Los Gatos, CA (US); Erich R. Klawuhn, Los Altos, CA (US); Brandon Tinianov, Santa Clara, CA (US); Nitesh Trikha, Pleasanton, CA (US); John Gordon Halbert Mathew, Santa Rosa, CA (US)

(73) Assignee: View, Inc., Milpitas, CA (US)

( * ) Notice: Subject to any disclaimer, the term of this patent is extended or adjusted under 35 U.S.C. 154(b) by 120 days.

(21) Appl. No.: 16/487,802

(22) PCT Filed: Feb. 26, 2018

(86) PCT No.: PCT/US2018/019737
§ 371 (c)(1),
(2) Date: Aug. 21, 2019

(87) PCT Pub. No.: WO2018/157063
PCT Pub. Date: Aug. 30, 2018

(65) Prior Publication Data
US 2020/0260556 A1    Aug. 13, 2020

Related U.S. Application Data

(63) Continuation-in-part of application No. PCT/US2016/055005, filed on Sep. 30, 2016, which
(Continued)

(51) Int. Cl.
*H05B 47/11* (2020.01)
*F21V 23/04* (2006.01)
(Continued)

(52) U.S. Cl.
CPC .......... *H05B 47/11* (2020.01); *F21V 23/0464* (2013.01); *G02F 1/1523* (2013.01);
(Continued)

(58) Field of Classification Search
CPC ....... H05B 47/11; F21V 23/0464; G02F 1/15; G02F 1/157; G02F 1/163; G02F 1/1523
See application file for complete search history.

(56) References Cited

U.S. PATENT DOCUMENTS 3,963,347 A    6/1976    Segre et al.
4,355,896 A    10/1982   Frosch et al.
(Continued)

FOREIGN PATENT DOCUMENTS

CN    1333807 A    1/2002
CN    1359479 A    7/2002
(Continued)

OTHER PUBLICATIONS

Matthew J. Reno, et al., Global Horizontal Irradiance Clear Sky Models: Implementation and Analysis, Mar. 2012, Sandia Report, SAND2012-2389, pp. 1-67. (Year: 2012).*
(Continued)

*Primary Examiner* — Alexander H Taningco
*Assistant Examiner* — Pedro C Fernandez
(74) *Attorney, Agent, or Firm* — Weaver Austin Villeneuve & Sampson LLP; Brian D. Griedel

(57) ABSTRACT

A method of automatically controlling color of light in a room having one or more tintable windows, the method comprising determining adjustments in artificial interior lighting in the room to obtain a desired color of light and sending control signals over a communication network to adjust the artificial interior lighting, wherein the adjustments are determined based on a current tint state of each of the one or more tintable windows.

25 Claims, 32 Drawing Sheets

Related U.S. Application Data is a continuation-in-part of application No. 14/137,644, filed on Dec. 20, 2013, now Pat. No. 9,341,912, which is a continuation-in-part of application No. PCT/US2013/069913, filed on Nov. 13, 2013, and a continuation-in-part of application No. PCT/US2013/031098, filed on Mar. 13, 2013.

(60) Provisional application No. 62/464,299, filed on Feb. 27, 2017, provisional application No. 62/236,032, filed on Oct. 1, 2015, provisional application No. 61/740,651, filed on Dec. 21, 2012, provisional application No. 61/725,980, filed on Nov. 13, 2012, provisional application No. 61/610,241, filed on Mar. 13, 2012.

(51) Int. Cl.
| | | |
|---|---|---|
| *G02F 1/1523* | (2019.01) | |
| *G02F 1/157* | (2006.01) | |
| *G02F 1/163* | (2006.01) | |
| *H05B 45/22* | (2020.01) | |
| *H05B 47/115* | (2020.01) | |
| *F21Y 113/17* | (2016.01) | |
| *F21Y 115/10* | (2016.01) | |

(52) U.S. Cl.
CPC ............. *G02F 1/157* (2013.01); *G02F 1/163* (2013.01); *H05B 45/22* (2020.01); *H05B 47/115* (2020.01); *F21Y 2113/17* (2016.08); *F21Y 2115/10* (2016.08)

(56) References Cited

U.S. PATENT DOCUMENTS

| | | |
|---|---|---|
| 5,124,833 A | 6/1992 | Barton et al. |
| 5,170,108 A | 12/1992 | Peterson et al. |
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,379,215 A | 1/1995 | Kruhoeffer et al. |
| 5,384,578 A | 1/1995 | Lynam et al. |
| 5,402,144 A | 3/1995 | Ripoche |
| 5,451,822 A | 9/1995 | Bechtel et al. |
| 5,583,972 A | 12/1996 | Miller |
| 5,598,000 A | 1/1997 | Popat |
| 5,621,526 A | 4/1997 | Kuze |
| 5,663,621 A | 9/1997 | Popat |
| 5,673,028 A | 9/1997 | Levy |
| 5,694,144 A | 12/1997 | Lefrou et al. |
| 5,760,558 A | 6/1998 | Popat |
| 5,764,402 A | 6/1998 | Thomas et al. |
| 5,822,107 A | 10/1998 | Lefrou et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen et al. |
| 6,002,511 A | 12/1999 | Varaprasad et al. |
| 6,039,390 A | 3/2000 | Agrawal et al. |
| 6,039,850 A | 3/2000 | Schulz et al. |
| 6,055,089 A | 4/2000 | Schulz et al. |
| 6,064,949 A | 5/2000 | Werner et al. |
| 6,084,231 A | 7/2000 | Popat |
| 6,084,700 A | 7/2000 | Knapp et al. |
| 6,125,327 A | 9/2000 | Kalenian |
| 6,130,448 A | 10/2000 | Bauer et al. |
| 6,130,772 A | 10/2000 | Cava |
| 6,163,756 A | 12/2000 | Baron et al. |
| 6,222,177 B1 | 4/2001 | Bechtel et al. |
| 6,262,831 B1 | 7/2001 | Bauer et al. |
| 6,266,063 B1 | 7/2001 | Baron et al. |
| 6,386,713 B1 | 5/2002 | Turnbull et al. |
| 6,398,118 B1 | 6/2002 | Rosen |
| 6,407,468 B1 | 6/2002 | LeVesque et al. |
| 6,407,847 B1 | 6/2002 | Poll et al. |
| 6,449,082 B1 | 9/2002 | Agrawal et al. |
| 6,471,360 B2 | 10/2002 | Rukavina et al. |
| 6,493,128 B1 | 12/2002 | Agrawal et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,819,367 B1 | 11/2004 | Cava |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 6,965,813 B2 | 11/2005 | Granqvist et al. |
| 7,085,609 B2 | 8/2006 | Bechtel et al. |
| 7,111,952 B2 | 9/2006 | Veskovic |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,588,067 B2 | 9/2009 | Veskovic |
| 7,610,910 B2 | 11/2009 | Ahmed |
| 7,800,812 B2 | 9/2010 | Moskowitz |
| 7,817,326 B1 | 10/2010 | Rennig et al. |
| 7,822,490 B2 | 10/2010 | Bechtel et al. |
| 7,873,490 B2 | 1/2011 | MacDonald |
| 7,941,245 B1 | 5/2011 | Popat |
| 7,950,827 B2 | 5/2011 | Veskovic |
| 7,963,675 B2 | 6/2011 | Veskovic |
| 7,972,021 B2 | 7/2011 | Scherer |
| 7,977,904 B2 | 7/2011 | Berman et al. |
| 7,990,603 B2 | 8/2011 | Ash et al. |
| 8,004,739 B2 | 8/2011 | Letocart |
| 8,018,644 B2 | 9/2011 | Gustaysson et al. |
| 8,102,586 B2 | 1/2012 | Albahri |
| 8,120,292 B2 | 2/2012 | Berman et al. |
| 8,125,172 B2 | 2/2012 | Berman et al. |
| 8,164,818 B2 | 4/2012 | Collins et al. |
| 8,213,074 B1 | 7/2012 | Shrivastava et al. |
| 8,248,014 B2 | 8/2012 | Berman et al. |
| 8,254,013 B2 | 8/2012 | Mehtani et al. |
| 8,270,059 B2 | 9/2012 | Friedman et al. |
| 8,288,981 B2 | 10/2012 | Zaharchuk et al. |
| 8,292,228 B2 | 10/2012 | Mitchell et al. |
| 8,300,298 B2 | 10/2012 | Wang et al. |
| 8,380,393 B1 | 2/2013 | Ohtomo |
| 8,432,603 B2 | 4/2013 | Wang et al. |
| 8,456,729 B2 | 6/2013 | Brown et al. |
| 8,547,624 B2 | 10/2013 | Ash et al. |
| 8,582,193 B2 | 11/2013 | Wang et al. |
| 8,705,162 B2 | 4/2014 | Brown et al. |
| 8,723,467 B2 | 5/2014 | Berman et al. |
| 8,764,950 B2 | 7/2014 | Wang et al. |
| 8,764,951 B2 | 7/2014 | Wang et al. |
| 8,836,263 B2 | 9/2014 | Berman et al. |
| 8,864,321 B2 | 10/2014 | Mehtani et al. |
| 8,902,486 B1 | 12/2014 | Chandrasekhar |
| 8,934,170 B2 | 1/2015 | Takeda et al. |
| 8,976,440 B2 | 3/2015 | Berland et al. |
| 9,016,630 B2 | 4/2015 | Mitchell et al. |
| 9,030,725 B2 | 5/2015 | Pradhan et al. |
| 9,078,299 B2 | 7/2015 | Ashdown |
| 9,081,246 B2 | 7/2015 | Rozbicki |
| 9,081,247 B1 | 7/2015 | Pradhan et al. |
| 9,128,346 B2 | 9/2015 | Shrivastava et al. |
| 9,226,366 B2 | 12/2015 | Orillard et al. |
| 9,261,751 B2 | 2/2016 | Pradhan et al. |
| 9,298,203 B2 | 3/2016 | Wenzel |
| 9,341,912 B2 | 5/2016 | Shrivastava et al. |
| 9,348,192 B2 | 5/2016 | Brown et al. |
| 9,404,793 B2 | 8/2016 | Yang et al. |

(56) References Cited

U.S. PATENT DOCUMENTS

| | | |
|---|---|---|
| 9,406,028 B2 | 8/2016 | Humann |
| 9,423,664 B2 | 8/2016 | Brown et al. |
| 9,454,055 B2 | 9/2016 | Brown et al. |
| 9,523,902 B2 | 12/2016 | Parker |
| 9,546,515 B2 | 1/2017 | Hall et al. |
| 9,574,934 B2 | 2/2017 | Verbeek et al. |
| 9,638,978 B2 | 5/2017 | Brown et al. |
| 9,645,465 B2 | 5/2017 | Brown et al. |
| 9,664,974 B2 | 5/2017 | Kozlowski et al. |
| 9,668,315 B2 | 5/2017 | Shearer et al. |
| 9,674,924 B2 | 6/2017 | Lashina et al. |
| 9,709,869 B2 | 7/2017 | Baumann et al. |
| 9,807,857 B2 | 10/2017 | Huang |
| 9,927,674 B2 | 3/2018 | Brown et al. |
| 9,938,765 B2 | 4/2018 | Berman et al. |
| 10,048,561 B2 | 8/2018 | Brown et al. |
| 10,234,596 B2 | 3/2019 | Frank et al. |
| 10,254,618 B2 | 4/2019 | Parker et al. |
| 10,316,581 B1 | 6/2019 | Nagel et al. |
| 10,495,939 B2 | 12/2019 | Brown et al. |
| 10,520,784 B2 | 12/2019 | Brown et al. |
| 10,539,854 B2 | 1/2020 | Brown et al. |
| 10,605,970 B2 | 3/2020 | Blair et al. |
| 10,690,540 B2 | 6/2020 | Brown et al. |
| 10,712,627 B2 | 7/2020 | Brown et al. |
| 10,802,372 B2 | 10/2020 | Brown |
| 10,908,470 B2 | 2/2021 | Brown et al. |
| 10,921,675 B2 | 2/2021 | Barnum et al. |
| 10,982,487 B2 | 4/2021 | Ramirez |
| 11,126,057 B2 | 9/2021 | Brown et al. |
| 11,255,722 B2 | 2/2022 | Zedlitz et al. |
| 11,261,654 B2 | 3/2022 | Brown et al. |
| 11,520,207 B2 | 12/2022 | Brown et al. |
| 11,635,666 B2 | 4/2023 | Klawuhn et al. |
| 11,674,843 B2 | 6/2023 | Zedlitz et al. |
| 11,719,990 B2 | 8/2023 | Zedlitz et al. |
| 2002/0075472 A1 | 6/2002 | Holton |
| 2002/0135881 A1 | 9/2002 | Rukavina et al. |
| 2002/0144831 A1 | 10/2002 | Kalt |
| 2002/0152298 A1 | 10/2002 | Kikta et al. |
| 2003/0142140 A1 | 7/2003 | Brown et al. |
| 2003/0191546 A1 | 10/2003 | Bechtel et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0108191 A1 | 6/2004 | Su et al. |
| 2004/0135989 A1 | 7/2004 | Klebe |
| 2004/0160322 A1 | 8/2004 | Stilp |
| 2005/0046584 A1 | 3/2005 | Breed |
| 2005/0046920 A1 | 3/2005 | Freeman et al. |
| 2005/0063036 A1 | 3/2005 | Bechtel et al. |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0207730 A1 | 9/2006 | Berman et al. |
| 2006/0209007 A1 | 9/2006 | Pyo et al. |
| 2006/0245024 A1 | 11/2006 | Greer |
| 2007/0002007 A1 | 1/2007 | Tam |
| 2007/0055757 A1 | 3/2007 | Mairs et al. |
| 2007/0067048 A1 | 3/2007 | Bechtel et al. |
| 2007/0162233 A1 | 7/2007 | Schwenke |
| 2007/0285759 A1 | 12/2007 | Ash et al. |
| 2008/0012755 A1 | 1/2008 | Venkatachalam et al. |
| 2008/0018979 A1 | 1/2008 | Mahe et al. |
| 2008/0043316 A2 | 2/2008 | Moskowitz |
| 2008/0283621 A1 | 11/2008 | Quirino et al. |
| 2009/0020233 A1 | 1/2009 | Berman et al. |
| 2009/0027759 A1 | 1/2009 | Albahri |
| 2009/0066157 A1 | 3/2009 | Tarng et al. |
| 2009/0139669 A1 | 6/2009 | Robin |
| 2009/0143141 A1 | 6/2009 | Wells et al. |
| 2009/0187287 A1 | 7/2009 | Bruhnke et al. |
| 2009/0204269 A1 | 8/2009 | Bechtel et al. |
| 2009/0222137 A1 | 9/2009 | Berman et al. |
| 2009/0231092 A1 | 9/2009 | Maegawa et al. |
| 2009/0243732 A1 | 10/2009 | Tarng et al. |
| 2009/0243802 A1 | 10/2009 | Wolf et al. |
| 2009/0254222 A1 | 10/2009 | Berman et al. |
| 2009/0296188 A1 | 12/2009 | Jain et al. |
| 2009/0323160 A1 | 12/2009 | Egerton et al. |
| 2010/0039410 A1 | 2/2010 | Becker et al. |
| 2010/0066484 A1 | 3/2010 | Hanwright et al. |
| 2010/0071856 A1 | 3/2010 | Zaharchuk et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0245973 A1 | 9/2010 | Wang et al. |
| 2010/0294330 A1 | 11/2010 | Huang et al. |
| 2010/0296081 A1 | 11/2010 | Granqvist |
| 2010/0313476 A1 | 12/2010 | Sethuraman et al. |
| 2010/0315693 A1 | 12/2010 | Lam et al. |
| 2011/0035061 A1 | 2/2011 | Altonen et al. |
| 2011/0046810 A1 | 2/2011 | Bechtel et al. |
| 2011/0063708 A1 | 3/2011 | Letocart |
| 2011/0066302 A1* | 3/2011 | McEwan .................. E06B 9/68 700/295 |
| 2011/0080629 A1 | 4/2011 | Neuman et al. |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0260961 A1 | 10/2011 | Burdis |
| 2011/0266137 A1 | 11/2011 | Wang et al. |
| 2011/0266138 A1 | 11/2011 | Wang et al. |
| 2011/0266419 A1 | 11/2011 | Jones et al. |
| 2011/0267674 A1 | 11/2011 | Wang et al. |
| 2011/0267675 A1 | 11/2011 | Wang et al. |
| 2011/0292488 A1 | 12/2011 | McCarthy et al. |
| 2011/0295575 A1 | 12/2011 | Levine et al. |
| 2011/0304898 A1 | 12/2011 | Letocart |
| 2011/0304899 A1 | 12/2011 | Kwak et al. |
| 2012/0007507 A1 | 1/2012 | Niemann et al. |
| 2012/0190386 A1 | 1/2012 | Anderson |
| 2012/0026573 A1 | 2/2012 | Collins et al. |
| 2012/0033287 A1 | 2/2012 | Friedman et al. |
| 2012/0033288 A1 | 2/2012 | Lee et al. |
| 2012/0062975 A1 | 3/2012 | Mehtani et al. |
| 2012/0069420 A1 | 3/2012 | Suzuki |
| 2012/0091315 A1 | 4/2012 | Moskowitz |
| 2012/0095601 A1 | 4/2012 | Abraham et al. |
| 2012/0133315 A1 | 5/2012 | Berman et al. |
| 2012/0147449 A1 | 6/2012 | Bhatnagar et al. |
| 2012/0188627 A1 | 7/2012 | Chen et al. |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0261078 A1 | 10/2012 | Adams et al. |
| 2012/0265350 A1 | 10/2012 | Ashdown |
| 2012/0268803 A1 | 10/2012 | Greer |
| 2012/0275008 A1 | 11/2012 | Pradhan et al. |
| 2012/0285630 A1 | 11/2012 | Berman et al. |
| 2012/0293855 A1 | 11/2012 | Shrivastava et al. |
| 2013/0011315 A1 | 1/2013 | Ahmed et al. |
| 2013/0021659 A1 | 1/2013 | Friedman et al. |
| 2013/0038093 A1 | 2/2013 | Snider |
| 2013/0057157 A1 | 3/2013 | Nackaerts et al. |
| 2013/0057937 A1* | 3/2013 | Berman .................. G05B 13/04 359/245 |
| 2013/0063065 A1 | 3/2013 | Berman et al. |

(56) References Cited

U.S. PATENT DOCUMENTS

| | | |
|---|---|---|
| 2013/0139804 A1 | 6/2013 | Goldberg |
| 2013/0158790 A1* | 6/2013 | McIntyre, Jr. ............. B60J 3/04 359/275 |
| 2013/0173926 A1 | 7/2013 | Morese et al. |
| 2013/0242370 A1 | 9/2013 | Wang |
| 2013/0263510 A1 | 10/2013 | Gassion |
| 2013/0264948 A1* | 10/2013 | Orillard ................. H05B 45/22 315/155 |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0321923 A1 | 12/2013 | Thuot et al. |
| 2014/0043667 A1 | 2/2014 | Bergh et al. |
| 2014/0067733 A1 | 3/2014 | Humann |
| 2014/0083413 A1 | 3/2014 | Bibi et al. |
| 2014/0104667 A1 | 4/2014 | Greer et al. |
| 2014/0145002 A1 | 5/2014 | Caldeira et al. |
| 2014/0160550 A1 | 6/2014 | Brown et al. |
| 2014/0177025 A1 | 6/2014 | Lee et al. |
| 2014/0177028 A1 | 6/2014 | Shrivastava et al. |
| 2014/0236323 A1* | 8/2014 | Brown ................... G05B 15/02 700/90 |
| 2014/0259931 A1 | 9/2014 | Plummer |
| 2014/0262057 A1 | 9/2014 | Chambers et al. |
| 2014/0268287 A1 | 9/2014 | Brown et al. |
| 2014/0288715 A1 | 9/2014 | Beaujeu et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0035440 A1 | 2/2015 | Spero |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0092259 A1* | 4/2015 | Greer ................... H05B 47/11 359/275 |
| 2015/0116811 A1 | 4/2015 | Shrivastava et al. |
| 2015/0122474 A1 | 5/2015 | Peterson |
| 2015/0185581 A1 | 7/2015 | Pradhan et al. |
| 2015/0219975 A1 | 8/2015 | Phillips et al. |
| 2015/0234945 A1 | 8/2015 | Marceau et al. |
| 2015/0293422 A1 | 10/2015 | Pradhan et al. |
| 2015/0338713 A1 | 11/2015 | Brown |
| 2015/0368967 A1 | 12/2015 | Lundy et al. |
| 2016/0040478 A1 | 2/2016 | Lundy et al. |
| 2016/0054633 A1 | 2/2016 | Brown et al. |
| 2016/0054634 A1 | 2/2016 | Brown et al. |
| 2016/0062332 A1 | 3/2016 | Call et al. |
| 2016/0124283 A1 | 5/2016 | Brown et al. |
| 2016/0154290 A1 | 6/2016 | Brown et al. |
| 2016/0202589 A1 | 7/2016 | Nagel et al. |
| 2016/0203403 A1 | 7/2016 | Nagel et al. |
| 2016/0223878 A1 | 8/2016 | Tran et al. |
| 2016/0258209 A1 | 9/2016 | Berman et al. |
| 2017/0053068 A1 | 2/2017 | Pillai et al. |
| 2017/0075183 A1 | 3/2017 | Brown |
| 2017/0097259 A1 | 4/2017 | Brown et al. |
| 2017/0122802 A1 | 5/2017 | Brown et al. |
| 2017/0123286 A1 | 5/2017 | Parker |
| 2017/0130523 A1 | 5/2017 | Shrivastava et al. |
| 2017/0168368 A1 | 6/2017 | Brown et al. |
| 2017/0219907 A1 | 8/2017 | Brown et al. |
| 2017/0242315 A1 | 8/2017 | Ash et al. |
| 2017/0276542 A1 | 9/2017 | Klawuhn et al. |
| 2017/0279876 A1 | 9/2017 | Prasad et al. |
| 2017/0328121 A1 | 11/2017 | Purdy et al. |
| 2017/0365908 A1 | 12/2017 | Hughes et al. |
| 2018/0073712 A1 | 3/2018 | Baaijens et al. |
| 2018/0129172 A1 | 5/2018 | Shrivastava et al. |
| 2018/0141414 A1 | 5/2018 | Lota |
| 2018/0157141 A1 | 6/2018 | Brown et al. |
| 2018/0162203 A1 | 6/2018 | Boehm |
| 2018/0187484 A1 | 7/2018 | Hebeisen et al. |
| 2018/0231860 A1 | 8/2018 | Podbelski et al. |
| 2018/0284555 A1 | 10/2018 | Klawuhn et al. |
| 2018/0307114 A1 | 10/2018 | Brown et al. |
| 2018/0373111 A1 | 12/2018 | Brown |
| 2019/0025661 A9 | 1/2019 | Brown et al. |
| 2019/0171081 A1 | 6/2019 | Zedlitz et al. |
| 2019/0230776 A1 | 7/2019 | Casey et al. |
| 2019/0250029 A1 | 8/2019 | Zedlitz et al. |
| 2019/0257143 A1 | 8/2019 | Nagel et al. |
| 2020/0007762 A1 | 1/2020 | Dallmeier |
| 2020/0057346 A1 | 2/2020 | Zedlitz et al. |
| 2020/0063490 A1 | 2/2020 | Hebeisen et al. |
| 2020/0072674 A1 | 3/2020 | Baker et al. |
| 2020/0096831 A1 | 3/2020 | Brown et al. |
| 2020/0355977 A1 | 11/2020 | Brown et al. |
| 2020/0393733 A1 | 12/2020 | Brown |
| 2021/0003899 A1 | 1/2021 | Zedlitz et al. |
| 2021/0080319 A1 | 3/2021 | Brown et al. |
| 2021/0190991 A1 | 6/2021 | Frank et al. |
| 2021/0214274 A1 | 7/2021 | Friedman et al. |
| 2021/0325754 A1 | 10/2021 | Brown et al. |
| 2022/0113184 A1 | 4/2022 | Zedlitz et al. |
| 2022/0214592 A1 | 7/2022 | Brown et al. |
| 2022/0326584 A1 | 10/2022 | Khanna et al. |
| 2023/0004059 A1 | 1/2023 | Klawuhn et al. |
| 2023/0152654 A1 | 5/2023 | Klawuhn et al. |
| 2023/0408883 A1 | 12/2023 | Zedlitz et al. |

FOREIGN PATENT DOCUMENTS

| | | |
|---|---|---|
| CN | 1380482 A | 11/2002 |
| CN | 1097760 C | 1/2003 |
| CN | 2590732 Y | 12/2003 |
| CN | 1534413 A | 10/2004 |
| CN | 1659080 A | 8/2005 |
| CN | 1672189 A | 9/2005 |
| CN | 1704556 A | 12/2005 |
| CN | 1822951 A | 8/2006 |
| CN | 201104273 Y | 8/2008 |
| CN | 101421558 A | 4/2009 |
| CN | 101438205 A | 5/2009 |
| CN | 101501757 A | 8/2009 |
| CN | 101600604 A | 12/2009 |
| CN | 101641618 A | 2/2010 |
| CN | 101678209 A | 3/2010 |
| CN | 101702036 A | 5/2010 |
| CN | 101707892 A | 5/2010 |
| CN | 101762920 A | 6/2010 |
| CN | 101969207 A | 2/2011 |
| CN | 102168517 A | 8/2011 |
| CN | 102203370 A | 9/2011 |
| CN | 102330530 A | 1/2012 |
| CN | 202110359 U | 1/2012 |
| CN | 202230346 U | 5/2012 |
| CN | 102183237 B | 8/2012 |
| CN | 102749781 A | 10/2012 |
| CN | 202794021 U | 3/2013 |
| CN | 103168269 A | 6/2013 |
| CN | 103370192 A | 10/2013 |
| CN | 103370490 A | 10/2013 |
| CN | 103370649 A | 10/2013 |
| CN | 103370986 A | 10/2013 |
| CN | 203271490 U | 11/2013 |
| CN | 103547965 A | 1/2014 |
| CN | 103649826 A | 3/2014 |
| CN | 103987909 A | 8/2014 |
| CN | 203870367 U | 10/2014 |
| CN | 104181612 A | 12/2014 |
| CN | 104321497 A | 1/2015 |
| CN | 104429162 A | 3/2015 |
| CN | 104685428 A | 6/2015 |
| CN | 104781493 A | 7/2015 |
| CN | 105143586 A | 12/2015 |
| CN | 105549293 A | 5/2016 |
| CN | 106103191 A | 11/2016 |
| CN | 106462023 A | 2/2017 |
| CN | 106796305 A | 5/2017 |
| CN | 106971028 A | 7/2017 |
| CN | 108351471 A | 7/2018 |

(56) References Cited

FOREIGN PATENT DOCUMENTS

| | | |
|---|---|---|
| DE | 10124673 A1 | 11/2002 |
| DE | 102014220818 A1 | 4/2016 |
| EP | 0445314 A1 | 9/1991 |
| EP | 0869032 | 10/1998 |
| EP | 1078818 A2 | 2/2001 |
| EP | 1441269 | 7/2004 |
| EP | 0835475 B1 | 9/2004 |
| EP | 1510854 A1 | 3/2005 |
| EP | 1417535 | 11/2005 |
| EP | 1619546 A2 | 1/2006 |
| EP | 0920210 | 6/2009 |
| EP | 2161615 | 3/2010 |
| EP | 2357544 | 8/2011 |
| EP | 2590095 A1 | 5/2013 |
| EP | 2764998 A1 | 8/2014 |
| EP | 3114903 A1 | 1/2017 |
| EP | 2517332 B1 | 9/2018 |
| EP | 2638429 B1 | 2/2021 |
| FR | 3026496 A1 | 4/2016 |
| GB | 2462754 A | 5/2004 |
| JP | S61-022897 U | 2/1986 |
| JP | S6282194 A | 4/1987 |
| JP | 63-208830 | 8/1988 |
| JP | 02-132420 | 5/1990 |
| JP | H04-031833 A | 2/1992 |
| JP | H04-363495 A | 12/1992 |
| JP | 05-178645 | 7/1993 |
| JP | H06282194 A | 10/1994 |
| JP | 10-063216 | 3/1998 |
| JP | H10159465 A | 6/1998 |
| JP | H10249278 A | 9/1998 |
| JP | 2000008476 A | 1/2000 |
| JP | 2000-096956 A | 4/2000 |
| JP | 2002-148573 A | 5/2002 |
| JP | 2004170350 A | 6/2004 |
| JP | 2004-245985 | 9/2004 |
| JP | 2005054356 A | 3/2005 |
| JP | 2005-282106 A | 10/2005 |
| JP | 2005-314870 A | 11/2005 |
| JP | 2006-009281 A | 1/2006 |
| JP | 2006-029027 A | 2/2006 |
| JP | 2007-120090 A | 5/2007 |
| JP | 2007-308971 A | 11/2007 |
| JP | 2008502949 A | 1/2008 |
| JP | 2008531879 A | 8/2008 |
| JP | 2009-508387 A | 2/2009 |
| JP | 2009540376 A | 11/2009 |
| JP | 2010-101151 A | 5/2010 |
| JP | 2010529488 A | 8/2010 |
| JP | 4694816 B2 | 6/2011 |
| JP | 4799113 B2 | 10/2011 |
| JP | 2013-057975 A | 3/2013 |
| JP | 2016516921 A | 6/2016 |
| JP | 6541003 B2 | 7/2019 |
| JP | 6818386 B2 | 1/2021 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 20110052721 A | 5/2011 |
| KR | 10-2011-0094672 | 8/2011 |
| KR | 20110118783 A | 11/2011 |
| KR | 20130018527 A | 2/2013 |
| KR | 20140139894 A | 12/2014 |
| KR | 10-1815919 B1 | 1/2018 |
| RU | 29501 U1 | 5/2003 |
| TW | 200532346 A | 10/2005 |
| TW | 200920987 A | 5/2009 |
| TW | M368189 U | 11/2009 |
| TW | 201029838 A | 8/2010 |
| TW | 201215981 A | 4/2012 |
| TW | 201231789 A | 8/2012 |
| TW | 201243470 A1 | 11/2012 |
| TW | 201248286 A1 | 12/2012 |
| TW | 1395809 B | 5/2013 |
| TW | 201447089 A | 12/2014 |
| WO | WO1996/32560 A1 | 10/1996 |
| WO | WO1998/016870 | 4/1998 |
| WO | WO02/09338 A2 | 1/2002 |
| WO | WO2002/013052 | 2/2002 |
| WO | WO2004/003649 | 1/2004 |
| WO | WO2005/098811 | 10/2005 |
| WO | WO2005/103807 | 11/2005 |
| WO | WO2007/016546 A2 | 2/2007 |
| WO | WO2007/146862 | 12/2007 |
| WO | WO2008/030018 | 3/2008 |
| WO | WO2008/048181 A1 | 4/2008 |
| WO | WO2008/147322 | 12/2008 |
| WO | WO-2009044330 A1 | 4/2009 |
| WO | WO2009/124647 | 10/2009 |
| WO | WO-2010007988 A1 | 1/2010 |
| WO | WO2010/079388 A1 | 7/2010 |
| WO | WO2010/120771 | 10/2010 |
| WO | WO2011/020478 | 2/2011 |
| WO | WO2011/087684 | 7/2011 |
| WO | WO2011/087687 | 7/2011 |
| WO | WO-2011087677 A1 | 7/2011 |
| WO | WO2011/124720 | 10/2011 |
| WO | WO2011/127015 | 10/2011 |
| WO | WO2012/079159 | 6/2012 |
| WO | WO2012/080589 | 6/2012 |
| WO | WO2012/080618 | 6/2012 |
| WO | WO2012/080656 | 6/2012 |
| WO | WO2012/080657 | 6/2012 |
| WO | WO2012/125332 A2 | 9/2012 |
| WO | WO2012/145155 | 10/2012 |
| WO | WO-2012138074 A2 | 10/2012 |
| WO | WO2013/059674 | 4/2013 |
| WO | WO2013/102932 A2 | 7/2013 |
| WO | WO2013/105244 A1 | 7/2013 |
| WO | WO2013/109881 | 7/2013 |
| WO | WO2013/130781 A1 | 9/2013 |
| WO | WO2013/155467 | 10/2013 |
| WO | WO-2014045163 A2 | 3/2014 |
| WO | WO-2014078429 A1 | 5/2014 |
| WO | WO2014/121863 | 8/2014 |
| WO | WO2014/130471 | 8/2014 |
| WO | WO2014/134451 | 9/2014 |
| WO | WO-2014150153 A1 | 9/2014 |
| WO | WO2014/165692 A1 | 10/2014 |
| WO | WO2014/209812 A1 | 12/2014 |
| WO | WO-2015023842 A2 | 2/2015 |
| WO | WO2015/077097 A1 | 5/2015 |
| WO | WO2015/095615 A1 | 6/2015 |
| WO | WO2015/171886 A1 | 11/2015 |
| WO | WO-2016004109 A1 | 1/2016 |
| WO | WO2016/029156 A1 | 2/2016 |
| WO | WO2016/029165 A2 | 2/2016 |
| WO | WO2016/058695 A1 | 4/2016 |
| WO | WO-2016053960 A1 | 4/2016 |
| WO | WO2016/054112 A1 | 5/2016 |
| WO | WO2016/085964 | 6/2016 |
| WO | WO-2016094445 A1 | 6/2016 |
| WO | WO2016/191406 | 12/2016 |
| WO | WO2017/007942 | 1/2017 |
| WO | WO2017/059362 A1 | 4/2017 |
| WO | WO-2017062592 A1 | 4/2017 |
| WO | WO2017/075472 | 5/2017 |
| WO | WO2017/189437 A1 | 11/2017 |
| WO | WO2018/034935 A1 | 2/2018 |
| WO | WO2018/034933 A1 | 3/2018 |
| WO | WO2018/038972 A1 | 3/2018 |
| WO | WO-2018039433 A1 | 3/2018 |
| WO | WO2018/067996 | 4/2018 |
| WO | WO-2018098089 A1 | 5/2018 |
| WO | WO2018/112095 | 6/2018 |
| WO | WO-2018112095 A3 | 7/2018 |
| WO | WO2018/140495 A1 | 8/2018 |

(56) References Cited

FOREIGN PATENT DOCUMENTS

| WO | WO2018/157063 A1 | 8/2018 |
|----|------------------|--------|
| WO | WO-2019183289 A1 | 9/2019 |

OTHER PUBLICATIONS

U.S. Final Office Action dated Jul. 2, 2015 in U.S. Appl. No. 13/049,756.
U.S. Final Office Action dated Aug. 19, 2013 in U.S. Appl. No. 13/049,756.
U.S. Notice of Allowance dated Jan. 8, 2016 in U.S. Appl. No. 13/049,756.
U.S. Notice of Allowance dated Jun. 22, 2016 in U.S. Appl. No. 13/049,756.
U.S. Office Action dated Oct. 6, 2014 in U.S. Appl. No. 13/049,756.
U.S. Office Action dated Jan. 18, 2013 in U.S. Appl. No. 13/049,756.
U.S. Final Office Action dated Jun. 5, 2015 U.S. Appl. No. 13/968,258.
U.S. Office Action dated Oct. 6, 2014 in U.S. Appl. No. 13/968,258.
U.S. Office Action dated Aug. 28, 2017 in U.S. Appl. No. 14/932,474.
U.S. Notice of Allowance dated Jan. 12, 2018 in U.S. Appl. No. 14/932,474.
U.S. Office Action dated May 18, 2018 in U.S. Appl. No. 15/891,866.
U.S. Final Office Action dated Jan. 11, 2019 in U.S. Appl. No. 15/891,866.
U.S. Office Action dated Sep. 19, 2019 in U.S. Appl. No. 15/891,866.
U.S. Notice of Allowance dated May 8, 2012 in U.S. Appl. No. 13/049,750.
U.S. Final Office Action dated Apr. 30, 2012 in U.S. Appl. No. 13/049,750.
U.S. Office Action dated Feb. 3, 2012 in U.S. Appl. No. 13/049,750.
U.S. Final Office Action dated Feb. 26, 2015 in U.S. Appl. No. 13/479,137.
U.S. Final Office Action dated Jan. 27, 2014 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Jul. 3, 2014 in U.S. Appl. No. 13/479,137.
U.S. Office Action dated Sep. 23, 2013 in U.S. Appl. No. 13/479,137.
U.S. Office Action dated Jan. 16, 2015 in U.S. Appl. No. 14/468,778.
U.S. Notice of Allowance dated Jul. 20, 2012 in U.S. Appl. No. 13/049,623.
U.S. Office Action dated Mar. 27, 2012 in U.S. Appl. No. 13/049,623.
U.S. Notice of Allowance dated Jun. 17, 2014 in U.S. Appl. No. 13/309,990.
U.S. Office Action dated Dec. 24, 2013 in U.S. Appl. No. 13/309,990.
U.S. Notice of Allowance dated Aug. 12, 2016 in U.S. Appl. No. 14/352,973.
U.S. Office Action dated Nov. 27, 2015 in U.S. Appl. No. 14/352,973.
U.S. Office Action dated Nov. 2, 2017 in U.S. Appl. No. 15/349,860.
U.S. Notice of Allowance dated Aug. 16, 2018 in U.S. Appl. No. 15/349,860.
U.S. Notice of Allowance dated Nov. 16, 2018 in U.S. Appl. No. 15/349,860.
U.S. Notice of Allowance dated Jan. 10, 2014 in U.S. Appl. No. 13/449,235.
U.S. Office Action dated Oct. 11, 2013 in U.S. Appl. No. 13/449,235.
U.S. Notice of Allowability (corrected) dated Jul. 28, 2016 in U.S. Appl. No. 14/163,026.
U.S. Notice of Allowance dated Jun. 8, 2016 in U.S. Appl. No. 14/163,026.
U.S. Office Action dated Apr. 14, 2016 in U.S. Appl. No. 14/163,026.
U.S. Office Action dated Feb. 24, 2015 in U.S. Appl. No. 14/163,026.
U.S. Office Action dated Nov. 27, 2015 in U.S. Appl. No. 14/163,026.
U.S. Notice of Allowance dated Apr. 4, 2016 in U.S. Appl. No. 14/535,080.
U.S. Office Action dated Feb. 22, 2016 in U.S. Appl. No. 14/535,080.
U.S. Office Action dated Nov. 19, 2015 in U.S. Appl. No. 14/535,080.
U.S. Office Action dated Mar. 8, 2017 in U.S. Appl. No. 14/993,822.
U.S. Office Action dated Oct. 11, 2017 in U.S. Appl. No. 14/993,822.
U.S. Notice of Allowance dated May 3, 2018 in U.S. Appl. No. 14/993,822.
U.S. Office Action dated Sep. 14, 2018 in U.S. Appl. No. 14/993,822.
U.S. Office Action dated Mar. 27, 2019 in U.S. Appl. No. 14/993,822.
U.S. Notice of Allowance dated Sep. 6, 2019 in U.S. Appl. No. 14/993,822.
U.S. Notice of Allowance dated Jan. 27, 2017 in U.S. Appl. No. 14/931,390.
U.S. Office Action dated Jun. 6, 2017 in U.S. Appl. No. 15/442,509.
U.S. Office Action dated Jan. 5, 2018 in U.S. Appl. No. 15/442,509.
U.S. Notice of Allowance dated Sep. 25, 2018 in U.S. Appl. No. 15/442,509.
U.S. Office Action dated Mar. 5, 2019 in U.S. Appl. No. 15/442,509.
U.S. Notice of Allowance dated Sep. 3, 2019 in U.S. Appl. No. 15/442,509.
U.S. Final Office Action dated May 16, 2014 in U.S. Appl. No. 13/449,248.
U.S. Office Action dated Nov. 29, 2013 in U.S. Appl. No. 13/449,248.
U.S. Office Action dated Sep. 29, 2014 in U.S. Appl. No. 13/449,248.
U.S. Final Office Action dated May 15, 2014 in U.S. Appl. No. 13/449,251.
U.S. Office Action dated Jun. 3, 2015 in U.S. Appl. No. 13/449,251.
U.S. Office Action dated Oct. 28, 2014 in U.S. Appl. No. 13/449,251.
U.S. Office Action dated Nov. 29, 2013 in U.S. Appl. No. 13/449,251.
U.S. Notice of Allowance dated Jan. 22, 2015 in U.S. Appl. No. 13/682,618.
U.S. Office Action dated Sep. 15, 2014 in U.S. Appl. No. 13/682,618.
U.S. Notice of Allowance dated Apr. 13, 2015 in U.S. Appl. No. 14/657,380.
U.S. Final Office Action dated Jul. 29, 2016 in U.S. Appl. No. 13/772,969.
U.S. Notice of Allowance dated Dec. 22, 2016 in U.S. Appl. No. 13/772,969.
U.S. Office Action dated Jan. 5, 2016 in U.S. Appl. No. 13/772,969.
U.S. Notice of Allowance dated Jan. 22, 2018 in U.S. Appl. No. 15/464,837.
U.S. Office Action dated May 30, 2018 in U.S. Appl. No. 15/464,837.
U.S. Office Action dated Mar. 12, 2019 in U.S. Appl. No. 15/464,837.
U.S. Notice of Allowance dated Oct. 2, 2019 in U.S. Appl. No. 15/464,837.
U.S. Notice of Allowance dated Mar. 20, 2018 in U.S. Appl. No. 15/347,677.
Letter dated Dec. 1, 2014 re Prior Art re U.S. Appl. No. 13/772,969 from Ryan D. Ricks representing MechoShade Systems, Inc.
Third-Party Submission dated Feb. 2, 2015 and Feb. 18, 2015 PTO Notice re Third-Party Submission for U.S. Appl. No. 13/772,969.
Chinese Office Action dated Apr. 5, 2016 in Chinese Application No. 201280023631.4.
Chinese Office Action dated Dec. 1, 2016 in Chinese Application No. 201280023631.4.
Chinese Office Action dated Jun. 26, 2015 in Chinese Application No. 201280023631.4.
European Search Report dated Aug. 11, 2014 in European Application No. 12757877.1.
European Extended Search Report dated Jun. 18, 2019 in EP Application No. 19165771.7.
Taiwanese Office Action dated Jan. 11, 2016 in TW Application No. 101108958.
Taiwanese Office Action dated Nov. 23, 2016 in TW Application No. 105129854.
Taiwanese Office Action dated Oct. 17, 2017 in TW Application No. 106115702.
Taiwanese Office Action dated May 8, 2019 in TW Application No. 107122055.
International Preliminary Report on Patentability dated Sep. 26, 2013, issued in PCT/US2012/027828.
International Search Report and Written Opinion dated Sep. 26, 2012, issued in PCT/US2012/027828.
European Search Report dated Jul. 29, 2014 in European Application No. 12758250.0.

(56) References Cited

OTHER PUBLICATIONS

International Preliminary Report on Patentability dated Sep. 26, 2013, issued in PCT/US2012/027909.
International Search Report and Written Opinion dated Sep. 24, 2012, issued in PCT/US2012/027909.
European Search Report dated Jul. 23, 2014 in European Application No. 12756917.6.
International Preliminary Report on Patentability dated Sep. 26, 2013, issued in PCT/US2012/027742.
International Search Report and Written Opinion dated Sep. 24, 2012, issued in PCT/US2012/027742.
Chinese Office Action dated Mar. 26, 2015 in Chinese Application No. 2015032301101560.
Chinese Office Action dated Nov. 27, 2015 in Chinese Application No. 2015032301101560.
Chinese Office Action dated Jul. 2, 2018 in Chinese Application No. 201710111979.3.
Chinese Office Action dated Dec. 25, 2018 in CN Application No. 201710111979.3.
European Office Action dated May 15, 2017 in EP Application No. EP 12841714.4.
European Search Report dated Mar. 5, 2015 in European Application No. 12841714.4.
European Office Action dated Dec. 2, 2015 in EP Application No. 12841714.4.
International Preliminary Report on Patentability dated May 1, 2014 in PCT/US2012/061137.
International Search Report and Written Opinion dated Mar. 28, 2013 in PCT/US2012/061137.
Australian Examination Report dated Sep. 9, 2016 in AU Application No. 2013249621.
Australian Examination Report dated Dec. 19, 2018 in AU Application No. 2017270472.
Chinese Office Action dated Oct. 10, 2015 in CN Application No. 201380026428.7.
Chinese Office Action dated Dec. 19, 2018 in CN Application No. 201610645398.3.
Chinese Office Action dated Aug. 19, 2019 in CN Application No. 201610645398.3.
European Search Report dated May 11, 2016 in EP Application No. 13777540.9.
European Office Action dated Jul. 15, 2019 in EP Application No. 13777540.9.
Russian Office Action dated Apr. 13, 2017 in RU Application No. 2014144632.
Russian Office Action dated Nov. 22, 2017 in RU Application No. 2014144632.
Singapore Supplementary Examination Report dated Dec. 7, 2016 in SG Application No. 11201406676Q.
International Preliminary Report on Patentability dated Oct. 30, 2014 issued in PCT/US2013/036235.
International Search Report and Written Opinion dated Jul. 23, 2013, issued in PCT/US2013/036235.
International Preliminary Report on Patentability dated Oct. 23, 2014 issued in PCT/US2013/036456.
International Search Report and Written Opinion dated Jul. 26, 2013, issued in PCT/US2013/036456.
International Preliminary Report on Patentability dated Oct. 30, 2014 issued in PCT/US2013/034998.
International Search Report and Written Opinion dated Jul. 11, 2013, issued in PCT/US2013/034998.
International Preliminary Report on Patentability dated Feb. 19, 2015 issued in PCT/US2013/053625.
International Search Report and Written Opinion dated Dec. 26, 2013, issued in PCT/US2013/053625.
Australian Examination Report dated Mar. 31, 2017 in AU Application No. 2014219076.
Australian Examination Report dated Feb. 21, 2019 in AU Application No. 2018201341.
Chinese Office Action dated Jun. 27, 2016 in Chinese Application No. 201480022064.X.
Chinese Office Action dated May 15, 2017 in Chinese Application No. 201480022064.X.
Chinese Office Action dated Feb. 9, 2018 in Cn Application No. 201480022064.X.
EP Invitation to Indicate Search dated Jun. 22, 2016 in EP Application No. 14753897.9.
European Extended Search Report dated Oct. 12, 2016 in EP Application No. 14753897.9.
European Office Action dated Dec. 12, 2017 in EP Application No. 14753897.9.
EPO Communication dated Sep. 2, 2015 in EP Application No. 14753897.9 re Third-Party Observations.
European Extended Search Report dated Jan. 18, 2019 in EP Application No. 18208971.4.
Indian Office Action dated Sep. 3, 2019 in in Application No. 3074/KOLNP/2015.
Japanese Office Action dated Feb. 6, 2018 in JP Application No. 2015558909.
Japanese Decision of Rejection dated Oct. 24, 2018 in JP Application No. JP 2015-558909.
Russian Decision to Grant with Search Report dated Feb. 28, 2018 in RU Application No. 2015139884.
Taiwanese Office Action dated Aug. 22, 2017 in TW Application No. 103105957.
International Preliminary Report on Patentability dated Sep. 3, 2015, issued in PCT/US2014/016974.
International Search Report and Written Opinion dated May 26, 2014 in PCT/US2014/016974.
Communication re Third-Party Observation dated Dec. 4, 2014 and Third-Party Observation dated Dec. 3, 2014 in PCT/US2014/016974.
Australian Office Action dated Jul. 1, 2019 in AU Application No. 2015255913.
Chinese Office Action dated Jan. 14, 2019 in CN Application No. 201580035315.2.
Extended European Search Report dated Apr. 3, 2018 in EP Application No. 15789108.6.
Partial EP Supplemental Search Report dated Nov. 29, 2017 in EP Application No. 15789108.6.
Japanese Office Action dated Apr. 2, 2019 in JP Application No. 2016567021.
Russian Office Action dated Dec. 7, 2018 in RU Application No. 2016148196.
Taiwanese Office Action dated Jan. 30, 2019 in TW Application No. 104114812.
International Search Report and Written Opinion dated Jul. 23, 2015 in PCT/US2015/029675.
International Preliminary Report on Patentability dated Nov. 24, 2016 in PCT/US2015/029675.
International Search Report and Written Opinion dated Mar. 30, 2018 in PCT/US2017/066198.
International Preliminary Report on Patentability dated Jun. 17, 2019 in PCT/US2017/066198.
International Search Report and Written Opinion dated Oct. 16, 2014, issued in PCT/US2014/043514.
Chinese Office Action dated Aug. 23, 2019 in CN Application No. 201680063892.7—needs translation.
EP Partial Supplemental Search Report dated Apr. 12, 2019 in EP Application No. 16852784.4.
EP Extended Search Report dated May 16, 2019 in EP Application No. 16852784.4.
International Preliminary Report on Patentability dated Apr. 12, 2018, issued in PCT/US16/55005.
International Search Report and Written Opinion dated Dec. 13, 2016, issued in PCT/US16/55005.
European Extended Search Report dated Jan. 17, 2019 in EP Application No. 16821984.8.
International Preliminary Report on Patentability dated Jan. 18, 2018 in PCT/US2016/041344.
International Search Report and Written Opinion dated Oct. 13, 2016, issued in PCT/US2016/041344.

(56) References Cited

OTHER PUBLICATIONS

International Search Report and Written Opinion dated Jan. 25, 2018 in PCT/US17/55631.
International Preliminary Report on Patentability dated Apr. 18, 2019 in PCT/US17/55631.
International Preliminary Report on Patentability dated Dec. 13, 2018 in PCT/US17/35290.
International Search Report and Written Opinion dated Sep. 8, 2017, issued in PCT/US17/35290.
International Search Report and Written Opinion (ISA: KIPO) dated Jun. 11, 2018 issued in PCT/US2018/019737.
International Preliminary Report on Patentability dated Sep. 6, 2019 issued in PCT/US2018/019737.
"How Cleantech wants to make a 2012 comeback" http://mountainview.patch.com/articles/how-cleantech-wants-to-make-a-2012-comeback, Jan. 23, 2012.
"New from Pella: Windows with Smartphone-run blinds", Pella Corp., http://www.desmoinesregister.com/article/20120114/Business/301140031/0/biggame/?odyssey=nav%7Chead, Jan. 13, 2012.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
APC by Schneider Electric, Smart-UPS 120V Product Brochure, 2013, 8 pp.
Benson D. K. et al., "Design goals and challenges for a photovoltaic-powered electrochromic window covering", Solar Energy Materials and Solar Cells, vol. 39, No. 2/04, Dec. 1995, pp. 203-211.
Duchon, Claude E. et al., "Estimating Cloud Type from Pyranometer Observations," Journal of Applied Meteorology, vol. 38, Jan. 1999, pp. 132-141.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&n1=11774).
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
National Aeronautics & Space Administration, "Cloud Radar System (CRS)," (known as of Sep. 3, 2014) [http://har.gsfc.nasa.gov/index.php?section=12].
National Aeronautics & Space Administration, "Cloud Remote Sensing and Modeling," (known as of Sep. 3, 2014) [http://atmospheres.gsfc.nasa.gov/climate/index.php?section=134].
Science and Technology Facilities Council. "Cloud Radar: Predicting the Weather More Accurately." ScienceDaily, Oct. 1, 2008. [www.sciencedaily.com/releases/2008/09/080924085200.htm].
American Chemical Society, "Solar smart window could offer privacy and light control on demand (video)," EurakAlert! Pub Release, Nov. 16, 2016 [https://www.eurekalert.org/pub_releases/2016-11/acs-ssw111616.php].
Selkowitz, S. et al., "Dynamic, Integrated Façade Systems for Energy Efficiency and Comfort," Journal of Buiding Enclosure Design, Summer 2006, pp. 11-17.
Idso, Sherwood B., "Humidity measurement by infrared thermometry," Remote Sensing of Environment, vol. 12, 1982, pp. 87-91.
Maghrabi, A., et al., "Design and development of a simple infrared monitor for cloud detection," Energy Conversion and Management, vol. 50, 2009, pp. 2732-2737.
Maghrabi, A., et al., "Precipitable water vapour estimation on the basis of sky temperatures measured by a single-pixel IR detector and screen temperatures under clear skies," Meteorological Applications, vol. 17, 2010, pp. 279-286.
Morris, V.R. et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.
Thompson, Marcus, "Boltwood cloud sensor," Cloudynights.com, Nov. 25, 2005, 6 pp. [online], [retrieved Dec. 15, 2016]. Retrieved from the internet <URL http://www.cloudynights.com/page/articles/cat/user-reviews/photography/photography-accessories/boltwood-cloud-sensor-r1222>.
Werner, Christian, "Automatic cloud cover indicator system," Journal of Applied Meteorology, vol. 12, Dec. 1973, pp. 1394-1400.
Boltwood Cloud Sensor II by Diffraction Limited, 2016, [online], [retrieved Dec. 15, 2016]. Retrieved from the internet <URL http://diffractionlimited.com/product/boltwood-cloud-sensor-ii/>.
Mims III, Forrest M., et al., "Measuring total column water vapor by pointing an infrared thermometer at the sky," Bulletin of the American Meteorological Society, Oct. 2011, pp. 1311-1320.
Melexis "MLX90614 family Datasheet" (3901090614, Rev. 004), Jul. 30, 2008, 42 pp.
U.S. Appl. No. 16/487,802, filed Aug. 21, 2019, Rozbicki.
AU Examination Report dated Aug. 28, 2021, in the AU Application No. 2020202011.
Australian Examination Report dated May 20, 2021 in AU Application No. 2020202135.
Australian Examination Report No. 2 dated Feb. 12, 2020 in AU Application No. 2018201341.
Australian Notice of Acceptance for Patent Application, dated Sep. 29, 2020, for Australian Patent Application No. 2015255913.
CA Office Action dated Dec. 24, 2021, in Application No. CA2948668.
Campbell-Burns, Peter, "Building a Cloud Sensor", Farnham Astronomical Society, (Apr. 15, 2013), Retrieved from the internet: URL: https://www.farnham-as.co.uk/2813/84/building-a-cloud-sensor/ [retrieved on 2828-84-24].
Canadian Notice of Allowance dated Aug. 12, 2020 in Canadian Application No. 2,902,106.
Canadian Notice of Allowance dated Jan. 18, 2021 in Canadian Application No. 2,902,106.
Canadian Office Action dated Feb. 11, 2021 in CA Application No. 2,870,627.
Canadian Office Action dated Jan. 28, 2020 in Canadian Application No. 2,902,106.
Canadian Office Action dated Jun. 10, 2021 in CA Application No. 2,948,668.
Chinese Notice of Allowance & Search Report dated Sep. 12, 2019 in CN Application No. 201580035315.2.
Chinese Notice of Allowance dated Jun. 3, 2021 in CN Application No. 201680043725.6, No Translation.
Chinese Office Action dated Dec. 16, 2020 in CN Application No. 201680063892.7, with English Translation.
Chinese Office Action dated Feb. 2, 2021 in Chinese Application No. 201880022572.6, with English Translation.
Chinese Office Action dated Feb. 3, 2020 in Chinese Application No. 201710600395.2, with English Translation.
Chinese Office Action dated Jan. 12, 2021 in CN Application No. 201780065447.9 with Translation.
Chinese Office Action dated Jan. 13, 2021 in Chinese Application No. 201811232377.4, with English Translation.
Chinese Office Action dated Jan. 21, 2020 in Chinese Application No. 201811232377.4, with English Translation.
Chinese Office Action dated Jul. 14, 2020 in CN Application No. 201680063892.7, with English Translation.
Chinese Office Action dated Jun. 23, 2021 in Chinese Application No. 201811232377.4, with English Translation.

(56) References Cited

OTHER PUBLICATIONS

Chinese Office Action dated Jun. 28, 2020 in CN Application No. 201680043725.6.
Chinese Office Action dated Mar. 10, 2020 in CN Application No. 201610645398.3, with English Translation.
Chinese Office Action dated May 20, 2021 in Chinese Application No. 201710600395.2, with English Translation.
Chinese Office Action dated Nov. 3, 2020 in Chinese Application No. 201710600395.2, with English Translation.
CN Office Action dated Aug. 4, 2021, in CN Application No. 201780039437.8 with English translation.
CN Office Action dated Aug. 17, 2021, in CN Application No. 201680063892.7 with English translation.
CN Office Action dated Nov. 3, 2021, in Application No. CN20178065447 with English translation.
CN Office Action dated Nov. 8, 2021, in Application No. CN20188022572 with English translation.
CN Office Action dated Nov. 10, 2021, in Application No. CN201811232377.4 with English Translation.
CN office action dated Nov. 24, 2021, in application No. CN20178084583 with English Translation.
CN Office action dated Oct. 29, 2021 in CN Application No. CN201710600395.2 with English translation.
Co-pending U.S. Appl. No. 17/573,509, filed Jan. 11, 2022.
Decision to Grant, dated Oct. 27, 2020, for Japanese Patent Application No. JP 2019- 031229, with partial translation.
English translation of CN201104273 description form worldwide.espacenet.com.
English translation of JP2004170350 description form worldwide.espacenet.com.
EP Extended Search Report dated Apr. 29, 2020 in EP Application No. 17881918.1.
EP Extended Search Report dated Dec. 4, 2020 in EP Application No. 18756696.3.
EP Extended Search Report dated Mar. 23, 2020 in EP Application No. 17807428.2.
EP Extended Search Report dated May 12, 2020 in EP Application No. 17859286.1.
EP Office Action dated Oct. 1, 2021, in application No. EP17807428.2.
EP Search Report dated Nov. 25, 2021, in Application No. EP21171305.2.
European Intention to Grant, dated Jan. 18, 2021, in EP Application No. 18208971.4.
European Intention to Grant, dated Jul. 9, 2020, in EP Application No. 18208971.4.
European Intention to Grant, dated Mar. 23, 2021, in EP Application No. 18208971.4.
European Intention to Grant, dated Sep. 21, 2020, in EP Application No. 19165771.7.
European Office Action dated Mar. 12, 2021 in EP Application No. 16852784.4.
European Office Action dated Mar. 20, 2020 in EP Application No. 16852784.4.
European Office Action dated May 3, 2021 in EP Application No. 17881918.1.
European Office Action dated Oct. 2, 2020 in EP Application No. 13777540.9.
European (Partial) Search Report dated Dec. 17, 2019 in EP Application No. 17807428.2.
Ex Parte Quayle Action, dated Feb. 2, 2021, in U.S. Appl. No. 16/335,222.
Extended European Search Report dated Oct. 13, 2021, for EP Application No. EP21163294.8.
Extended European Search Report dated Oct. 15, 2020 in EP Application No. 20182982.7.
Halio Automation Brochure, halioglass.com, dated Aug. 2019, 13 pages.
"Halio Rooftop Sensor Kit (Model SR500)," Product Data Sheet, Kinestral Technologies, 2020, 4 pp.
"Halio Smart-Tinting Glass System," Product Data Sheet, Kinestral Technologies, www.kinestral.com, copyright 2017, 4 pp.
IN First Examination Report dated Jul. 7, 2021 in Indian Patent Application No. 201917013204.
IN Office Action dated Dec. 17, 2021, in Application No. IN201917027304.
Indian Office Action dated Dec. 18, 2019 in IN Application No. 2371/KOLNP/2014.
Indian Office Action dated Jul. 7, 2021, in IN Application No. 201917013204.
Indian Office Action dated Jul. 9, 2020 in IN Application No. 201637038970.
Indian Office Action dated Jun. 10, 2021, in IN Application No. 202038025893.
International Preliminary Report on Patentability dated Oct. 1, 2020 issued in PCT/US2019/023268.
International Search Report and Written Opinion dated Nov. 25, 2020, in PCT Application No. PCT/US2020/047525.
International Search Report and Written Opinion dated Sep. 4, 2019, issued in PCT/US2019/023268.
Invitation to Pay Fees and Communication Relating to the Result of the Partial International Search, dated Jul. 12, 2019, issued in PCT/US2019/023268.
Japanese Office Action dated Jan. 27, 2021 in JP Application No. 2019-232669.
Japanese Office Action dated Mar. 10, 2020 in JP Application No. 2019-031229.
JP Decision to Grant a Patent dated Jul. 29, 2021, in JP Application No. 2019-232669.
JP Office Action dated Jan. 4, 2022, in Application No. JP2020-215729.
JP Office Action dated Oct. 12, 2021, in application No. JP2019531271 with Machine Translation.
Korean Notice of Decision to Grant dated Jun. 22, 2021 in KR Application No. KR10-2015-7026041, with English Translation.
Korean Notice of First Refusal dated Feb. 18, 2021 in KR Application No. KR10-2015-7026041.
Korean Notification of Provisional Rejection dated Jun. 22, 2021 in KR Application No. KR10-2016-7032512.
Korean Office Action, dated Feb. 16, 2021, for Korean Patent Application No. 10-2020-7002032 with English Translation.
Korean Office Action, dated Jun. 15, 2020, for Korean Patent Application No. 10-2020-7002032 with English Translation.
Korean Office Action, dated Jun. 7, 2021, for Korean Patent Application No. 10-2020-7002032, with English Translation.
Korean Office Action dated Mar. 30, 2020 in KR Application No. KR 10-2015-7026041, No translation.
KR Office Action dated Dec. 23, 2021, in application No. 1020197011968 with English Translation.
"Smart Glazing: Making smart-tinting glazing even smarter", Daylighting: Design & Technology for Better Buildings, Issue 20 (Jan./Feb. 2020), 5 pages.
Notice of Allowance dated Aug. 16, 2021 in U.S. Appl. No. 16/695,004.
Notice of Allowance dated Aug. 24, 2021 in U.S. Appl. No. 16/695,004.
Notice of Allowance, dated Jun. 18, 2020 in CN Application No. 201610645398.3, No Translation.
Notice of Allowance dated Oct. 27, 2021 in U.S. Appl. No. 16/335,222.
Partial European Search Report dated Jul. 6, 2021 for EP Application No. EP21163294.8.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Preliminary Amendment dated Jul. 1, 2021, in U.S. Appl. No. 17/305,132.
Preliminary Amendment dated Jul. 10, 2020 for U.S. Appl. No. 15/929,958.
Preliminary Amendment dated Mar. 8, 2021, in U.S. Appl. No. 17/249,595.

(56) References Cited

OTHER PUBLICATIONS

Preliminary Amendment dated Nov. 9, 2020 for U.S. Appl. No. 17/008,342.
Preliminary Amendment No. 2, dated Dec. 9, 2020 for U.S. Appl. No. 16/695,004.
Singapore Search Report dated May 29, 2020 in SG Application No. 10201608572S.
Smith, et al. "Measuring Cloud Cover and Brightness Temperature with a Ground Based Thermal Infrared Camera", (Feb. 2008), American Meteorological Society, vol. 47, pp. 683-693.
Taiwan Office Action dated May 13, 2021 in Taiwan Patent Application No. 106134521 with English Translation.
Taiwan Office Action dated Jul. 30, 2020 in ROC (Taiwan) Pat. Appln. No. 105121480, with English Translation.
Taiwanese Office Action dated Apr. 17, 2020 in TW Application No. TW 107102210, No translation.
Taiwanese Office Action dated Jun. 21, 2021 in TW Application No. TW 107106439, No translation.
Taiwanese Office Action dated Sep. 11, 2020 in TW Application No. 109103256, with English Translation.
Taiwanese Office Action dated Sep. 16, 2020 in TW Application No. 108143706, with English Translation.
TW Notice of Allowance dated Sep. 9, 2021, in application No. TW110106134.
TW Office Action dated Dec. 29, 2021, in application No. 110124070.
TW Office Action dated Oct. 26, 2021 in TW Application No. TW20170143996 with English translation.
TW Reissued Office Action dated Jul. 8, 2021, in Taiwanese Application No. 107106439.
U.S. Corrected Notice of Allowability dated Jan. 12, 2022, in U.S. Appl. No. 16/335,222.
U.S. Corrected Notice of Allowability dated Nov. 24, 2021, in U.S. Appl. No. 16/335,222.
U.S. Corrected Notice of Allowance dated Jan. 21, 2022 in U.S. Appl. No. 15/742,015.
U.S. Final Office Action dated Apr. 30, 2020 in U.S. Appl. No. 15/891,866.
U.S. Non Final Office Action dated Feb. 16, 2022 in U.S. Appl. No. 15/929,958.
U.S. Non Final Office Action dated Jan. 21, 2022, in U.S. Appl. No. 16/303,384.
U.S. Notice of Allowance (corrected) dated Jun. 9, 2020 in U.S. Appl. No. 15/442,509.
U.S. Notice of Allowance dated Apr. 14, 2021 in U.S. Appl. No. 16/335,222.
U.S. Notice of Allowance dated Apr. 22, 2021 in U.S. Appl. No. 15/742,015.
U.S. Notice of Allowance dated Aug. 3, 2021 in U.S. Appl. No. 16/335,222.
U.S. Notice of Allowance dated Aug. 12, 2020 in U.S. Appl. No. 16/013,770.
U.S. Notice of Allowance dated Aug. 12, 2021 in U.S. Appl. No. 16/335,222.
U.S. Notice of Allowance dated Aug. 19, 2021 in U.S. Appl. No. 15/742,015.
U.S. Notice of Allowance dated Aug. 7, 2020 in U.S. Appl. No. 15/891,866.
U.S. Notice of Allowance dated Dec. 20, 2021, in U.S. Appl. No. 15/742,015.
U.S. Notice of Allowance dated Dec. 30, 2021, in U.S. Appl. No. 15/742,015.
U.S. Notice of Allowance dated Feb. 8, 2022 in U.S. Appl. No. 15/762,077.
U.S. Notice of Allowance dated Jul. 23, 2020 in U.S. Appl. No. 16/013,770.
U.S. Notice of Allowance dated Mar. 31, 2021 in U.S. Appl. No. 15/742,015.
U.S. Notice of Allowance dated May 12, 2021 for U. S. U.S. Appl. No. 15/762,077.
U.S. Notice of Allowance dated May 13, 2021 in U.S. Appl. No. 16/695,004.
U.S. Notice of Allowance dated May 27, 2020 in U.S. Appl. No. 15/442,509.
U.S. Office Action dated Dec. 10, 2020 in U.S. Appl. No. 16/695,004.
U.S. Office Action dated Jan. 2, 2020 in U.S. Appl. No. 15/442,509.
U.S. Office Action dated Jan. 23, 2020 in U.S. Appl. No. 15/762,077.
U.S. Office Action dated Jun. 11, 2020 in U.S. Appl. No. 16/303,384.
U.S. Office Action dated Jun. 23, 2020 in U.S. Appl. No. 15/742,015.
U.S. Office Action dated Mar. 18, 2020 in U.S. Appl. No. 16/013,770.
U.S. Office Action dated Mar. 3, 2021 in U.S. Appl. No. 16/303,384.
U.S. Office Action dated Oct. 21, 2019 in U.S. Appl. No. 15/742,015.
U.S. Office Action dated Oct. 27, 2020 in U.S. Appl. No. 15/762,077.
U.S. Office Action dated Sep. 16, 2021, in U.S. Appl. No. 16/469,851.
U.S. Appl. No. 17/249,595, inventors Frank et al., filed on Mar. 5, 2021.
U.S. Appl. No. 17/305,132, inventors Brown et al., filed on Jun. 30, 2021.
U.S. Preliminary Amendment dated Oct. 30, 2019 for U.S. Appl. No. 16/013,770.
U.S. Appl. No. 63/080,899, inventor Makker et al., filed on Sep. 21, 2020.
AU Office Action dated Feb. 22, 2022, in Application No. AU2021200070.
Australian Examination Report dated Feb. 28, 2022, in Application No. 2017376447.
CN Office Action dated Apr. 25, 2022, in Application No. CN201980027469.5 with English translation.
CN Office Action dated Apr. 21, 2022 in Application No. CN201811232377.4 with English translation.
CN Office Action dated Apr. 27, 2022, in Application No. CN201780039437.8 with English translation.
CN Office Action dated Mar. 9, 2022, in Application No. CN201911184096.0.
CN Office Action dated Mar. 8, 2022, in Application No. CN201680063892.7 with English translation.
EP Office Action dated Mar. 4, 2022, in Application No. EP17859286.1.
European office action dated Mar. 18, 2022, in Application No. 13777540.9.
Humann, C., "Glare Control", Velux Build for Life Conference, presented Nov. 18, 2021. Retrieved from the internet from https://vimeo.com/647274396.
IN Office Action dated Dec. 18, 2019 in Application No. IN202038052140.
IN office action dated Mar. 4, 2022, in application No. 202038052140.
KR Office Action dated Apr. 27, 2022, in Application No. KR10-2016-7032512 with English Translation.
PCT International Preliminary Report on Patentability and Written Opinion dated Mar. 3, 2022, issued in PCT/US2020/047525.
Subramaniam, S., "Daylighting Simulations with Radiance using Matrix-based Methods", Lawrence Berkeley National Laboratory, Oct. 3, 2017, 145 pages.
TW Office Action dated Apr. 11, 2022, in Application No. TW106134521 with English Translation.
TW Office Action dated Mar. 16, 2022, in Application No. TW106143996 with English translation.
U.S Advisory Action dated Jun. 7, 2022 in U.S. Appl. No. 16/469,851.
U.S. Corrected Notice of Allowance dated May 18, 2022, in U.S. Appl. No. 16/303,384.
U.S. Notice of Allowance dated May 4, 2022 in U.S. Appl. No. 16/303,384.
U.S. Notice of Allowance dated May 18, 2022, in U.S. Appl. No. 15/762,077.
U.S. Office Action dated Apr. 1, 2022, in U.S. Appl. No. 16/469,851.
CA Office Action dated Oct. 4, 2022, in Application No. CA2991419.
CN Office Action dated Aug. 10, 2022, in Application No. CN201911184096.0 with English translation.
CN Office Action dated Jul. 7, 2022 in Application No. CN201780084583.2 with English translation.
CN Office Action dated May 31, 2022, in Application No. CN201880022572.6 With English Translation.

(56) References Cited

OTHER PUBLICATIONS

CN Office Action dated Sep. 5, 2022, in Application No. CN201780039437.8.
European Office Action dated Sep. 5, 2022 in Application No. EP18756696.3.
Extended European search report dated Oct. 10, 2022, in Application No. EP22161794.7.
JP Office Action dated Jul. 12, 2022, in Application No. JP2019-531271.
TW Office Action dated Jun. 29, 2022 In Application No. TW108109631 with English translation.
TW Office Action dated Sep. 13, 2022, in Application No. TW106134521 with English Translation.
U.S. Non-Final office Action dated Aug. 31, 2022 in U.S. Appl. No. 16/469,851.
U.S. Corrected Notice of Allowance dated Aug. 12, 2022 in U.S. Appl. No. 15/929,958.
U.S. Non-Final office Action dated Jul. 21, 2022 in U.S. Appl. No. 17/249,595.
U.S. Notice of Allowance dated Aug. 24, 2022 in U.S. Appl. No. 16/303,384.
U.S. Notice of Allowance dated Jul. 26, 2022, in U.S. Appl. No. 15/929,958.
U.S. Notice of Allowance dated Sep. 22, 2022 in U.S. Appl. No. 15/762,077.
U.S. Appl. No. 17/931,014, inventors Klawuhn et al., filed on Sep. 9, 2022.
AU Office Action dated Feb. 15, 2023, in Application No. AU2021200070.
AU Office Action dated Feb. 21, 2023, in Application No. AU2021200070.
Australian Examination Report dated Feb. 20, 2023, in Application No. AU2017376447.
CN Office Action dated Mar. 9, 2022, in Application No. CN201911184096.0 with English Translation.
CN Office Action dated Feb. 14, 2023 in Application No. CN201780084583.2 with English translation.
CN Office Action dated Jan. 5, 2023, in Application No. CN201980027469.5 with English translation.
European Office Action dated Feb. 22, 2023 for EP Application No. EP22197030.4.
JP Office Action dated Jan. 4, 2022, in Application No. JP2020-215729 with English Translation.
JP Decision to Grant a Patent dated Jul. 29, 2021, in JP Application No. 2019-232669 with English translation.
JP Office Action dated Jan. 10, 2023 in Application No. JP2019-531271 with English translation.
JP Office Action dated Jul. 12, 2022, in Application No. JP2019-531271 with English translation.
Taiwanese Office Action dated Jun. 21, 2021 in TW Application No. TW 107106439 with English translation.
TW Notice of Allowance and Search Report dated Sep. 9, 2021, in application No. TW110106134 with English Translation.
TW Office Action dated Dec. 19, 2022, in Application No. TW111117328 with English translation.
U.S. Corrected Notice of Allowance dated Feb. 16, 2023 in U.S. Appl. No. 17/304,832.
U.S. Final office Action dated Jan. 4, 2023 in U.S. Appl. No. 17/249,595.
U.S. Non-Final Office Action dated Mar. 14, 2023 in U.S. Appl. No. 17/008,342.
U.S. Notice of Allowance dated Feb. 1, 2023 in U.S. Appl. No. 17/304,832.
U.S. Notice of Allowance dated Mar. 1, 2023 in U.S. Appl. No. 15/762,077.
U.S. Notice of Allowance dated Mar. 13, 2023 in U.S. Appl. No. 16/469,851.
U.S. Notice of Allowance dated Mar. 16, 2023 in Application No. 17/305,132.
U.S. Notice of Allowance dated Mar. 24, 2023 in U.S. Appl. No. 16/469,851.
U.S. Appl. No. 18/150,146, Inventors Klawuhn et al., filed on Jan. 4, 2023.
Zhu, H. et al., "Understanding Radiance (Brightness), Irradiance and Radiant Flux," Energetiq Technology, Inc., Technical Note #004-Mar. 25, 2011, 2018, 4 Pages.
AU Office action dated Nov. 28, 2022, in AU Application No. AU2021200070.
CA Office Action dated Nov. 23, 2022, in Application No. CA2902106.
CN Office Action dated Oct. 14, 2022, in Application No. CN201880022572.6 With English Translation.
CN Office Action dated Sep. 5, 2022, in Application No. CN201780039437.8 with English translation.
TW Office Action dated Sep. 15, 2022 In Application No. TW110140343 with English translation.
U.S. Corrected Notice of Allowance dated Nov. 3, 2022 in U.S. Appl. No. 15/929,958.
U.S. Non-Final office Action dated Dec. 22, 2022 in U.S. Appl. No. 17/305,132.
U.S. Non-Final Office Action dated Dec. 6, 2022 in U.S. Appl. No. 16/303,384.
U.S. Non-Final Office Action dated Oct. 13, 2022, in U.S. Appl. No. 17/304,832.
U.S. Restriction Requirement dated Oct. 14, 2022, in U.S. Appl. No. 17/008,342.
AU Office Action dated Jul. 3, 2023, in application No. AU20220200523.
CA Office Action dated Apr. 11, 2023, in Application No. CA2991419.
CA Office Action dated Jun. 23, 2023, in Application No. CA3025827.
CN Office Action dated Sep. 1, 2023, in application No. CN20208072995.6.
EP Extended European Search report dated Jun. 1, 2023, in Application No. EP23151011.6.
EP Extended European Search report dated May 15, 2023, in Application No. EP22201987.9.
EP office action dated Apr. 14, 2023, in application No. EP17859286.1.
EP office action dated Jun. 30, 2023, in application No. EP13777540.9.
EP office action dated Jun. 30, 2023, in application No. EP20768741.9.
European Office Action dated Apr. 5, 2023 in Application No. EP21163294.8.
European Office Action dated Feb. 23, 2023 in Application No. EP17807428.2.
International Search Report and Written Opinion dated Sep. 8, 2023, in Application No. PCT/US2023/022140.
JP Office Action dated Aug. 16, 2022 in Application No. JP2021-142788 with English translation.
JP Office Action dated Jun. 6, 2023 in Application No. JP2022-127648 with English translation.
JP Office Action dated Mar. 7, 2023 in Application No. JP2021-142788 with English translation.
KR Office Action dated Dec. 3, 2021, in Application No. KR1020217028534 with English translation.
KR Office Action dated Dec. 27, 2021, in Application No. KR1020217030376 with English translation.
KR Office Action dated Jul. 31, 2023, in Application No. KR10-2022-7039319 with English translation.
KR Office Action dated Mar. 6, 2023 in Application No. KR10-2022-7028868 with English translation.
KR Office Action dated Oct. 17, 2022 in Application No. KR10-2021-7030376 with English translation.
TW Office Action dated Mar. 23, 2023 in Application No. TW20210146592 with English translation.
TW Office Action dated Oct. 17, 2022, in Application No. TW111114527 with English Translation.
U.S. Corrected Notice of Allowance dated Jun. 23, 2023, in U.S. Appl. No. 16/469,851.
U.S. Final office Action dated Jul. 27, 2023 in U.S. Appl. No. 16/303,384.

(56) References Cited

OTHER PUBLICATIONS

U.S. Non-Final Office Action dated Jul. 18, 2023, in U.S. Appl. No. 17/931,014.
U.S. Non-Final Office Action dated Jul. 20, 2023, in U.S. Appl. No. 17/305,132.
U.S. Non-Final Office Action dated May 9, 2023 in U.S. Appl. No. 17/753,098.
U.S. Non-Final Office Action dated May 11, 2023, in U.S. Appl. No. 16/982,535.
U.S. Notice of Allowance dated Apr. 3, 2023 in U.S. Appl. No. 16/469,851.
U.S. Notice of Allowance dated Jun. 22, 2023, in U.S. Appl. No. 17/008,342.
U.S. Notice of Allowance dated May 4, 2023 in U.S. Appl. No. 17/304,832.
U.S. Notice of Allowance dated Sep. 5, 2023, in U.S. Appl. No. 17/249,595.
U.S. Appl. No. 18/308,658, inventors Zedlitz; Jason David., filed on Apr. 27, 2023.
CA Office Action dated Feb. 11, 2022, in Application No. CA2902106.
Co-pending U.S. Appl. No. 17/753,098, filed Feb. 18, 2022.
IN Office Action dated Feb. 25, 2022 in Application No. IN202138016166.
U.S. Corrected Notice of Allowance dated Feb. 22, 2022 in U.S. Appl. No. 15/762,077.
CN Office Action dated Sep. 1, 2023, in application No. CN20208072995.6 with English Translation.
CN Office Action dated Sep. 26, 2023, in Application No. CN202210751723.X.
JP Office Action dated Sep. 12, 2023, in application No. JP2022-180244 with English Translation.
U.S. Notice of Allowance dated Sep. 29, 2023 in U.S. Appl. No. 17/008,342.
CA Office Action dated Nov. 2, 2023 in CA Application No. CA3047093.
TW Office Action dated Oct. 24, 2023 in TW Application No. 111136120, with English Translation.
U.S. Appl. No. 18/486,197, inventors Brown et al., filed on Oct. 13, 2023.
EP Extended European Search report dated Jan. 2, 2024 in EP Application No. 23172663.9.
EP Office Action dated Nov. 9, 2023 in EP Application No. 21171305.2.
JP Office Action dated Dec. 26, 2023 in JP Application No. 2022-127648 with English Translation.
U.S. Final Office Action dated Dec. 18, 2023 in U.S. Appl. No. 17/931,014.
U.S. Notice of Allowance dated Dec. 5, 2023 in U.S. Appl. No. 16/982,535.
U.S. Notice of Allowance dated Dec. 15, 2023 in U.S. Appl. No. 16/982,535.
U.S. Notice of Allowance dated Dec. 22, 2023 in U.S. Appl. No. 17/753,098.
U.S. Notice of Allowance dated Jan. 16, 2024 in U.S. Appl. No. 17/753,098.
U.S. Notice of Allowance dated Jan. 17, 2024 in U.S. Appl. No. 17/305,132.
U.S. Appl. No. 18/404,661 inventor Brown S, filed on Jan. 4, 2024.

* cited by examiner

DGP: Daylight Glare Probability. Guideline is <35%
Two zone solution reduced amount of time Full Tint 4 is required

- 30 Foot-Candle (FC) considered minimum for lighting
- Daylight zone provides ~10x the light of all Tint 4 case

| Date | Time | Illuminance Levels [FC] | | Daylight Glare Probability [DGP] | |
|---|---|---|---|---|---|
| | | All Clear | Vision Tinted | All Clear | Vision Tinted |
| 21-Jun | 8 AM | 91 | | 26% | |
| | 10 AM | | 106 | | 25% |
| | 12 PM | | 57 | | 26% |
| | 2 PM | | 109 | | 24% |
| | 4 PM | 92 | | 27% | |
| | 6 PM | 36 | | 22% | |
| 21-Sep | 8 AM | | 61 | | 27% |
| | 10 AM | | 290 | | 45% |
| | 12 PM | | 367 | | 45% |
| | 2 PM | | 270 | | 45% |
| | 4 PM | | 48 | | 21% |
| | 6 PM | 17 | | 19% | |
| 21-Dec | 8 AM | 116 | | 29% | |
| | 10 AM | | 172 | | 45% |
| | 12 PM | | 432 | | 44% |
| | 2 PM | | 165 | | 43% |
| | 4 PM | | 23 | 23% | |
| | 6 PM | 1 | | 1% | |

Electric lighting needed
All Tint 4 needed

*FIG. 11*

ADJUSTING INTERIOR LIGHTING BASED ON DYNAMIC GLASS TINTING

CROSS-REFERENCES TO RELATED APPLICATIONS

This application is a national phase application under 35 U.S.C. § 371 of International PCT application PCT/US18/19737, titled "ADJUSTING INTERIOR LIGHTING BASED ON DYNAMIC GLASS TINTING" and filed on Feb. 26, 2018; International PCT PCT/US18/19737 claims benefit of and priority to U.S. Provisional Patent Application 62/464,299, filed on Feb. 27, 2017 and titled "ADJUSTING INTERIOR LIGHTING BASED ON DYNAMIC GLASS TINTING;" International PCT Application PCT/US18/19737 is also a continuation-in-part of International PCT application PCT/US16/55005 (designating the United States), filed on Sep. 30, 2016 and titled "METHODS OF CONTROLLING MULTI-ZONE TINTABLE WINDOWS," which claims benefit of and priority to U.S. Provisional Patent Application 62/236,032, filed on Oct. 1, 2015 and titled "METHODS OF CONTROLLING MULTI-ZONE TINTABLE WINDOWS; International PCT application PCT/US16/55005, and which is a continuation-in-part of U.S. patent application Ser. No. 14/137,644 (now U.S. Pat. No. 9,341,912), filed on Dec. 20, 2013 and titled "MULTI-ZONE EC WINDOWS;" U.S. patent application Ser. No. 14/137,644 is a continuation-in-part of International PCT application PCT/US13/69913 (designating the United States), filed on Nov. 13, 2013 and titled "MULTI-ZONE EC WINDOWS," which claims benefit of and priority to U.S. Provisional Patent Application No. 61/725,980, titled "MULTI-ZONE EC WINDOWS" and filed on Nov. 13, 2012 and U.S. Provisional Patent Application No. 61/740,651, titled "MULTI-ZONE EC WINDOWS" and filed on Dec. 21, 2012; U.S. patent application Ser. No. 14/137,644 is also a continuation-in-part of International PCT application PCT/US13/31098, filed on Mar. 13, 2013 and titled "PINHOLE MITIGATION FOR OPTICAL DEVICES," which claims benefit of and priority to U.S. Provisional Patent Application No. 61/610,241, titled "PINHOLE MITIGATION FOR OPTICAL DEVICES" and filed on Mar. 13, 2012; all of these applications are hereby incorporated by reference in their entireties and for all purposes.

FIELD

Certain embodiments disclosed herein relate to controllers and methods for controlling one or more tintable windows and/or other building systems.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken and reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

SUMMARY

Certain aspects pertain to methods and systems for adjusting building systems, e.g., adjusting interior lighting based on dynamic glass tinting, for maintaining environmental conditions. One aspect pertains to control logic for adjusting interior lighting to augment color rendering and/or offset contrast ratio by one or more tinted windows in a room.

Thin-film optical devices, for example, electrochromic devices for windows, and methods and controllers for controlling transitions and other functions of tintable windows using such devices are described herein. Certain embodiments comprise an electrochromic window having two or more tinting (or coloration) zones, e.g. formed from a monolithic electrochromic device coating as physically separate zones or where tinting zones are established in the monolithic device coating. Tinting zones may be defined by virtue of the means for applying electrical potential to the electrochromic device and/or by a resistive region between adjacent tinting zones and/or by physical bifurcation of the device into tinting zones. For example, a set of bus bars may be configured to apply potential across each of the separate tinting zones of the monolithic electrochromic device to tinting zones selectively. Methods may also apply to a group of one or more tintable windows, where individual windows are tinted independently of others in order to maximize occupant experience, i.e. glare control, thermal comfort, etc.

Certain aspects pertain to an insulated glass unit (IGU) comprising a first lite comprising a first electrochromic device disposed on a first transparent substrate and comprising a plurality of independently-controllable tinting zones and a resistive region between adjacent independently-controllable tinting zones. The IGU further comprising a second lite and a spacer between the first and second lites. In one case, the second lite comprises a second electrochromic device disposed on a second transparent substrate. In one case, the IGU further comprises a daylighting zone located, e.g., in a top portion of the IGU, wherein the daylighting zone comprises one or more tinting zones held in the bleached state to allow sunlight to pass through the first and second lites.

One aspect pertains to a method of automatically controlling color of light in a room having one or more tintable windows. The method includes determining adjustments in artificial interior lighting in the room to obtain a desired color of light and sending control signals over a communication network to adjust the artificial interior lighting. The adjustments are determined based on a current tint state of each of the one or more tintable windows. In one example, the desired color of light in the room is associated with diminishing a contrast ratio in an occupancy region to within an acceptable range or below a maximum contrast ratio.

One aspect pertains to a controller for automatically controlling color of light in a room having one or more tintable windows. The controller includes a computer readable medium having control logic and a processor in communication with the computer readable medium and with the one or more tintable windows via a communication network. The control logic is configured to determine adjustments to artificial interior lighting in the room to obtain a desired color of light in the room, wherein the adjustments are determined based on a current tint state of the one or more tintable windows and send control signals over the communication network to adjust the artificial interior lighting.

One aspect pertains to a method of controlling environmental factors of a scene in a workplace having one or more tintable windows. The method includes determining a type of workplace and a type of occupancy, defining a set of environmental factors in the scene based on availability of control of building systems, calculating target levels for the environmental factors of the scene based on the type of the workplace and the type of occupancy, determining adjustments to the building systems for obtaining the target levels for the environmental factors, wherein the adjustments are determined based on current tint level of the one or more tintable windows, and sending control signals over a communication network to adjust the building systems.

One aspect pertains to a controller for automatically controlling environmental factors of a scene in a workplace having one or more tintable windows. The controller includes a computer readable medium having control logic and a processor in communication with the computer readable medium and with the one or more tintable windows via a communication network. The control logic is configured to determine occupancy in the workplace, determine a type of workplace and a type of occupancy, define a set of environmental factors in the scene based on availability of control of building systems, calculate target levels for the environmental factors of the scene based on the type of the workplace and the type of occupancy, determine adjustments to the building systems for obtaining the target levels for the environmental factors, wherein the adjustments are determined based on current tint level of the one or more tintable windows, and send control signals over a communication network to adjust the building systems.

These and other features and embodiments will be described in more detail below with reference to the drawings.

BRIEF DESCRIPTION OF THE DRAWINGS

FIG. 11 is a chart of a tinting schedule for a two-zone tintable window including illuminance levels and DGP values, according to an embodiment.

DETAILED DESCRIPTION

Figure 1A:
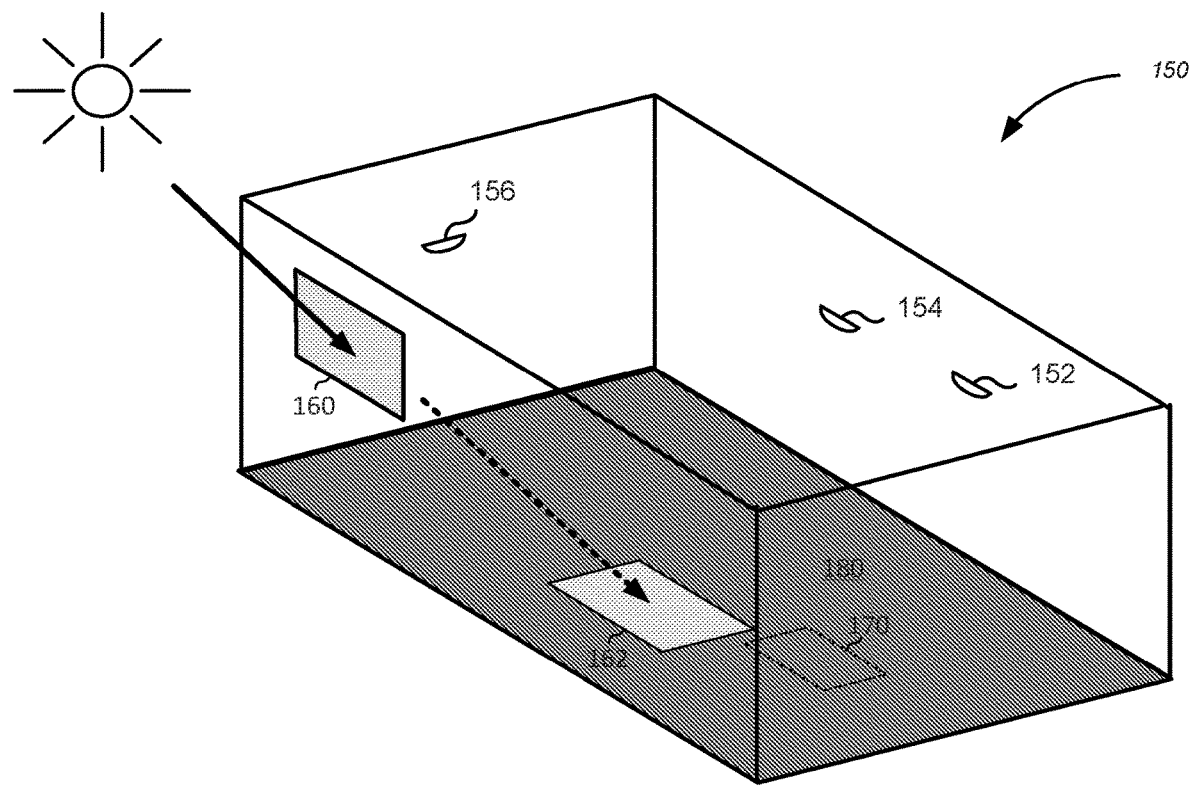
FIG. 1A is a schematic drawing of a perspective view of a room having a tintable window, according to an implementation.

In the following description, numerous specific details are set forth in order to provide a thorough understanding of the presented embodiments. The disclosed embodiments may be practiced without some or all of these specific details. In other instances, well-known control operations have not been described in detail to not unnecessarily obscure the disclosed embodiments. While the disclosed embodiments will be described in conjunction with the specific embodiments, it will be understood that it is not intended to limit the disclosed embodiments. Certain embodiments described herein, although not limited as such, work particularly well with electrochromic devices. Certain embodiments are described in relation to techniques for controlling one or more tintable windows or controlling tinting zones in multi-zone windows. It would be understood that these techniques may also be used to tint individual windows in a group (or zone) of tintable windows, in multi-zone windows, or in combinations of such windows. In addition or alternatively, these techniques can be used to control various building systems including a system having one or more tintable windows.

I. Introduction to Tintable Windows

Certain implementations described herein are related to controlling tinting and other functions tintable windows (e.g., electrochromic windows). In some implementations, the tintable window is in the form of an insulated glass unit comprised of two or more lites and a spacer sealed between the lites. Each tintable window has at least one tintable lite/pane with an optically switchable device. Some examples are described herein with respect to a tintable window having an electrochromic lite having an electrochromic device disposed on a transparent substrate such as glass. In one implementation, the electrochromic lite has a monolithic electrochromic device disposed over at least a portion of the substrate that is in the viewable area of the tintable window. Detailed examples of methods of fabricating electrochromic lites with multiple tinting zones can be found in U.S. patent application Ser. No. 14/137,644 (issued as U.S. Pat. No. 9,341,912), titled "Multi-Zone EC Windows" and filed on Mar. 13, 2013, which is hereby incorporated by reference in its entirety.

As mentioned above, certain techniques discussed herein pertain to controlling tintable (e.g., in a zone and/or multi-zone windows) and/or control functions of other systems in the building.

—Resistive Region in Multi-Zone Windows

Some techniques discussed herein pertain to independently controlling each of the tinting (or coloration) zones in a multi-zone tintable window such as a multi-zone electrochromic window. A "resistive region" (also sometimes referred to herein as "resistive zone") generally refers an area in an electrochromic device where one or more layers of the electrochromic device have their function impaired, either partially or completely, but device function is not cut off across the resistive zone. In one implementation, tinting zones of an electrochromic lite are defined by virtue of resistive regions between adjacent tinting zones by techniques used to apply a potential to the electrochromic device to independently control tinting in the tinting zones. For example, a single set of bus bars or different sets of bus bars can be configured to be able to apply potential independently to each tinting zone independently to thereby tint them selectively. With respect to the above-mentioned resistive region, this region allows independently controllable tinting of adjacent tinting zones of a single monolithic electrochromic device without destroying the tinting functionality in the resistive region itself. That is, the resistive region can be tinted. One advantage of these techniques is that scribe lines cutting through the electrochromic device between tinting zones are not used. These scribe lines can create non-functioning areas of the electrochromic device, which can create a visually perceptible bright line in the viewable area of the window when tinted. Instead, a resistive region can have gentle tinting gradient between adjacent tinting zones held in different tint states. This tinting gradient blends the transition in tint between adjacent tinting zones to soften the appearance of the transition area between tinting zones.

In some examples, a multi-zone window has a resistive region in an area between adjacent tinting zones of a monolithic electrochromic device. These resistive regions may allow for more uniform tinting fronts, e.g., when used in combination with bus bar powering mechanisms. In certain examples, the resistive regions are relatively narrow having a width of between about 1 mm and 1000 nm wide, or relatively wide having a width of between about 1 mm and about 10 mm wide. In most cases, the electrochromic materials in the resistive regions tint so that they do not leave a bright line contrast effect typical of conventional laser isolation scribe lines. Thus, in other examples, a resistive region may be, for example, wider than 1 mm, wider than 10 mm, wider than 15 mm, etc.

The reason a resistive region is able to tint is because it is not a physical bifurcation of the electrochromic device into two devices, but rather a physical modification of the single electrochromic device and/or its associated transparent conductors within a resistive region. The resistive region is an area of the electrochromic device where the activity of the device, specifically the electrical resistivity and/or resistance to ion movement is greater than for the remainder of the electrochromic device. Thus one or both of the transparent conductors may be modified to have increased electrical resistivity in the resistive region, and/or the electrochromic device stack may be modified so that ion movement is slower in the resistive region relative to the electrochromic device stack in the adjacent tinting zones. The electrochromic device still functions, tints and bleaches, in this resistive region, but at a slower rate and/or with less intensity of tint than the remaining portions of the electrochromic device. For example, the resistive region may tint as fully as the remainder of electrochromic device in the adjacent tinting zones, but the resistive region tints more slowly than the adjacent tinting zones. In another example, the resistive region may tint less fully than the adjacent tinting zones or at a tint gradient.

Details of resistive regions and other features of multi-zone electrochromic windows are described in U.S. patent application Ser. No. 15/039,370, titled "MULTI-ZONE EC WINDOWS and filed on May 25, 2016, and international PCT application PCT/US14/71314, titled "MULTI-ZONE EC WINDOWS and filed on Dec. 18, 2014, both of which are hereby incorporated by reference in their entireties.

II. Tinting Considerations

There are motivations to control tint states of one or more tintable windows and other building systems for the benefit of an occupant and/or for the considerations of the building alone, e.g. energy savings, power requirements, and the like. Here, an "occupant" generally refers to an individual or individuals of a particular room or other space having one or more tintable windows being controlled and a "building" generally refers to the building management system (BMS) together with lighting, HVAC, and other building systems. Motivations related to occupancy include, for example, general wellness as can be affected by lighting in the room and the aesthetics of a tinted window or group of windows. Motivations include, for example, controlling glare from direct sunlight onto an occupant's workspace, visibility through the window to outside the building (their "view"), color of the tintable window and associated color of light in the room, and thermal comfort adjusted tint states to either block or transmit direct sunlight into the room. Although an occupant may want to generally avoid glare onto their workspace, they may also want to allow some sunlight through the window for natural lighting. This may be the case where an occupant prefers sunlight over artificial lighting from, for example, incandescent, light-emitting diode (LED), or fluorescent lighting. Also, it has been found that certain tintable windows may impart too much of a blue color to the room in their darker tint states. This blue color can be offset by allowing a portion of unfiltered daylight to enter the room and/or by artificial lighting. User motivations related to the building include lowering energy use through reduction of heating, air-conditioning, and lighting. For example, one might want to tint the windows to transmit a certain amount of sunlight through the window so that less energy is needed for artificial lighting and/or heating. One may also want to harvest the sunlight to collect the solar energy and offset heating demand.

Another consideration, perhaps shared by both the building manager and the occupant is related to security concerns. In this regard, it may be desirable for a window to be darkly tinted so that those outside a room cannot see the occupant. Alternatively, it may be desirable that a window be in a clear state so that, for example, neighbors or police outside the building can see inside the building to identify any nefarious activity. For example, a user or a building operator may set a window in an "emergency mode" which in one case may clear the windows.

A. Glare Control

In many cases, glare avoidance can be responsible for as much as 95% of tinting decisions made for tintable windows. Examples of methods of making tinting decisions for tintable windows that account for glare avoidance are described in detail in international PCT Application No. PCT/US15/29675, filed on May 7, 2015 and titled "CONTROL METHOD FOR TINTABLE WINDOWS," which is hereby incorporated by reference in its entirety. In these methods, using proprietary control logic trademarked under the name Intelligence® (by View, Inc. of Milpitas, California), glare is addressed in operations of logic Module A. In Module A, decisions are made to determine whether to adjust the tint state of a tintable window based on the penetration depth or glare region caused by solar radiation transmitted through the window into the room. If the penetration depth or glare region where the solar radiation impacts the room overlaps with the position or likely position of an occupant (occupancy region), the tintable windows in the facade are held in or transitioned to a darker tint state in order to reduce glare on this occupancy region. Existing algorithms tint e.g. a whole group of windows associated with a building space based on glare, at the expense of other user comfort considerations.

Methods herein provide granularity and flexibility to tinting decisions by independently tinting one or more windows of a group of tintable windows and/or individual tinting zones of one or more multi-zone windows, e.g. to address glare while also allowing natural daylight into the space and thus address multiple user comfort issues and/or building systems requirements simultaneously. For example, reducing glare is an objective that is often inconsistent with reducing the heating load of a building, increasing natural lighting, etc. In the winter, for example, the energy used to heat a room by the heating system can be reduced by clearing a tintable window to allow more solar radiation to enter the room, which can also generate a glare scenario in an occupancy region. In certain configurations described herein, a multi-zone tintable window (or individual windows of a group of windows) can be controlled to address this concern by limiting the area of the window (or subset of group of windows) placed in a darkened tint to those tinting zones that reduce glare on the location or likely location of the occupant in the room. Although many examples are described herein with respect to controlling tinting zones in a multi-zone tintable window, it would be understood that similar techniques would apply to an assembly of multiple tintable windows, each tintable window having one or more tinting zones. For example, an assembly of tintable windows can be controlled to limit the area of the assembly of windows placed in a darkened tint to those tintable windows and/or tinting zones within tintable windows that reduces glare on the occupancy region.

B. Adjusting Color Perception

Other implementations for controlling tintable windows in a particular way can reduce color perception of the tinted or bleached state window and/or of the color of light passing through the tinted or bleached state window. These implementations make use of optical properties that minimize perception of an undesirable color associated with a particular tint state.

As one example, a darkened tint state of an optically switchable device, e.g., an electrochromic device, may have a blue color which may be perceivable to an occupant. However, if a tinted window in the room is juxtaposed with a clear zone window which much daylight shines, the blue color of the tinted window may be less noticeable to the occupant. For example, a particular window may be in a darker tint state and might appear blue to the occupant. In one implementation of a glare reduction tinting configuration, adjacent or nearby windows can be placed in a clear state as long as they do not create glare for the occupant due to their relative position. The light coming through the clear window can reduce the perception of blue color that the occupant might otherwise perceive.

In another implementation, a diffusing light source such as a diffusing or scattering film adhered to tintable window may reduce the perception of blue color in the tinted window. For example, a diffusing or scattering film may be disposed on a mate lite to an electrochromic lite of an IGU. In another example, a diffusing or scattering film may be disposed on a surface of the lite without the optically switchable device such as an electrochromic device.

C. Light Harvesting

Other tinting configurations may involve maximizing light harvesting. Light harvesting is a concept by which solar radiation from outside the window is converted into electrical energy for use by the window, by the building, or for another purpose. Light harvesting can be accomplished using a photovoltaic film, other photovoltaic structure, or other light harvesting structure on an appropriate portion of a window such as on the mate lite of an IGU. In one example, light harvesting is accomplished with a photovoltaic cell provided in or on the electrochromic window.

One consideration is that photovoltaic cells or other light harvesting structures may be most efficient when incident light being collected comes at a normal or nearly normal direction. This can be facilitated by having a structure in the window that redirects incident light on the window to strike the photovoltaic cell at a normal or nearly normal direction to maximize energy generation. In some cases, a light diffuser or a horizontally directing structure can be used on a portion of a tintable window to direct light onto the photovoltaic film, other photovoltaic structure, or other light harvesting structure on an appropriate portion of a window such as on the mate lite.

Another consideration is that it may be desired in normal situations for photovoltaic films on a mate lite to be as transparent as possible. However, photovoltaic films made to be transparent are often relatively inefficient at converting sunlight to electrical energy in comparison to more opaque films or not just opaque films but rather films that perhaps scatter light more. Recognizing that there may be certain tinting zones in a region of a window that are normally responsible for preventing a glare scenario in the room, and therefore normally must be tinted and/or that there may be certain zones outside this region where an occupant would normally be able to view the outside environment. In one implementation, the tinting zones in this region are provided with more efficient for light harvesting, but more scattering or opaque photovoltaic films, than the zones outside this region. In another implementation, the tinting zones in this region are provided with photovoltaic films and the zones outside this region do not have photovoltaic films.

As with the scenario where incoming light is horizontally directed, reflected, scattered or diffused in an upper region of a window because that region produces most of the glare, similarly, an upper region of a tintable window can be outfitted with a more efficient, yet less optically pleasing type of photovoltaics films, according to another implementation.

—Exemplary Locations of Photovoltaic Cell on IGU Lite Faces

In certain implementations, a tintable window includes a photovoltaic (PV) cell/panel. The PV panel may be positioned anywhere on the window as long as it is able to absorb solar energy. For instance, the PV panel may be positioned wholly or partially in the viewable area of a window, and/or wholly or partially in/on the frame of a window. Details of examples of electrochromic windows with a PV cell/panel can be found in U.S. Provisional Patent Application 62/247,719, titled "PHOTOVOLTAIC-ELECTROCHROMIC WINDOWS" and filed on Mar. 25, 2016, which is hereby incorporated by reference in its entirety.

The PV cell/panel may be implemented as a thin film that coats one or more surfaces of a lite of a tintable widow. In certain implementations, the tintable window is in the form of an IGU with two individual lites (panes), each having two surfaces (not counting the edges). Counting from the outside of the building inwards, the first surface (i.e., the outside-facing surface of the outer pane) may be referred to as surface 1 (S1), the next surface (i.e., the inside-facing surface of the outer pane) may be referred to as surface 2 (S2), the next surface (i.e., the outside-facing surface of the inner pane) may be referred to as surface 3 (S3), and the remaining surface (i.e., the inside-facing surface of the inner pane) may be referred to as surface 4(S4). The PV thin film may be implemented on any one or more of surfaces 1-4.

In certain examples, a PV film is applied to at least one of the lite surfaces in an IGU or other multi-lite window assembly. Examples of suitable PV films are available from Next Energy Technologies Inc. of Santa Barbara, CA PV films may be organic semiconducting inks, and may be printed/coated onto a surface in some cases.

Conventionally, where a PV cell is contemplated for use in combination with a multi-zone electrochromic window, the EC device is positioned toward the building interior relative to the PV cell/panel such that the EC device does not reduce the energy gathered by the PV cell/panel when the EC device is in a tinted state. As such, the PV cell/panel may implemented on the outside-facing surface of the outer pane (lite) e.g., on surface 1 of an IGU. However, certain sensitive PV cells cannot be exposed to external environmental conditions and therefore cannot reliably be implemented outside-facing surface. For example, the PV cell may be sensitive to oxygen and humidity.

To address air and water sensitivity of such PV films, a film may be positioned on surface 2 or 3, which helps protect the film from exposure to oxygen and humidity. In some cases, the stack of electrochromic materials is positioned on surface 3 and the PV thin film is positioned on surface 2. In another example, the stack of electrochromic materials is positioned on surface 2 and the PV film is positioned on surface 3.

In one aspect, a PV film is positioned on S3 and the multi-zone window has the electrochromic device with multiple tinting zones on S2. In this case, one or more zones may be held in a bleached tint state such as in a daylighting tinting zone (e.g., in a transom window configuration) that allows natural light into the room at a high level. In this case, the sunlight is fed to the PV film on S3 while the other zones (e.g., lower zones in transom window configuration) can remain tinted, for example, for glare control. In this case, the PV film receives sunlight and is not starved for light.

4. Contrast Ratio

As used herein, a "contrast ratio" refers to contrast in intensities of light reflected from a surface illuminated by multiple light sources. The contrast ratio is described in most examples with respect to two areas of the surface illuminated by multiple light sources (referred to as a "first portion" and a "second portion"). The first portion refers to an area predominantly illuminated by a first light source providing illumination with a first intensity. The second portion refers to an area adjacent or surrounding the first portion, which is illuminated by illumination with a second intensity different than the first intensity. In one example, light transmitted through an aperture of an electrochromic window in its darkest tint state with a yellow hue generates a light projection of a blue hue on the top surface of a desk in a room. The light transmitted through the electrochromic window has a higher intensity than the ambient light illuminating the desk surface. Before an artificial light is activated, there is a contrast of intensities on the desk surface between the blue light reflected from the light projection on the desk in a first portion and an adjacent second portion of the desk area illuminated by ambient light in the room. Subsequently, an artificial light source providing red and yellow light is activated to illuminate the desk surface. The desk surface reflects light from the both the light projection of blue light and the red and yellow light from the artificial light source to reflect, blue, red, and yellow from the first portion. The desk surface also reflects the red and yellow light in the second portion illuminated mainly from the artificial light source. The red and yellow light from the artificial lighting can offset or "wash out" the contrast between the reflected light from the first portion and the second portion.

Figure 1B:
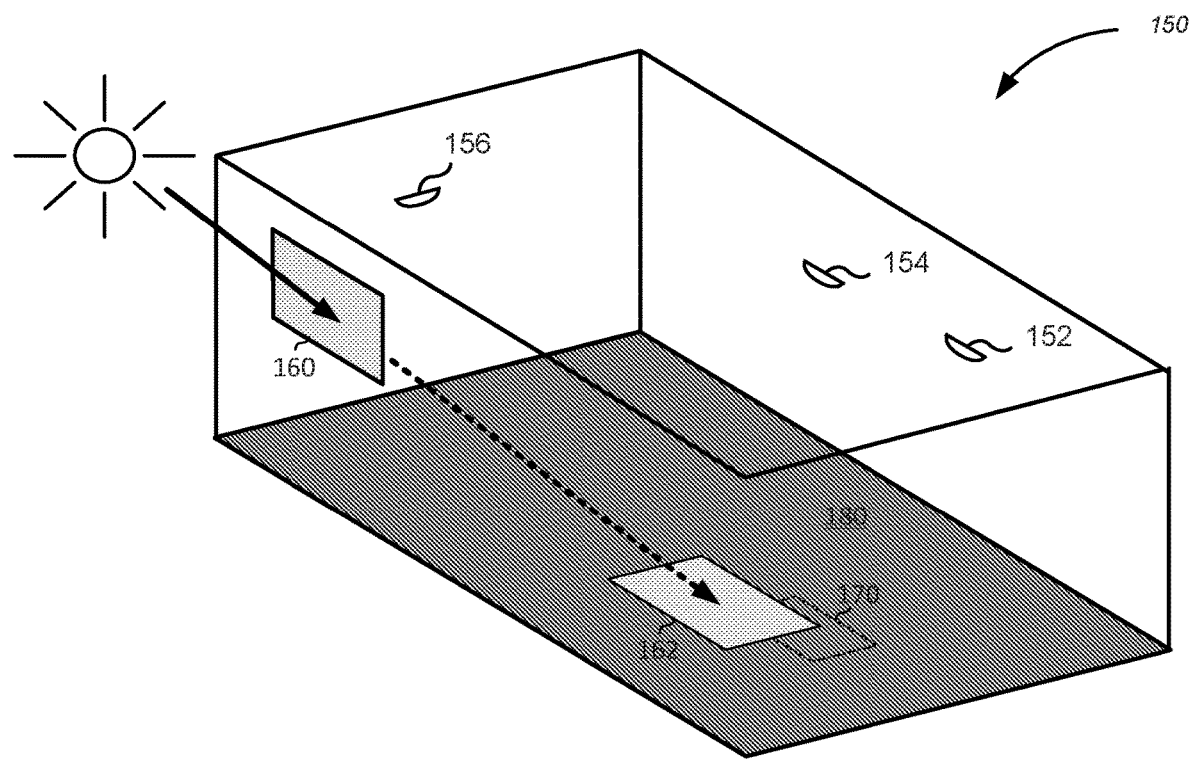
FIG. 1B is a schematic drawing of a perspective view of the room in FIG. 1A and including a depiction of a contrast, according to an implementation.
Figure 1C:
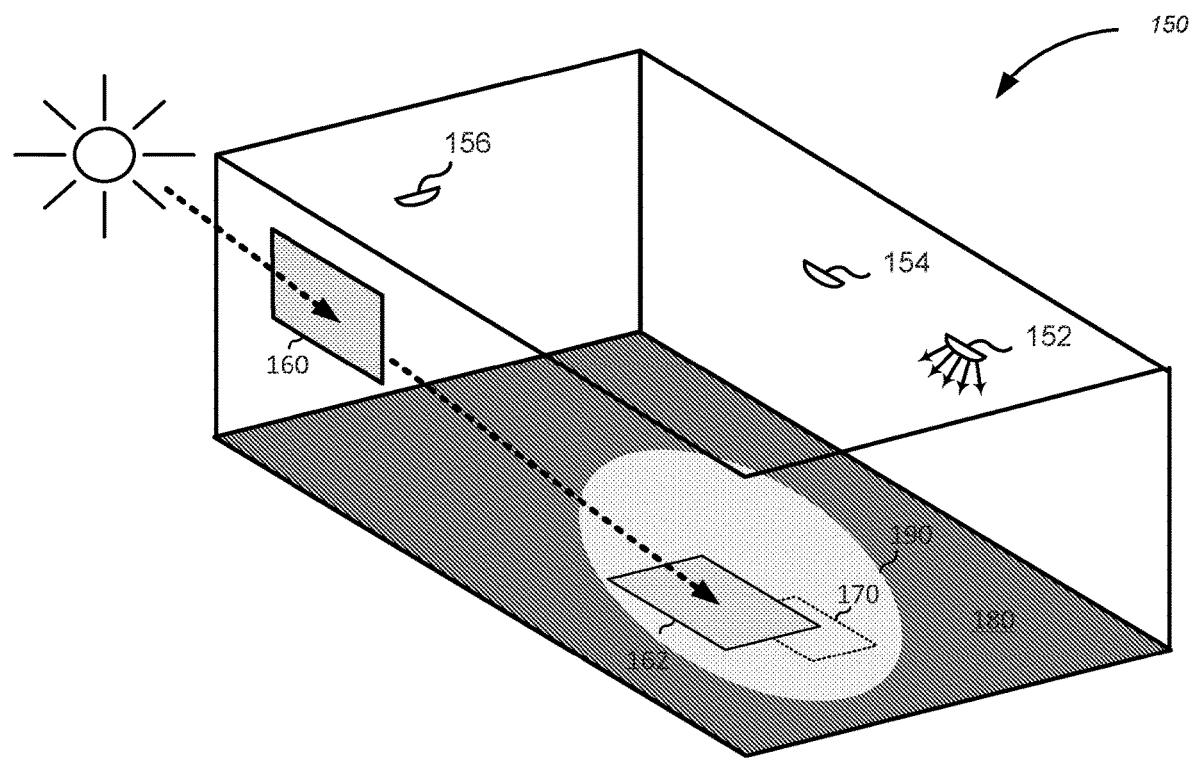
FIG. 1C is a schematic drawing of a perspective view of the room in FIG. 1A and including a depiction of the contrast in FIG. 1B offset by illumination from interior artificial lighting, according to an implementation.

FIGS. 1A-1C depict schematic drawings of a perspective view of a room 150 having a tintable window 160 in a vertical wall between the outside of a building and the inside of the room 150, according to implementations. The tintable window 160 is depicted in a darkened tint state. The room 150 also has a first artificial light source 152, a second artificial light source 154, and a third artificial light source 156 located on vertical walls of the room 150. The room 150 also has an occupancy region 170, for example, a desk or another workspace. In this example, the occupancy region 170 is defined as a two-dimensional area on the floor of the room 150. In one implementation, one or more of the first, second and third artificial light sources 156 can be tunable artificial lighting that can be tuned to various settings such as wavelength ranges, illuminance, and/or direction of illumination.

In the first scenario shown in FIG. 1A, sunlight (depicted as a solid arrow) is shown impinging a tintable window 160 in a tinted state. Light transmitted through the tintable window 160 (depicted as a dotted arrow) generates a two-dimensional light projection at a first portion 162 of the floor of the room 150. In this scenario, the first, second and third artificial light sources 152, 154, and 156 are turned off. The ambient light in the room illuminates the floor of the room 150 in a second portion 180 surrounding the first portion 162. The light transmitted through the tintable window has a higher intensity than the ambient light illuminating the floor. There is a contrast of intensities (contrast ratio) of reflected light from the lighter first portion 162 illuminated predominantly by the light transmitted through the tintable window and reflected light from the second portion 180 illuminated mainly by ambient light. The contrast at the interface between the first portion 162 and second portion 180 is not in the occupancy region 170 in this scenario.

In the second scenario shown in FIG. 1B, sunlight (depicted as a solid arrow) is shown impinging a tintable window 160 in a tinted state and the first, second and third artificial light sources 152, 154, and 156 are turned off. In this second scenario, the sun is higher in the sky than in the first scenario. Light transmitted through the tintable window 160 (depicted as a dotted arrow) generates a two-dimensional light projection that illuminates a first portion 162 on the floor of the room 150. The first portion 162 overlaps with the occupancy region 170. The light transmitted through the tintable window has a higher intensity than the ambient light illuminating the floor. There is a contrast of intensities (contrast ratio) of reflected light from the lighter first portion 162 illuminated predominantly by the light projection and reflected light from the second portion 180 surrounding by the first portion 162. In this scenario, the contrast at the interface between the first portion 162 and second portion 180 lies in the occupancy region 170.

The third scenario shown in FIG. 1C depicts an illumination scenario as shown in FIG. 1B with the addition of the activation of the first artificial light source 152 depicted by directional arrows. In this scenario, the first artificial light source 152 is illuminating a two-dimensional third portion 190 of the floor offsetting or "washing out" the contrast between the reflected light from the first portion 162 and the second portion 180 shown in FIG. 1B.

Figure 2A:
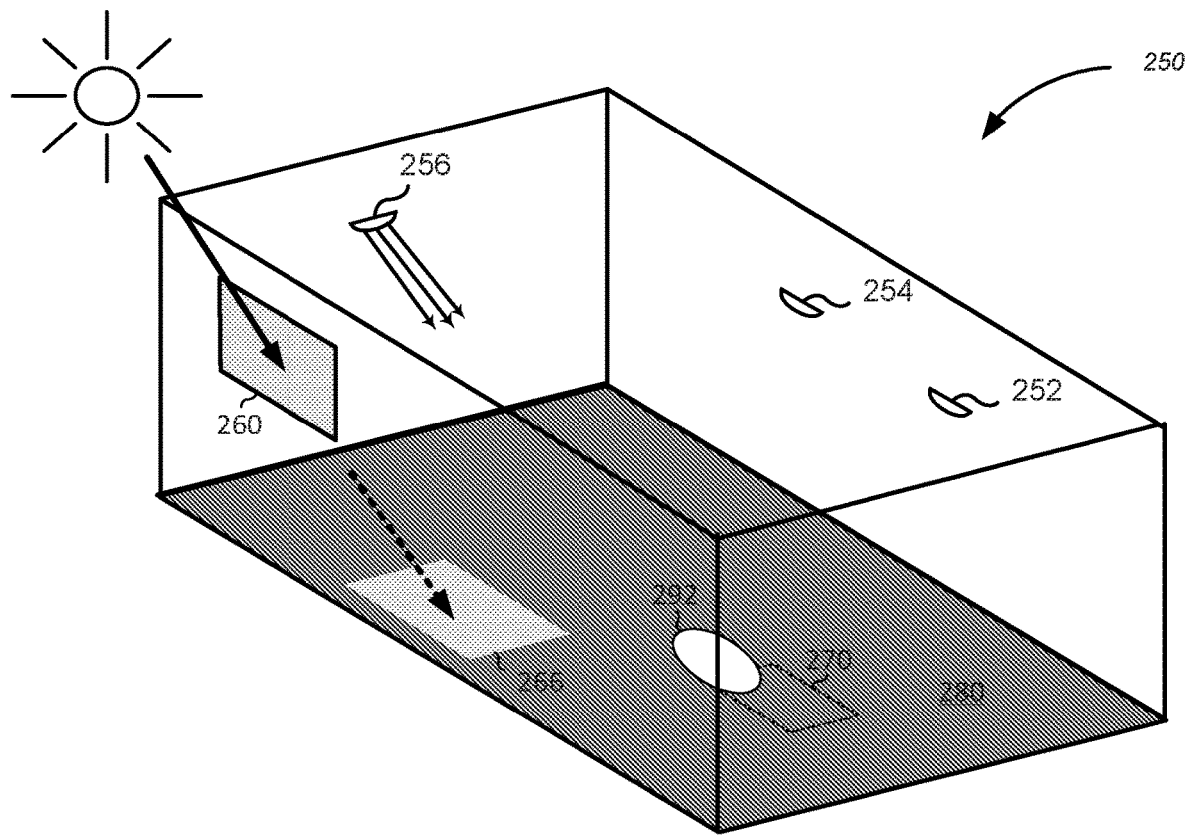
FIG. 2A is a schematic drawing of a perspective view of a room including a depiction of a contrast, according to an implementation.
Figure 2B:
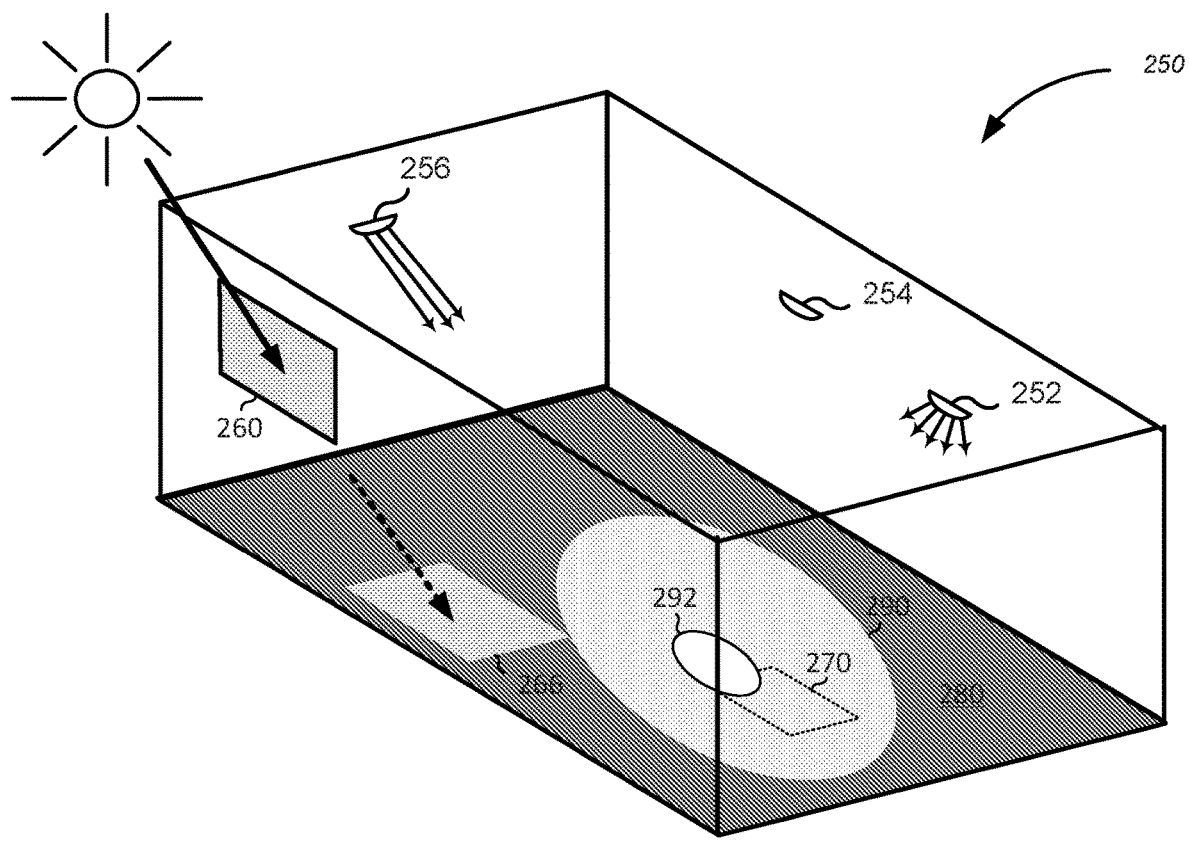
FIG. 2B is a schematic drawing of a perspective view of the room in FIG. 2A including a depiction of the contrast offset by illumination from interior lighting, according to an implementation.

FIGS. 2A-2B depict schematic drawings of a perspective view of a room 250 having a tintable window 260 in a vertical wall between the outside of a building and the inside of the room 250, according to implementations. The tintable window 260 is in a darkened tint state. The room 250 also has a first artificial light source 252, a second artificial light source 254, and a third artificial light source 256 located on vertical walls of the room 250. The room 250 also has an occupancy region 270, for example, a desk or another workspace. In this example, the occupancy region 270 is defined as a two-dimensional area on the floor of the room 250. In one implementation, one or more of the first, second and third artificial light sources 256 can be tunable artificial lighting that can be tuned to various settings such as wavelength ranges, illuminance, and/or direction of illumination.

In the fourth scenario shown in FIG. 2A, sunlight (depicted as a dotted arrow) is shown impinging a tintable window 260 in a tinted state. In this fourth scenario, light transmitted through the tintable window 260 (depicted as solid arrow) generates a two-dimensional light projection at a first portion 292 on the floor of the room 250 in close proximity to the vertical wall with the tintable window 260. The first portion 292 overlaps with the occupancy region 270. The light transmitted through the tintable window 260 has a higher intensity than the ambient light illuminating a second portion 280 of the floor around the first portion 292. There is a contrast of intensities of reflected light from the first portion 292 and the second portion 280.

The fifth scenario shown in FIG. 2B depicts a similar illumination scenario as shown in FIG. 2A with the addition of illumination from the first artificial light source 152 depicted by directional arrows. In this scenario, the third artificial light source 256 is activated and illuminating a two-dimensional third portion 290 of the floor offsetting the contrast between the reflected light from the first portion 292 and the second portion 280 shown in FIG. 2A.

Certain embodiments involve control logic that determines and communicates new settings for building systems such as tint states for tintable window(s) and settings for artificial lighting where the new settings are determined by the control logic to diminish the contrast ratio in an occupancy region such as a desk or other work surface. For example, the control logic may determine a setting for a tunable artificial light source to tune it to a wavelength of red and yellow light and/or a lighter tint level for a tintable window to decrease the deepness of blue in the light projection through the tinted window. In this example, the combination of red and yellow light from the artificial light source(s) and the blue light of the light projection through the tinted window combine to generate red, yellow, and blue light e.g., spectrum content closer to a natural light spectrum. This combination diminishes the contrast of color and intensity between the area illuminated mainly by a light projection of blue light and the area illuminated by the artificial light source.

In certain implementations, the control logic adjusts functions of the building systems based on a current contrast ratio in an occupancy region determined from feedback from the building systems. For example, the contrast ratio in an occupancy region can be determined based on the current illuminance in the occupancy region as determined by one or more of: measurements from one or more sensors in a building (e.g., camera, thermal sensors, etc.), current setting and location of artificial lighting, etc. The illuminance and color of ambient light can be measured using a spectrometer such as, for example, the commercially-available C-7000 spectromaster made by Sekonic®. The control logic adjusts the functions of the building systems to adjust the contrast ratio(s) in the occupancy region to acceptable levels. For example, the building systems may be adjusted so that the contrast ratio is below within an acceptable range or below a maximum limit. As another example, the building systems may be adjusted so that the contrast ratio is maintained within acceptable levels based on a lookup table of illuminance of artificial lighting that can be used to offset reflected light from light projections through electrochromic windows having different tint levels.

Other considerations for controlling tint states of one or more tintable windows and other building systems for the benefit of an occupant and/or for building alone will be described in other sections of the disclosure. For example, occupant wellness including circadian rhythm regulation is a consideration discussed below.

B. Examples of Tinting Configurations for Glare Control and/or Other Considerations The examples of configurations for glare reduction are described in this section in most cases with reference to multi-zone tintable windows. It would be understood that these examples can also apply in a similar way to a group of tintable windows or a combination of multi-zone windows and monolithic tintable windows.

a) Glare Control with Daylighting

In one particular glare reduction configuration, a multi-zone tintable window is controlled to place (hold or transition) tinting zones in a darkened state that are in an area of the tintable window that can reduce glare on the location or likely location of an occupant while placing the other tinting zones of the multi-zone tintable window in lighter tint states to allow ambient light to enter, for example, to reduce heating/lighting. This configuration may be used for "daylighting." As used herein, "daylighting" generally refers to an architectural strategy that uses natural light to satisfy illumination requirements and potential color offset while mitigating potential visual discomfort to occupants such as, for example, from glare. Glare can be from direct sunlight shining onto the occupant's workspace or in the eyes of the occupants. This configuration and other daylighting examples described herein can provide benefits including the reduction of the blue color from light in the tinted zones due to visual perception change with added natural light in the room. As mentioned above, it would be understood that these examples also apply in a similar way to one or more tintable windows held or transitioned to a darkened while other tintable windows are held in lighter tint states for the purpose of daylighting.

—Lighter Tinting at Lower Area

In this configuration, a multi-zone tintable window or a group of tintable windows is controlled such that has a lower area is lighter than the other areas. In one example of this glare control configuration, the lower tinting zone(s) of a multiple zone window in vertical wall are controlled to be tinted lighter than one or more higher tinting zones in the multi-zone window. As another example of this glare control configuration, the lower tintable windows in a vertical wall are controlled to be tinted lighter than one or more higher tintable windows in the vertical wall. The control configuration may be used, for example, in a scenario where the sun is at a mid to high position in the sky and the lower area may be in a low location that receives sunlight at such an angle that direct sunlight does not penetrate deep into the room and therefore does not create a glare in an occupancy region located near the window. In this case, the lower area can be cleared or controlled in a manner that allows maximum light into the room and to minimize heat load needed to heat the room, while the middle and/or top areas can be darkened to reduce glare on the occupancy region.

—Lighter Tinting at Top Area

In this configuration, a multi-zone tintable window or a group of tintable windows is controlled such that has a top area is lighter than the lower area. For example, the tinting zone (or multiple tinting zones at the top) may be tinted lighter than one or more tinting zones of the multi-zone tintable window or the top area of the window. In another example, the top area of the window may have a transparent substrate only (no optically switchable device). As another example, the upper tintable windows in a top area of a vertical wall are controlled to be tinted lighter than one or more other tintable windows in the vertical wall. In these examples, the lighter top area can act in a similar fashion to a "transom window" by allowing natural ambient light to enter the room at a high level while controlling glare near the vertical wall. This example and others daylighting examples described herein can provide benefits including the reduction of the blue color from light through the tinted zones/windows due to visual perception change with the added natural light in the room.

Figure 3:
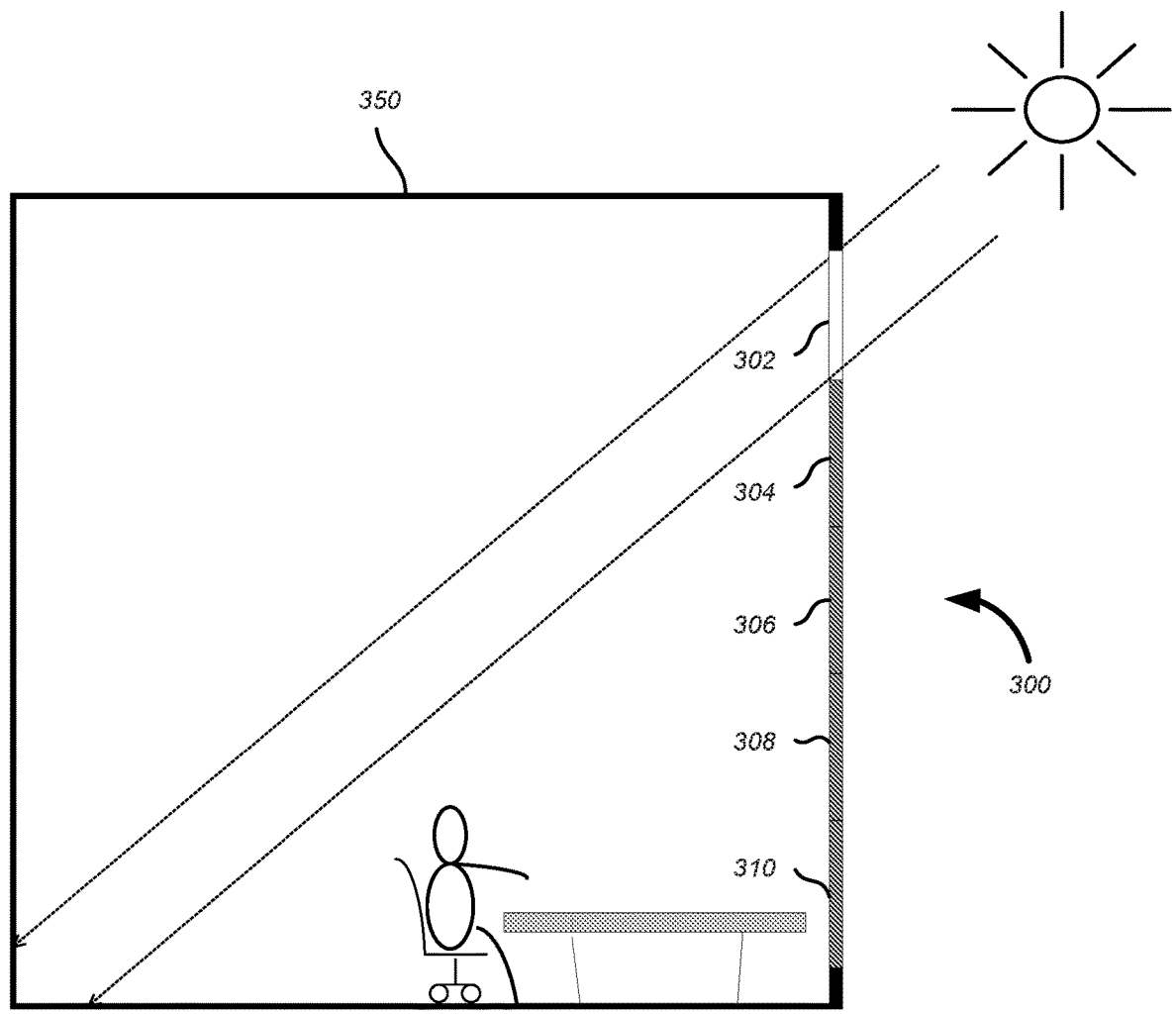
FIG. 3 is a schematic illustration of a tintable window with five tinting zones having a top tinting zone in a lighter tint state in a transom window configuration, according to an embodiment.

FIG. 3 is a schematic illustration of this example with a multi-zone tintable window 300 with five tinting zones, according to an embodiment. The multi-zone tintable window 300 is located in the external vertical wall of a room 350, between the inside and outside of a building. The multi-zone tintable window 300 comprises a first tinting zone 302 at the top of the window 300 and four other tinting zones 304, 306, 308, and 310 below the first tinting zone 302.

In the illustrated scenario shown in FIG. 3, the sun is at a high position in the sky. In this scenario, the tinting zones are controlled such that the first tinting zone 302 is in a first tint state, the lightest tint state (e.g., bleached or clear state), and the other tinting zones 304, 306, 308, and 310 are in a second tint state that is darker than the first tint state. With the illustrated tinting control configuration, the first tinting zone 302 allows natural light from the sun at a high altitude to enter the room while preventing glare from direct sunlight projecting onto the occupancy region with the desk and the occupant. Instead, the direct sunlight through the first tinting zone 302 projects (depicted by arrows) glare onto an unoccupied region of the room. Although five zones are used in this illustrated example, other numbers and arrangements of tinting zones can be used.

In another example this glare configuration, a multi-zone tintable window may include a top transparent substrate only portion with no optical device and a bottom portion with an optically switchable device having one or more tinting zones. For example, the multi-zone tintable window may have a monolithic electrochromic device with one or more tinting zones at a bottom portion of the window and a daylighting transparent substrate strip or zone at the top.

In another example of this glare configuration and possibly other configurations for other purposes, a multi-zone tintable window comprises one or more tinting zones that can be controlled to have a tinting gradient from one side to an opposing side, according to an embodiment. In one case, the top tinting zone has a tinting gradient that starts at a bleached tint state at one side and increases in tint toward the opposing side. That is, there is no abrupt change in tint as in physically separate zones, where high contrast between zones can be distracting and unattractive to the end user.

Figure 4:
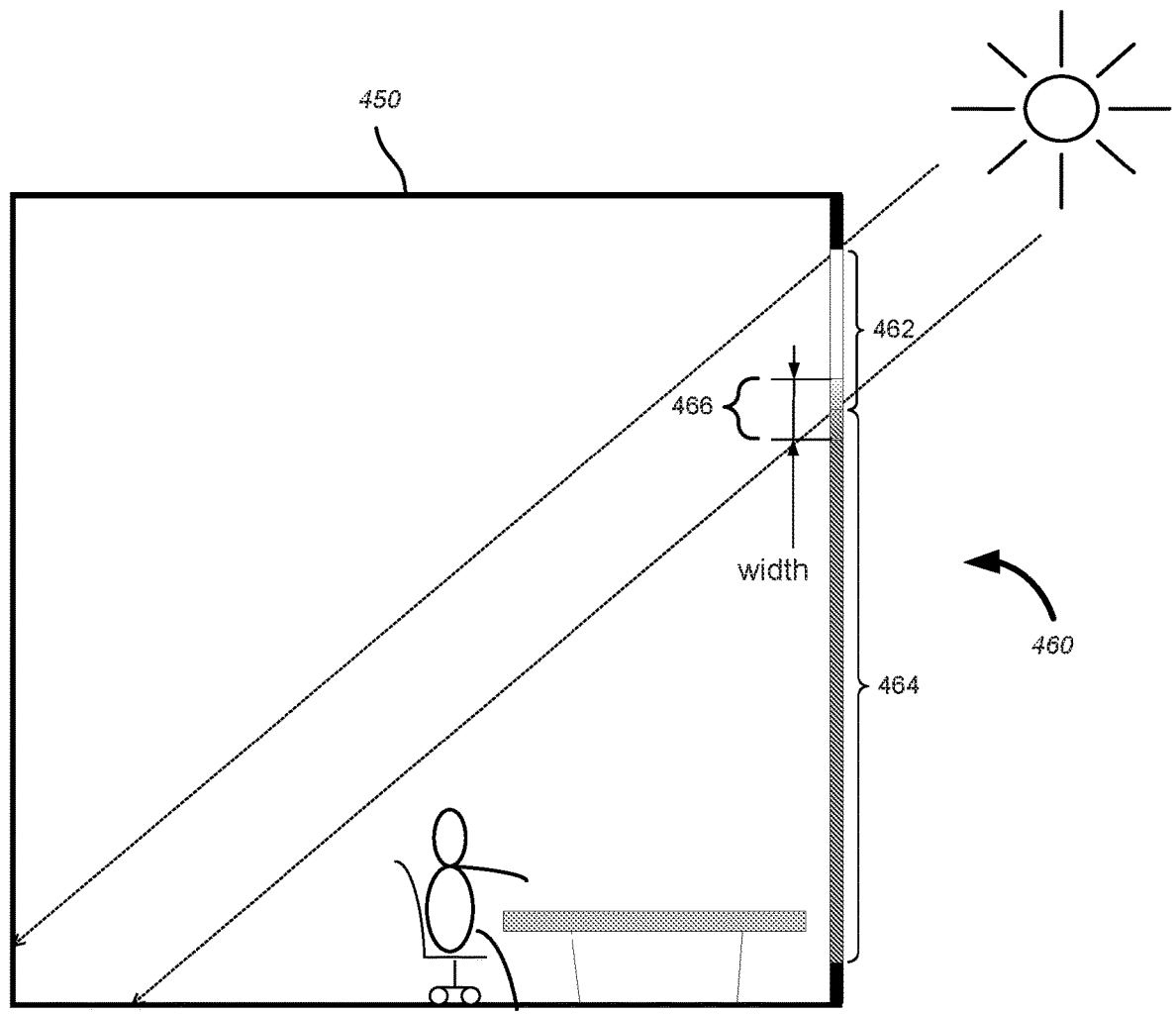
FIG. 4 is a schematic illustration of a multi-zone tintable window with two tinting zones having a top tinting zone in a lighter tint state than the bottom tinting zone, and with a resistive region with a tinting gradient between the tinting zone, according to an embodiment.

FIG. 4 is a schematic illustration of this example with a multi-zone tintable window 460 having a tinting gradient, according to an embodiment. The multi-zone tintable window 460 is located in the external vertical wall of a room 450, between the inside and outside of a building. The multi-zone tintable window 460 comprises a first tinting zone 462 at the top of the window 450 and a second tinting zone 464 below the first tinting zone 462. In the depicted illustration, the first tinting zone 462 is in a first tint state, which is the lightest tint state (e.g., bleached state), and the second tinting zone 464 is in a second tint state that is darker than the first tint state. With the illustrated tinting, the first tinting zone 462 allows natural light from the sun at a high altitude to enter the room while preventing glare from direct sunlight projecting onto the illustrated occupancy region having a desk and a seated occupant. The direct sunlight through the first tinting zone 462 projects (depicted by arrows) glare onto an unoccupied region at the back of the room. In this particular example, the multi-zone tintable window 460 also has a tinting gradient region 466 comprising a resistive region with a width. The tinting gradient region 466 has a tinting gradient between the tint states of the adjacent first and second tinting zones 462 and 464. That is, the tinting gradient distance (or width) may be measured, e.g., from the beginning of one zone where the % T begins to vary, through and including the change in % T into the adjacent zone, ending where the % T of that second zone becomes constant. In one aspect, the width of the gradient portion is about 10". In another aspect, the width of the gradient portion is in the range of 2" to 15." In another aspect, the width of the gradient portion is in the range of 10" to 15". In one aspect, the width of the gradient portion is about 5". In one aspect, the width of the gradient portion is about 2". In one aspect, the width of the gradient portion is about 15". In one aspect, the width of the gradient portion is about 20". In one aspect, the width of the gradient portion is about 20". In one aspect, the width of the gradient portion is at least about 10". In one aspect, the width of the gradient portion is at least about 16". In one aspect, the width of the gradient portion covers the entire width or about the entire width of the multi-zone tintable window. In this case, the window can have a continuous gradient from light to dark across the entire window. In another aspect, the width of the gradient portion less than 5 inches.

—Lighter Tinted Middle Area

Although certain examples of tinting of tintable windows in a glare reduction configuration have placed either the top area or lower area in a lighter tint state, other examples may darken top or lower areas to control glare while clearing or placing in a lighter tint state one or more middle areas between the top and bottom areas. In this case, a multi-zone tintable window or a group of tintable windows may be controlled such that a middle area of one or more tinting zones/windows is lighter than the other areas. For example, a multi-zone tintable window located very low or high in a room may have having a tinting configuration that clears or placing in a lighter tint state a middle zone or multiple middle zones. As another example, a single multi-zone tintable window spanning multiple floors e.g., an open mezzanine or loft in a single room may have a tinting configuration that clears a middle zone or multiple middle zones. As another example, one or more tintable windows in a middle area of a vertical wall are controlled to be tinted lighter than other tintable windows in the vertical wall.

Figure 5:
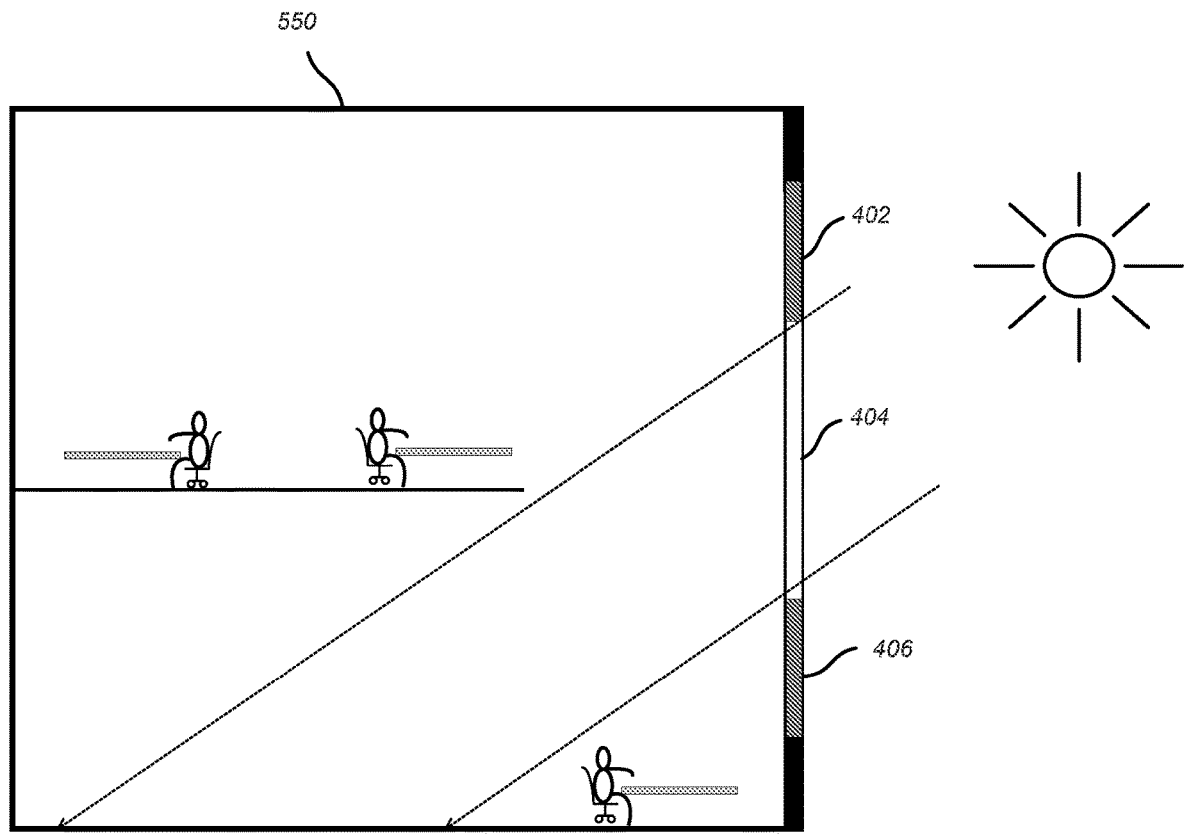
FIG. 5 is a schematic illustration of four vertically stacked tintable windows with a middle tintable window in a lighter tint state, according to an embodiment.

FIG. 5 is a schematic illustration of a room 550 having three tintable windows 502, 504, and 506, according to an aspect. The room has a second mezzanine floor with two desks and a lower floor with a single desk. The tintable windows 502, 504, and 506, are vertically arranged and located in an external vertical wall of the room 550, between the inside and outside of a building. In this illustration, the middle tintable window 504 is in a first tint state (e.g., bleached state) and the other tintable windows 502 and 506 are in a second tint state that is darker than the first tint state. With the illustrated tinting, the middle tintable window 504 allows natural light from the sun to enter the room 550 between the occupancy regions to reduce lighting/heating loads. This tinting also prevents glare from the direct sunlight projecting onto the occupancy regions on the mezzanine floor and the lower floor.

Although many examples of multi-zone tintable windows in a glare reduction configuration are described herein with multiple full width tinting zones arranged along the length of the window, other examples may include full length tinting zones arranged along the width of the window. Alternatively, it is contemplated that a multi-zone tintable window may comprise rectangular tinting zones (digitized design) corresponding to a two-dimensional array of locations along the length and width of the window.

b) Windows with Multiple Lites

In certain implementations, a tintable window comprises multiple lites in, for example, the form of an insulated glass unit (IGU) having a spacer sealed between lites. Another example is a laminate construction. Any of the tinting configurations shown and described with respect to illustrated examples herein can be used for a single lite or for one or more lites of an IGU or a laminate construction.

In one glare reduction tinting configuration, a tintable window comprises a first tintable lite in combination with a second mate lite that has either multiple tint zones or a single tint zone. In this tinting configuration, the combined transmissivity of light through multiple lites can be used to provide lower transmissivity than a single lite. For example, the reduced level of transmissivity through two tintable lites in an area where both lites are tinted to a darkest tint state may be below 1% T. This reduced transmissivity through the area of combined multiple tinted lites can be used to provide increased glare control in a multi-zone tintable window. That is, transmissivity of lower than 1% may be desired by some end users, for example, to further reduce glare. In these cases, a tintable window with multiple lites can be used to reduce transmissivity of lower than 1% as needed.

In one implementation of this tinting configuration, a multi-zone tintable window is in the form of an IGU with multiple lites, each lite having one or more tinting zones that can be tinted to reduce glare. At certain times of the year/day, tinting of the upper region of the window is appropriate because the sun is at an altitude such that sunlight through the upper region is a primary cause of glare across all portions of the window that receives sunlight. In other cases, other regions of the multi-zone tintable window may also benefit from this tinting. For example, a lower portion might as well.

According to one aspect, the regions of a multi-zone window that are determined by a control method to be the most appropriate for tinting to reduce glare are those that do not have a good view potential for the occupant. In other words, when an occupant is in their typical location in the room, it would be desirable if they can see out the window, for example, to view weather patterns. In one example, the control method determines to hold or transition the tint states of certain tinting zones to darker tint states to control glare on an occupancy region only if the region of the tinted zones does not block the view for an occupant.

In certain implementations, a multi-zone tintable window in the form of an IGU is controlled to have tint states that balance glare control with reduced energy consumption. In one case, the mate lite of the IGU may have one or more tinting zones that are designed to always or nearly always reduce glare. Although a mate lite generally refers to any substrate of the IGU, in one case, a mate lite is a substrate of the IGU on which the optically switchable device (e.g., electrochromic device) does not reside.

c) Directional Control of Sunlight

Figure 6:
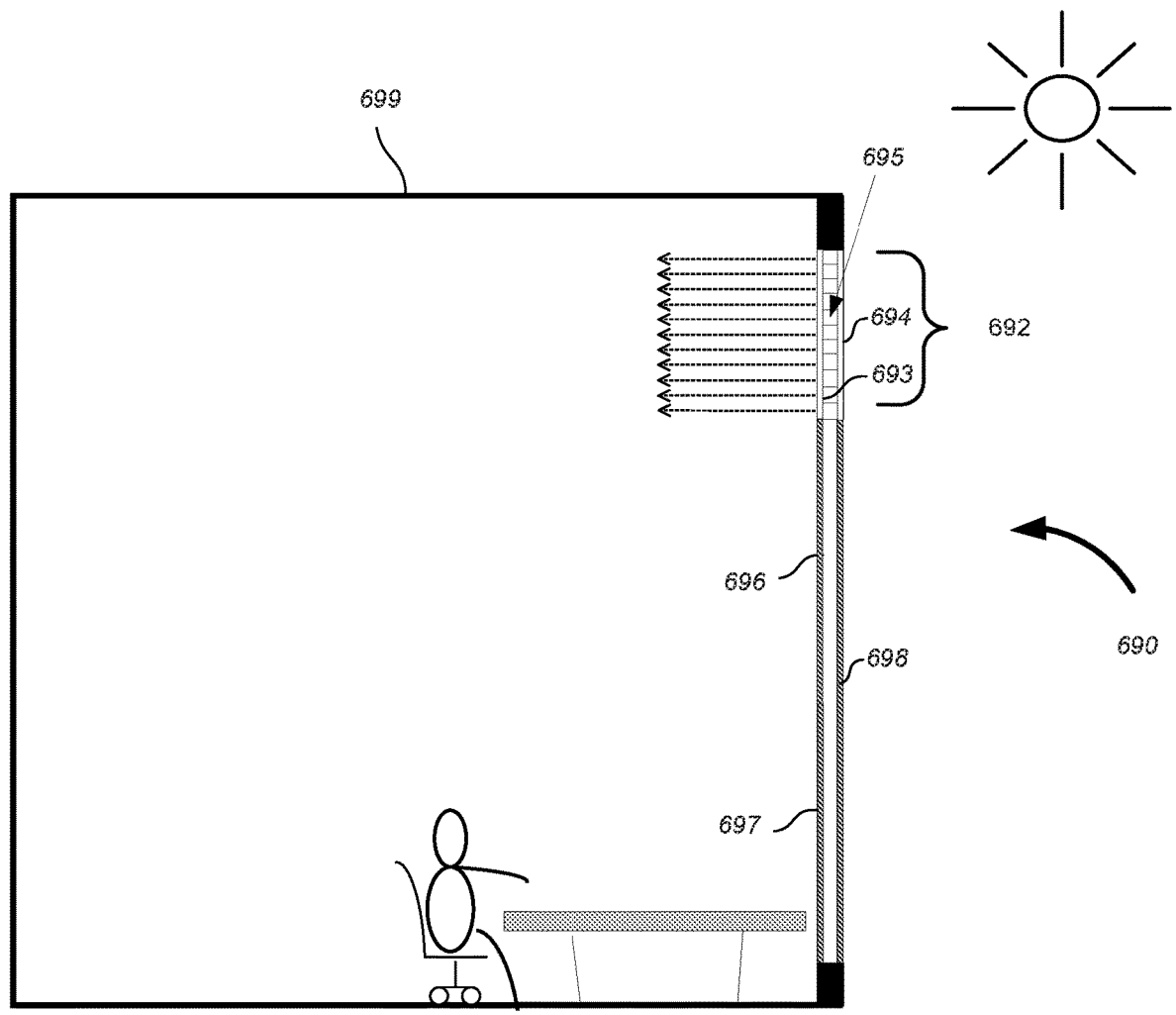
FIG. 6 is a schematic illustration of an example of a multi-zone tintable window in the form of an IGU wherein the top region has a series of light tubes directing light to the back of the room, according to an embodiment.

In one aspect, the mate lite or possibly some other structure in the IGU can be designed to direct sunlight in a horizontal direction regardless of the relative altitude of the sun with respect to the window position. The mechanism for directing light in a horizontal direction may include a very granular group of slats or window blinds structure in the interior of the IGU or the exterior of the IGU or associated with a mate lite. In one example, small mechanical blinds may be built into an electrically controllable region of the mate lite to redirect light. As another example, a series of light tubes may reside external or internal (region between lites) to the IGU to direct sunlight in a substantially horizontal direction. FIG. 6 is a schematic illustration of an example of a multi-zone tintable window 690 in the form of an IGU in vertical wall of a room 699, according to an embodiment. The IGU comprises an inner EC lite and an outer EC lite and a spacer (not shown) between the lites. The inner EC lite comprises a first tinting zone 693, a second tinting zone 696, and a third tinting zone 697. The outer EC lite comprises a first tinting zone 694 and a second tinting zone 698. In a top portion 692 of the window 690, the region 695 between the lites has a series of light tubes comprising reflective inner surfaces for channeling light. In other embodiments, region 695 may include light scattering elements, reflectors, diffusers, microshades (or similar MEMS devices) or the like. In this tinting configuration, the tinting zones 693 and 694 are cleared to allow sunlight to be transmitted, while directing or preventing the light from impinging on the occupant and thus avoiding a glare situation, while still allowing natural light into the space. In this configuration, sunlight passes through the tinting zone 694 at the outer surface of the outer EC lite at the top portion 692, is channeled through the light tubes, and is transmitted through the tinting zone 693 of the inner EC lite in the clear state. In some cases, the light may be directed somewhat to the back of the room as depicted. With the illustrated tinting configuration, the top portion 692 of the window 690 allows natural light from the sun at a position of high altitude to enter the room while preventing glare from the direct sunlight on the occupancy region with the desk and the occupant.

In another implementation, one or more of the lites of an IGU may have a region with a diffusing light source such that light impinging on this region is diffused or scattered so as to eliminate potential glare on the occupancy region. The diffusion or scattering may be achieved by applying a diffusing film or light directing film to the region. These films contain many scattering centers or other ways to allow light in but at the same time reduce the direct rays upon an occupancy region.

d) Multi-Zone Windows with Non-EC Films

In certain implementations, a tintable window includes an electrochromic device or other optically switchable device. In one implementation, the tintable window includes an optically switchable device and a photovoltaic film. In another implementation, a tintable window includes an optically switchable device and a thermochromic material layer and/or a photochromic material layer. Some description of tintable windows having a thermochromic or photochromic material can be found in U.S. patent application Ser. No. 12/145,892 (now U.S. Pat. No. 8,514,476), titled "MULTI-PANE DYNAMIC WINDOW AND METHOD FOR MAKING SAME" and filed on Jun. 25, 2008, which is hereby incorporated by reference in its entirety.

e) Other Examples of Daylighting Tinting Configurations

Certain aspects are related to tinting configurations with a at least one tinting zone or a tintable window that is held in the bleached tint state (daylighting tinting zone/window). A daylighting tinting zone/window allows natural light to pass into the room while controlling glare/temperature in the room by tinting other tinting zones/windows. These aspects are directed to motivations from the occupant/building. First, a daylight tinting zone/window can increase room illumination. That is, darker tint states can make a room look too dark to the occupant. The occupant may want to let in more light into the room while still controlling glare when the sun shines on a facade. Second, a daylight tinting zone/window can improve room light color. That is, darker tint states can make light in the room look colored (e.g., blue). Occupant may want to maintain a more natural room color while tinting to control glare. Third, a daylight tinting zone/window can improve the view through the window and the occupant's connection to outdoors. Occupant may want to identify current weather or other outdoor conditions when the window is in darker tint states. Fourth, a daylight tinting zone/window can maintain glare/heat control. That is, other tinting zones/windows will be tinted to protect occupants from glare and prevent heat from solar radiation.

In certain aspects, a daylighting tinting zone of a multi-zone window has a width that is sufficient to allow enough natural light into the room to reduce the color of light (e.g., blue hue) in the room while still providing glare/heating control. In one aspect, the width of the daylighting tinting zone is about 5". In another aspect, the width of the daylighting tinting zone is less than 22". In another aspect, the width of the daylighting tinting zone is between about 10" and 21". In one aspect, the width of the daylighting tinting zone is about 15".

Figure 7:
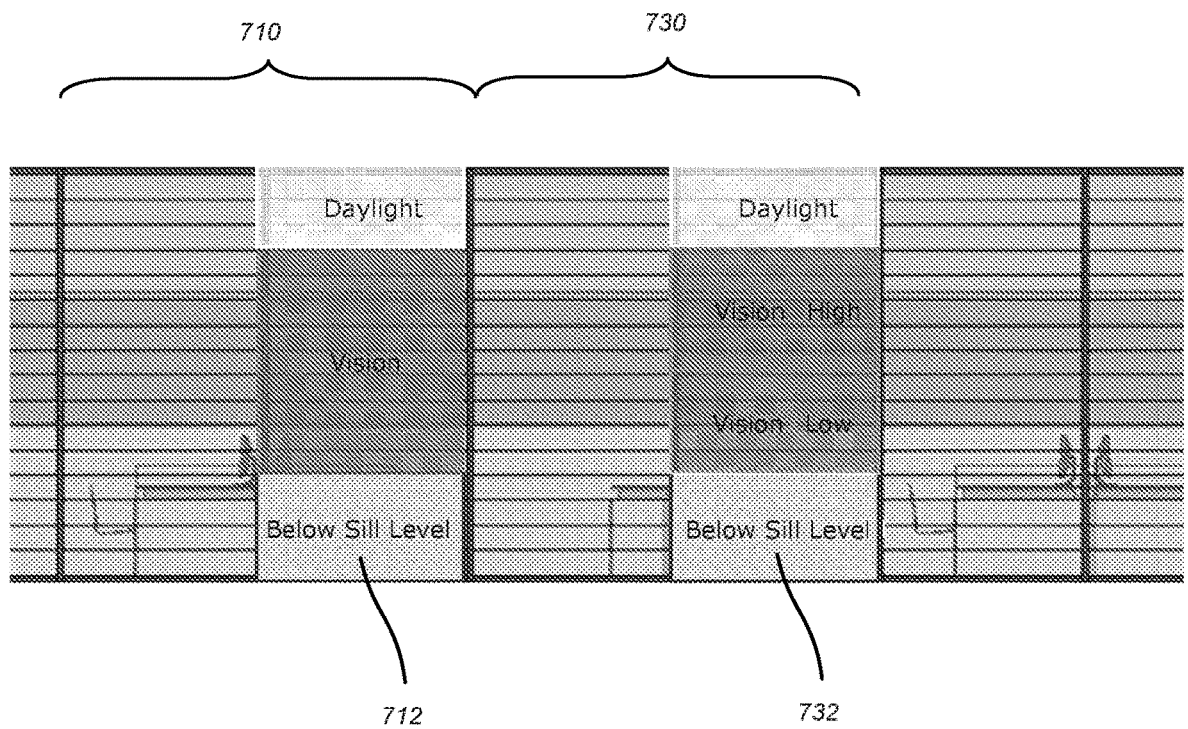
FIG. 7 is a schematic illustration of a left room and a right room of a building, each room having a tintable window, according to aspects of a daylighting configuration, according to embodiments.

FIG. 7 shows a left room, 710, with a first multi-zone tintable window 712 and a right room, 730, with a second multi-zone tintable window 732, according to aspects of a daylighting tinting configuration. The first multi-zone tintable window 712 in room 710 at the left has two tinting zones above the sill level. The second multi-zone tintable window 732 in room 730 at the right has three tinting zones above the sill level. In both the first and second multi-zone tintable windows 712, 732, a lower portion below the sill level is non-tintable. In one case, the lower portion may be a transparent substrate without an optically switchable device. In both rooms 710, 730, the top tinting zone is shown in a clear state to allow daylight to pass through the tinting zone into the room, which is similar to the transom window example shown in FIG. 3. The first multi-zone tintable window 712 with two tinting zones may have lower manufacturing and design complexity than the three-zone window.

Figure 8A:
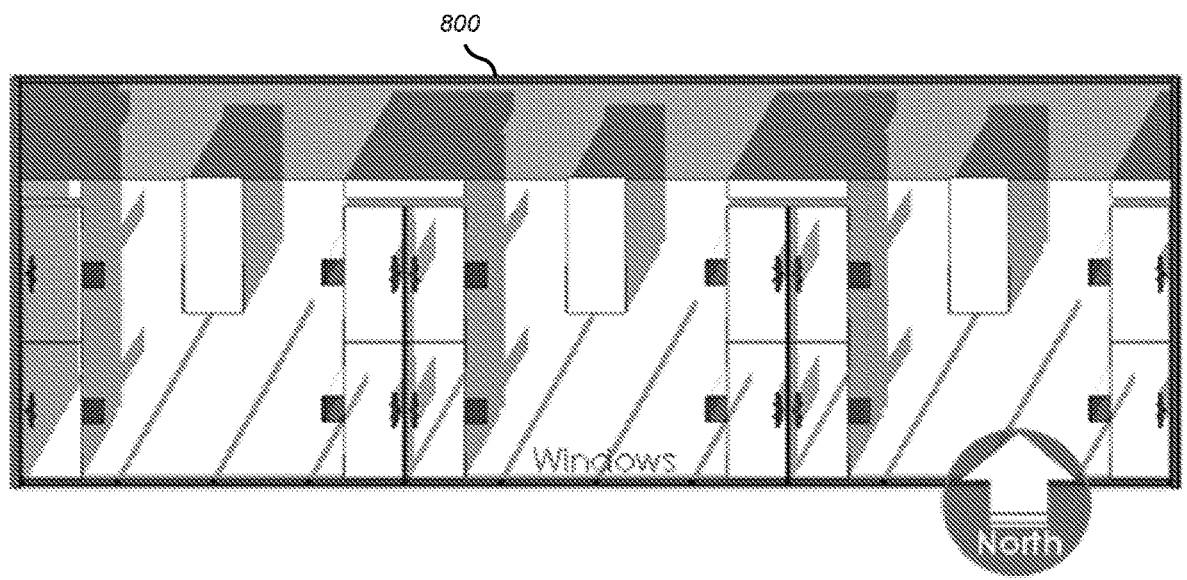
FIG. 8A is a view of a modeled building with several tintable multi-zone windows, according to an embodiment.
Figure 8A:
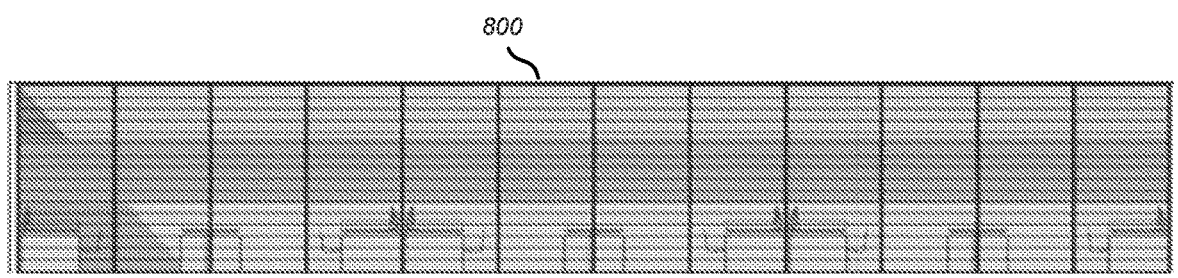
Figure 8B:
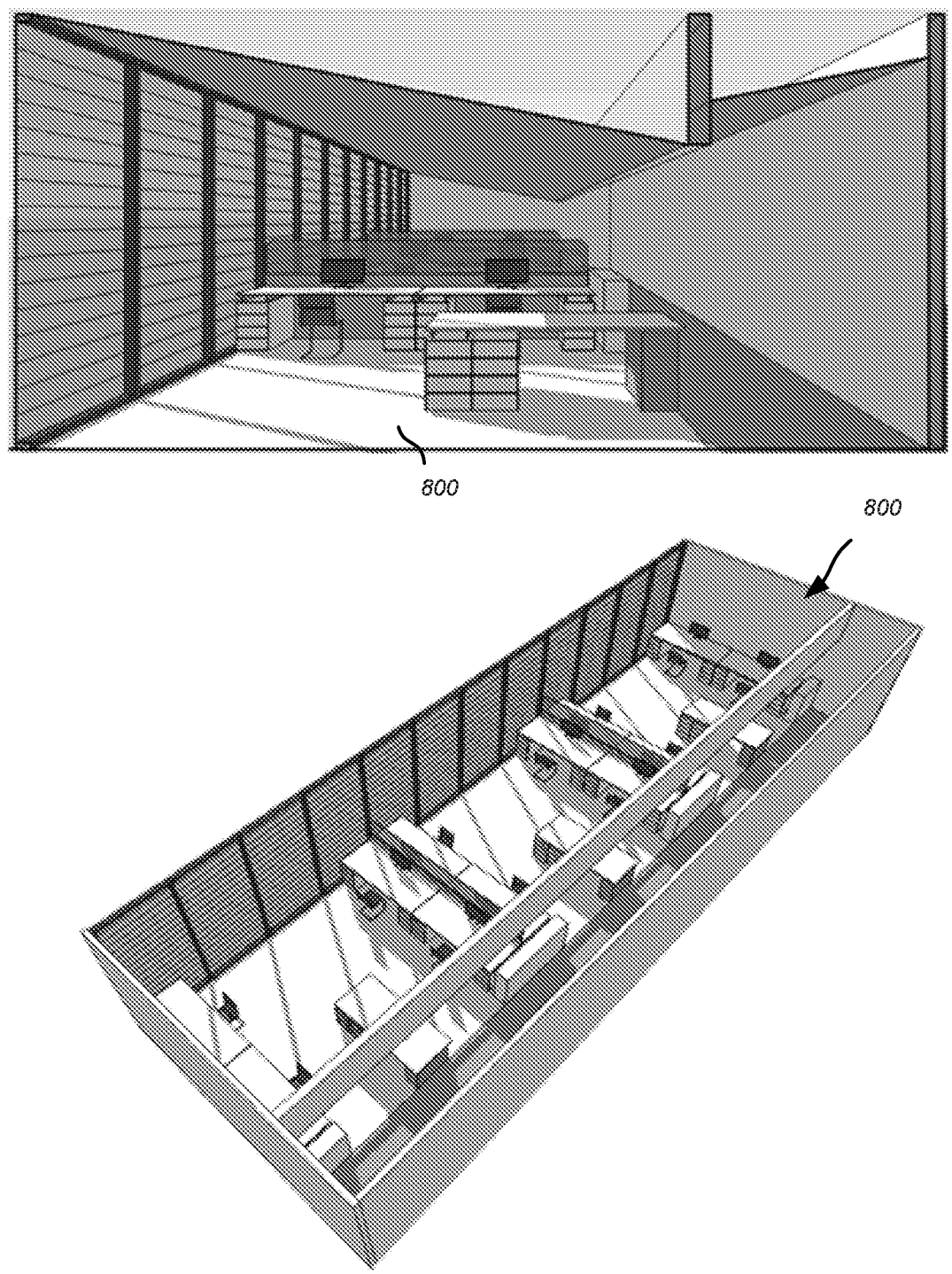
FIG. 8B is another view of the modeled building of FIG. 8A.

FIG. 8A includes plan and side (south elevation) views of a modeled building with several tintable multi-zone windows in a room 800, according to an embodiment illustrating a daylighting tinting configuration. FIG. 8B includes perspective views of the room 800 modeled building shown in FIG. 8A. Each multi-zone window having two tinting zones, a first top tinting zone and a second middle tinting zone. The lower area is a transparent substrate without an optically switchable device. In the illustrated example, the upper tinting zone is in a lighter state than the middle tinting zone to allow daylight to pass through the upper tinting zone into the room.

Figure 9:
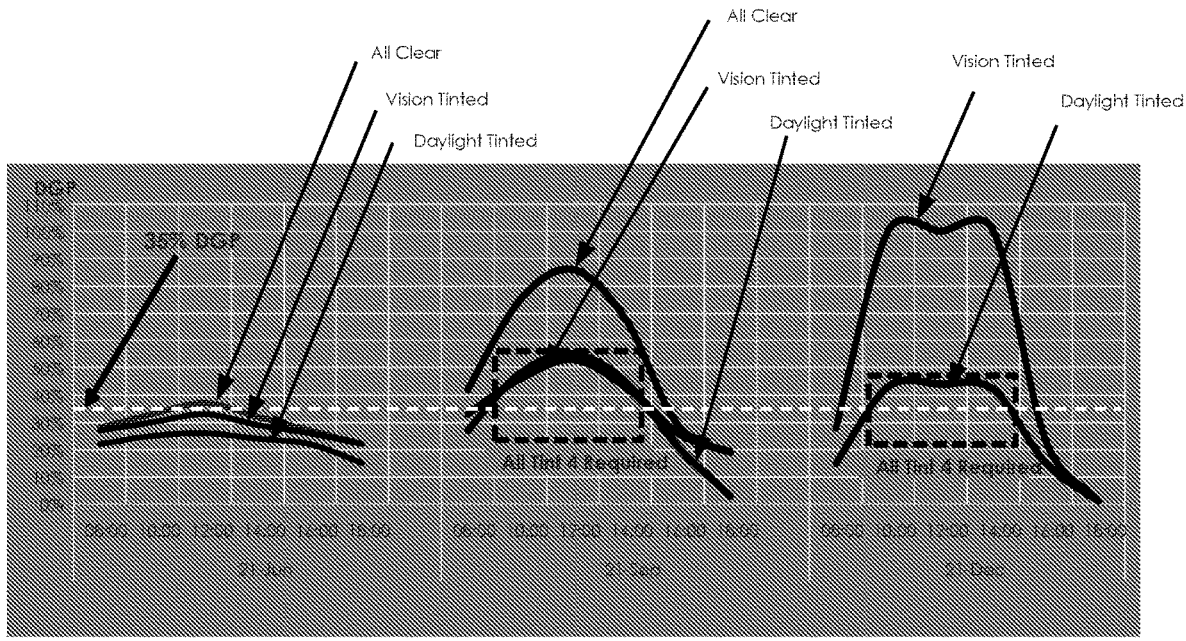
FIG. 9 is a graph of the Daylight Glare Probability (DGP) on June 21, September 21 and December 21 from sunlight through a multi-zone window in a room, according to an embodiment.
Figure 10:
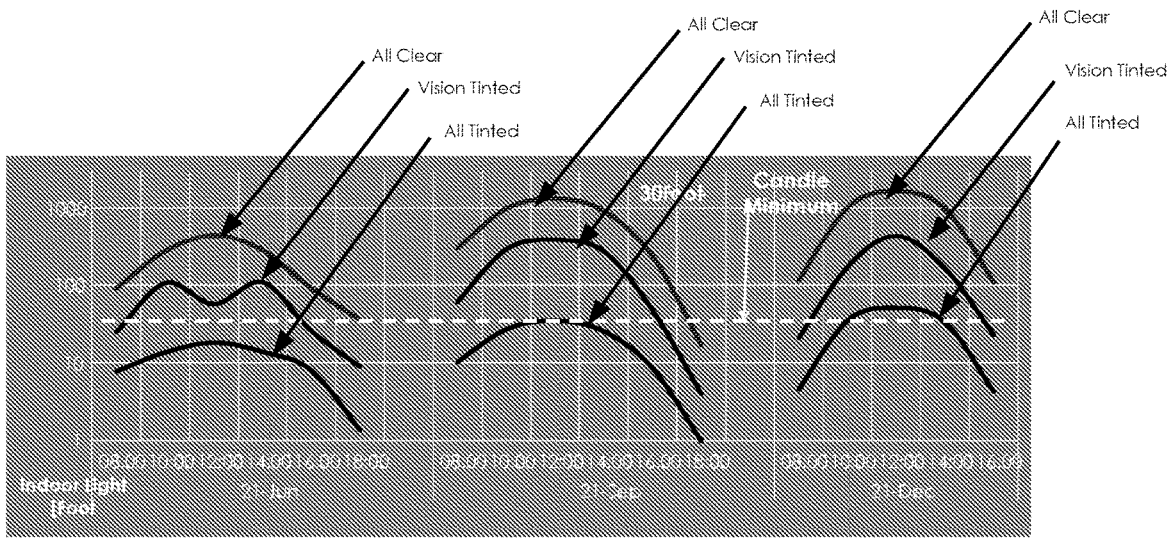
FIG. 10 is a graph of the indoor light levels on June 21, September 21 and December 21 in a room, according to an embodiment.

FIG. 9 is a graph of the daylight glare probability (DGP) on June 21, September 21 and December 21 from sunlight through the multi-zone window shown in FIG. 7 at the seating rows 1 and 2 of a room, according to an embodiment. The multi-zone window has two tinting zones. FIG. 10 is a graph of the indoor light levels at desk level in foot-candle (FC) on June 21, September 21 and December 21 for the two tinting zones in the room described with respect to FIG. 9.

FIG. 11 is a chart of a tinting schedule for the two-zone tintable window shown in FIG. 7 including illuminance levels and DGP values. As shown, from a time periods, to tinting zones provide sufficient glare control and daylighting. The darkest tint state (tint 4) is needed for the middle of the day at the end of the year.

Figure 12:
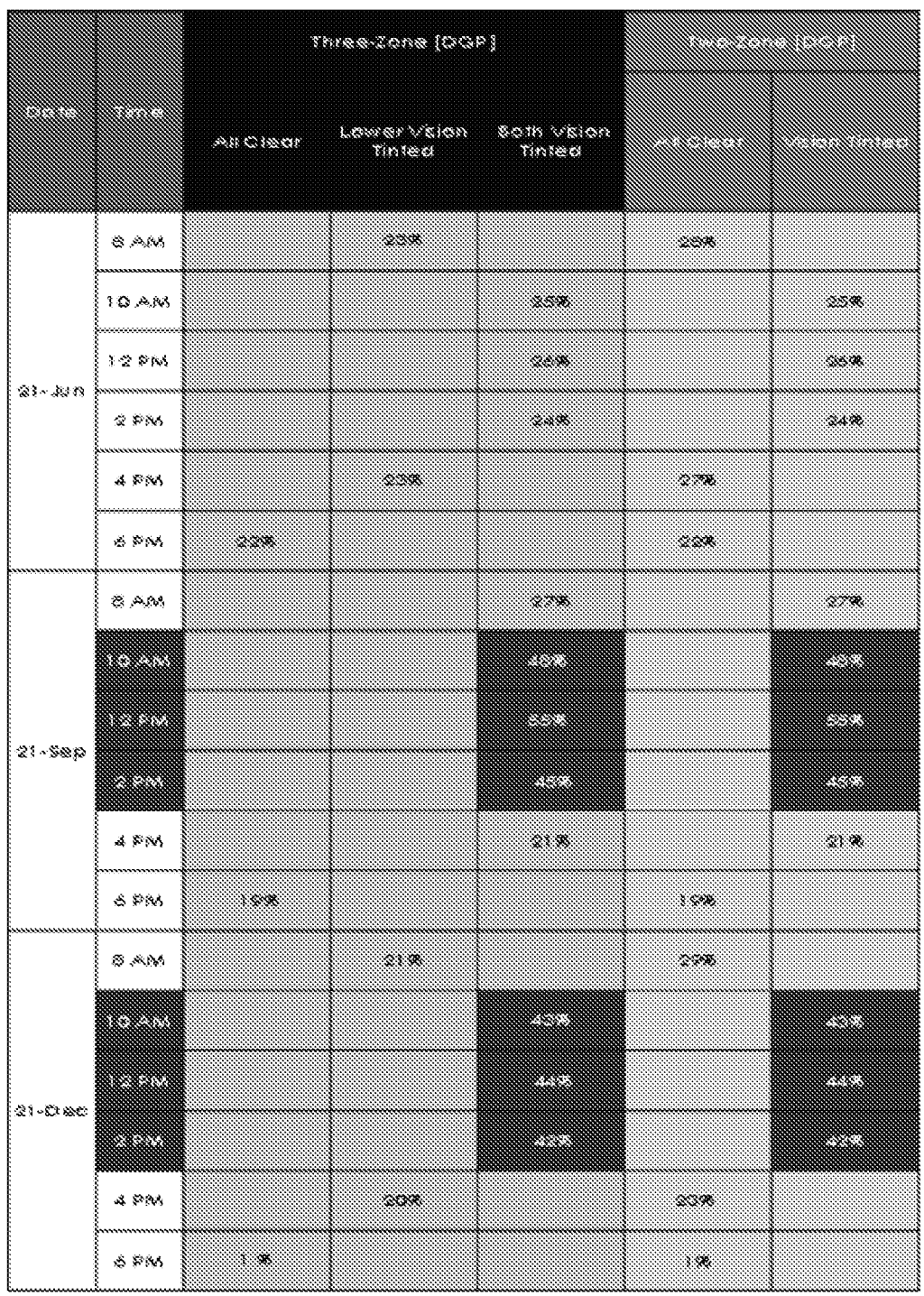
FIG. 12 is a chart of a tinting schedule for a multi-zone window having two zones and for a multi-zone window having three zones, according to an embodiment.

FIG. 12 is a chart of a tinting schedule for a multi-zone window having two zones and having three zones. Compared to two zones, three zones offers more tinting options. Lower vision only can be tinted at times to slightly drop glare without affecting light levels.

Figure 13:
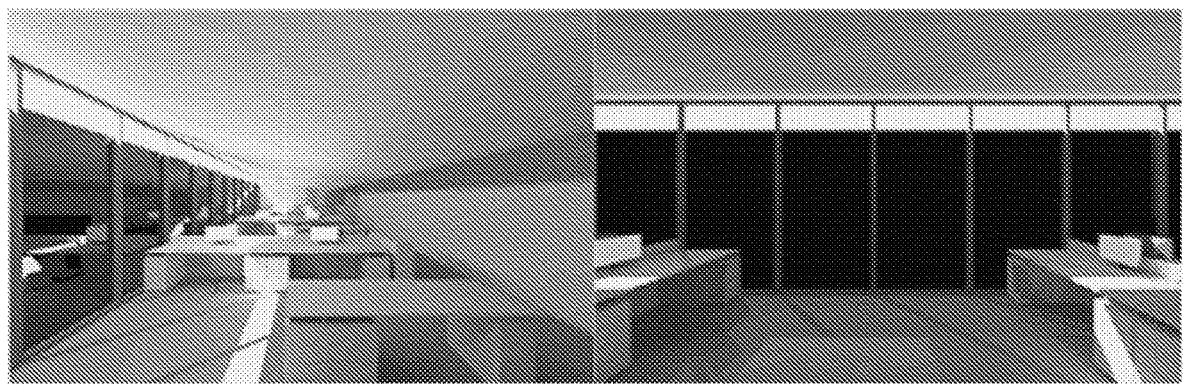
FIG. 13 shows two illustrations of a room with daylighting zone simulations, according to embodiments.

FIG. 13 shows an illustration of a simulation of two views of a room having multi-zone tintable windows with a daylighting tinting zone having a width of 15".

Figure 14:
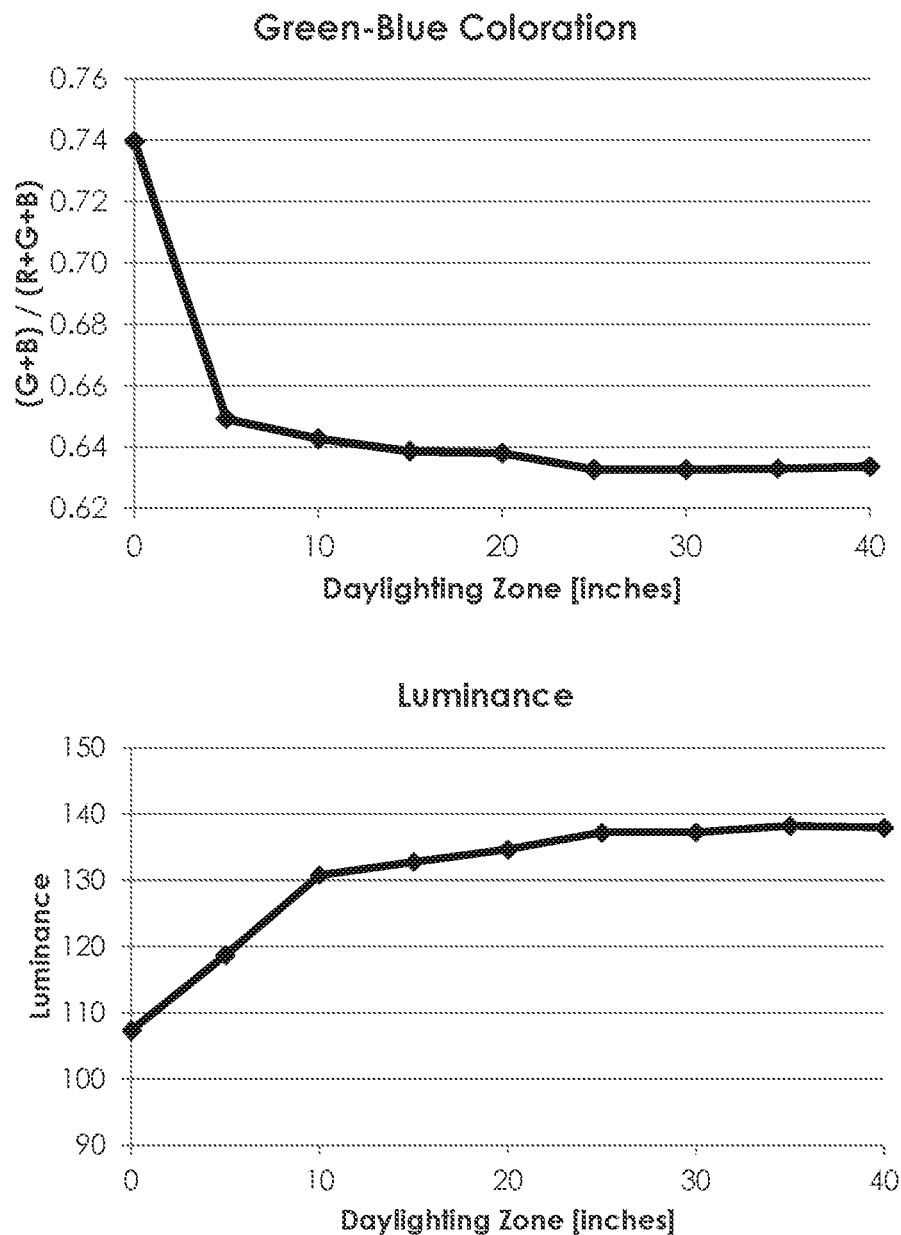
FIG. 14 shows charts of the green-blue coloration and luminance in the simulated room with the daylighting tinting zone size varying in steps of 5".

FIG. 14 shows graphs of the green-blue coloration and luminance in a simulated room with a daylighting tinting zone having a width of 5". The first 5" in the width of the daylighting zone makes the largest incremental difference in room color. One embodiment is a method of providing daylighting to a room having tintable windows between the room space and the exterior of the room, the method including allowing at least 5" of non-tinted window length when the remainder of the tintable windows' length are tinted to allow less than 5% transmission of the solar spectrum pass through them.

III. Controllers

In some embodiments, one or more controllers can power or send other control signals to building systems to control their functions. In some cases, for example, a controller can power one or more electrochromic devices of a tintable window. Controllers described herein are not limited to those that have the function of powering a device(s) to which it is associated with for the purposes of control. That is, the power source may be separate from the controller, where the controller has its own power source and directs application of power from a separate power source to the device(s). However, it is convenient to include a power source with the controller and to configure the controller to power the device(s) directly, because that obviates the need for separate wiring for powering the device(s).

In some cases, a controller is a standalone controller, which is configured to control the functions of a single system such as one or more electrochromic devices of an electrochromic window or a zone of electrochromic windows, without integration of the controller into a building control network or a building management system (BMS). In other cases, the controller is integrated into the building control network or BMS, as described further in this section.

A. Example of Controller Components

Figure 15:
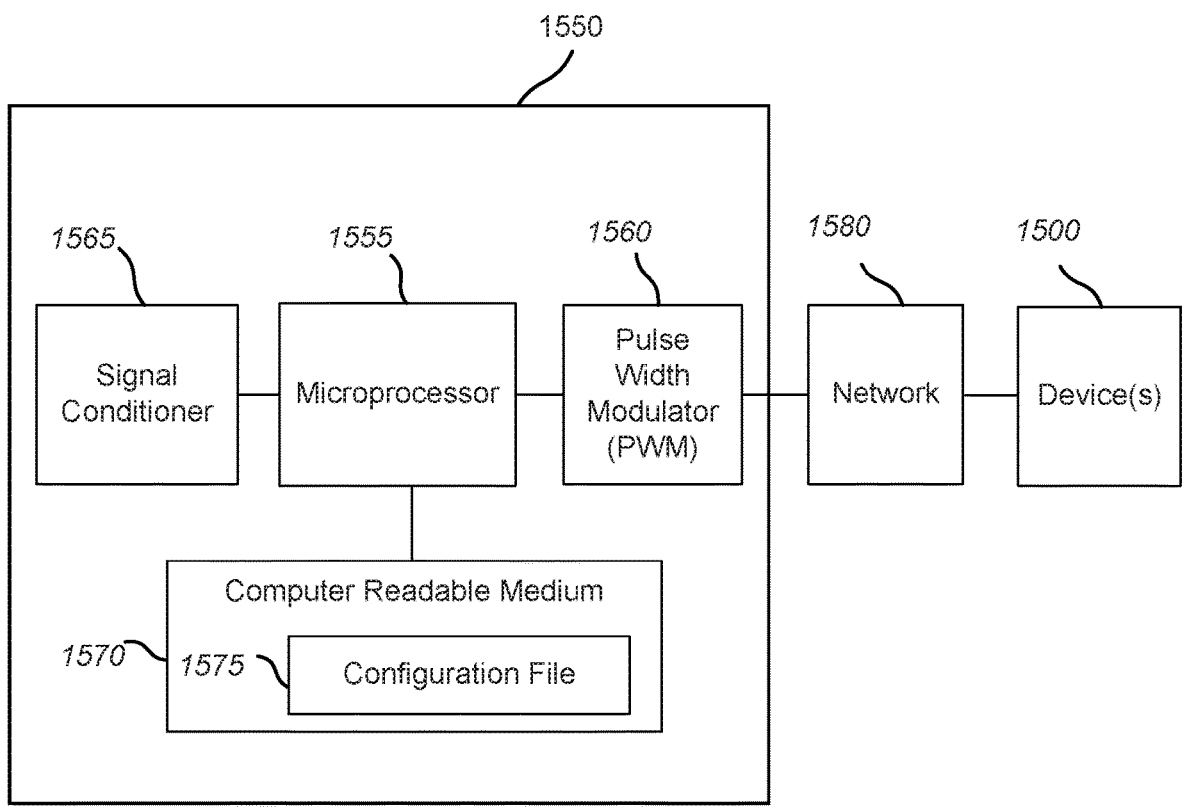
FIG. 15 depicts a simplified block diagram of components of a window controller, according to an embodiment.

FIG. 15 depicts a simplified block diagram of some components of a controller 1550 and devices 1500 of a building system that are controlled by the controller 1550. More details of similar controller components that are implemented to control an optically switchable device can be found in U.S. patent application Ser. Nos. 13/449,248 and 13/449,251, titled "CONTROLLER FOR OPTICALLY-SWITCHABLE WINDOWS," both filed on Apr. 17, 2012, and in U.S. patent application Ser. No. 13/449,235 (issued as U.S. Pat. No. 8,705,162), titled "CONTROLLING TRANSITIONS IN OPTICALLY SWITCHABLE DEVICES," filed on Apr. 17, 2012; all of which are hereby incorporated by reference in their entireties.

In FIG. 15, the illustrated components of the controller 1550 include a microprocessor 1555 or other processor, a pulse width modulator 1560 (PWM), a signal conditioning module 1565, and a computer readable medium (e.g., memory) 1570 having a configuration file 1575. Controller 1550 is in electronic communication with one or more devices 1500 through network 1580 (wired or wireless) to send control instructions to the one or more devices 1500. In some embodiments, the controller 1550 may be a local controller in communication through a network (wired or wireless) to a master controller.

In some embodiments, output from sensors may be input to the signal conditioning module 1565. The input may be in the form of a voltage signal to signal conditioning module 1565. Signal conditioning module 1565 passes an output signal to the microprocessor 1555 or other processor. The microprocessor 1555 or other processor determines a control level for the device(s) based on various data such as information from the configuration file 1575, output from the signal conditioning module 1565, override values, or other data. The microprocessor 1555 then sends instructions to the PWM 1560 to apply a voltage and/or current through a network 1580 to one or more devices of building systems to control their functions.

In one example, the microprocessor 1555 can instruct the PWM 1560, to apply a voltage and/or current to an electrochromic device of a window to transition it to any one of four or more different tint levels. In one case, the electrochromic device can be transitioned to at least eight different tint levels described as: 0 (lightest), 5, 10, 15, 20, 25, 30, and 35 (darkest). The tint levels may linearly correspond to visual transmittance values and solar heat gain coefficient (SHGC) values of light transmitted through the electrochromic window. For example, using the above eight tint levels, the lightest tint level of 0 may correspond to an SHGC value of 0.80, the tint level of 5 may correspond to an SHGC value of 0.70, the tint level of 10 may correspond to an SHGC value of 0.60, the tint level of 15 may correspond to an SHGC value of 0.50, the tint level of 20 may correspond to an SHGC value of 0.40, the tint level of 25 may correspond to an SHGC value of 0.30, the tint level of 30 may correspond to an SHGC value of 0.20, and the tint level of 35 (darkest) may correspond to an SHGC value of 0.10. As will be discussed below the light transmitted through the tinted window may impart a hue in the room. The deepness of the hue will depend on the tint level.

In some cases, the controller controls one or more tintable windows such as electrochromic windows. In one case, at least one or all of the electrochromic devices of the electrochromic windows are solid state and inorganic electrochromic devices. In one case, the electrochromic windows are multistate electrochromic windows as described in U.S. patent application Ser. No. 12/851,514 (now U.S. Pat. No. 8,705,162), filed on Aug. 5, 2010, and titled "Multipane Electrochromic Windows," which is hereby incorporated by reference in its entirety.

Controller 1550 or a master controller in communication with the controller 1550 may employ control logic to determine the control levels based various data. The controller 1550 can instruct the PWM 1560 to apply a voltage and/or current or otherwise send control signals to one or more devices based on the determined control levels.

B. Building Management Systems (BMSs)

The controllers described herein are suited for integration with a Building Management System (BMS). A BMS is a computer-based control system installed in a building that monitors and controls the building's mechanical and electrical equipment such as heating, ventilation, and air conditioning system (also referred to as "HVAC system"), lighting system, power systems (e.g., wireless power system), window systems such as one or more zones of tintable windows, transportation systems such as an elevator system, emergency systems such as fire systems, security systems, and other building systems. A BMS consists of hardware, including interconnections by communication channels to a computer or computers, and associated software for maintaining conditions in the building according to preferences set by the occupants and/or by the building manager. For example, a BMS may be implemented using a local area network, such as Ethernet. The software can be based on, for example, internet protocols and/or open standards. One example is software from Tridium, Inc. (of Richmond, Virginia). One communications protocol commonly used with a BMS is BACnet (building automation and control networks).

A BMS is most common in a large building, and typically functions at least to control the environmental conditions within the building. For example, a BMS may control temperature, light level, color temperature, contrast ratio, sound level or other acoustic quality, air quality such as carbon dioxide levels and/or particulate levels, humidity levels, and other conditions within a building. Typically, there are many mechanical devices that are controlled by a BMS such as heaters, air conditioners, blowers, vents, and the like. To control the building environment, a BMS may turn on and off or otherwise control these devices in the building systems to particular levels. A core function of a typical modern BMS is to maintain a comfortable environment (e.g., visual comfort, thermal comfort, acoustic comfort, air quality, etc.) for the building's occupants while minimizing energy costs/demand. Thus, a modern BMS is used not only to monitor and control, but also to optimize the synergy between various systems, for example, to conserve energy and lower building operation costs.

Figure 16:
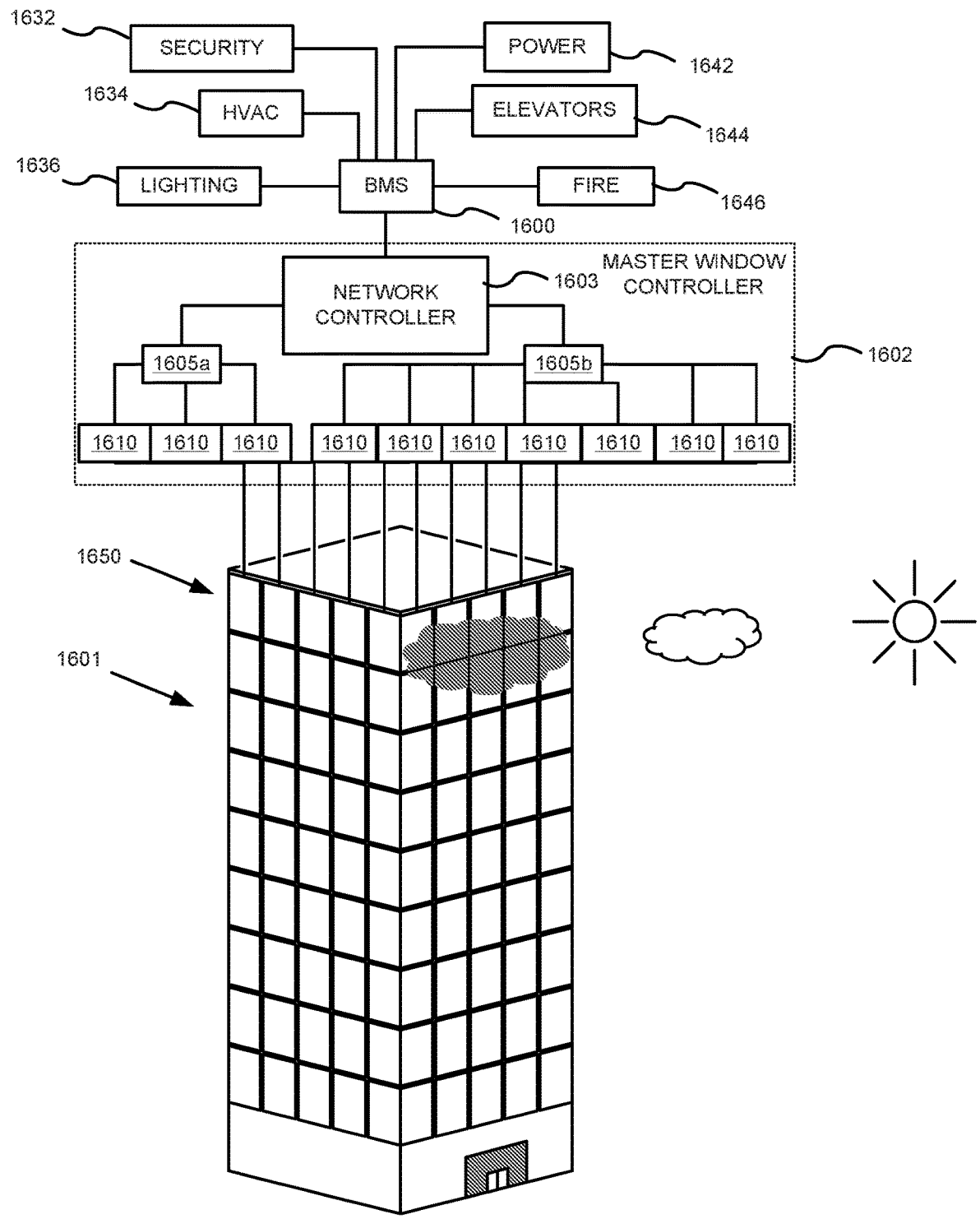
FIG. 16 depicts a schematic diagram of an embodiment of a BMS, according to an embodiment.

FIG. 16 depicts a schematic diagram of an embodiment of a BMS 1600, that in communication with (wired or wireless) and manages a number of systems of a building 1601, including security systems 1632, heating/ventilation/air conditioning (HVAC) systems 1634, lighting systems 1636, power systems 1642, elevators or other transportation systems 1644, fire or other emergency systems 1645, a window system 1650 associated with the tintable windows, and the like. Security systems 1632 may include magnetic card access, turnstiles, solenoid driven door locks, surveillance cameras and other asset or occupant locating device, burglar alarms, metal detectors, and the like. Fire or other emergency systems 1645 may include alarms and fire suppression systems including a water plumbing control. Lighting systems 1636 may include interior lighting, exterior lighting, emergency warning lights, emergency exit signs, and emergency floor egress lighting. Power systems 1642 may include the main power, backup power generators, uninterrupted power source (UPS) grids, power generating systems such as a photovoltaic power system, and the like. In other embodiments, a BMS may manage other combinations of building systems.

In the illustrated example shown in FIG. 16, the BMS 1600 controls the window system 1650 by sending control signals to a master window controller 3202. In this example, the master window controller 3202 is depicted as a distributed network of controllers including a master network controller, 1603, intermediate network controllers, 1605*a* and 1605*b*, and end or leaf controllers 1610. End or leaf controllers 1610 may be similar to window controller 1550 described with respect to FIG. 15, the window controller 1940 described with respect to FIG. 19, or the window controller 790 described with respect to FIG. 20. In one example, the master network controller 1603 may be in proximity to the BMS 1600, and each floor or other area of the building 1601 may have one of the intermediate network controllers 1605*a* and 1605*b*, while each tintable window or zone of tintable windows has its own end controller 1610. In this example, each of end or leaf controllers 1610 controls a specific tintable window or specific zone of tintable windows of the building 1601.

Each of the end or leaf controllers 1610 can be in a separate location from the tintable window that it controls, or can be integrated into the tintable window. For simplicity, only ten tintable windows of building 1601 are depicted as controlled by master window controller 3202. In a typical setting, there may be a larger number of tintable windows in a building controlled by master window controller 3202. Master window controller 3202 need not be a distributed network of window controllers. For example, a single end controller which controls the functions of a single tintable window or single zone of tintable windows also falls within the scope of the embodiments disclosed herein, as described above.

In one aspect, a BMS or another controller receives sensor data via a communication network from one or more sensors at the building. For exterior sensors, the building may include exterior sensors on the roof of the building. Alternatively, the building may include an exterior sensor associated with each exterior window or an exterior sensor on each side of the building. An exterior sensor on each side of the building could track the irradiance on a side of the building as the sun changes position throughout the day. As another example, a multi-sensor device with multiple sensors such as photosensors, infrared sensors, ambient temperature sensor and other sensors may be located at the building, for example, on the rooftop. In addition or alternatively, a BMS may receive feedback data from other building systems. In one case, the BMS may receive data regarding an occupant's presence and location in the building. By incorporating data from various building systems, the BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of, and higher productivity from, staff, and various combinations of these, because the systems can be automatically controlled.

The building systems can sometimes run according to daily, monthly, quarterly, or yearly schedules. For example, the lighting control system, the window system, the HVAC, and the security system may operate on a 24 hour schedule accounting for when people are in the building during the work day. At night, the building may enter an energy savings mode, and during the day, the systems may operate in a manner that minimizes the energy consumption of the building while providing for occupant comfort. As another example, the systems may shut down or enter an energy savings mode over a holiday period. The scheduling information may be combined with geographical information. Geographical information may include the latitude and longitude of the building. Geographical information also may include information about the direction that each side of the building faces. Using such information, different rooms on different sides of the building may be controlled in different manners.

Figure 17:
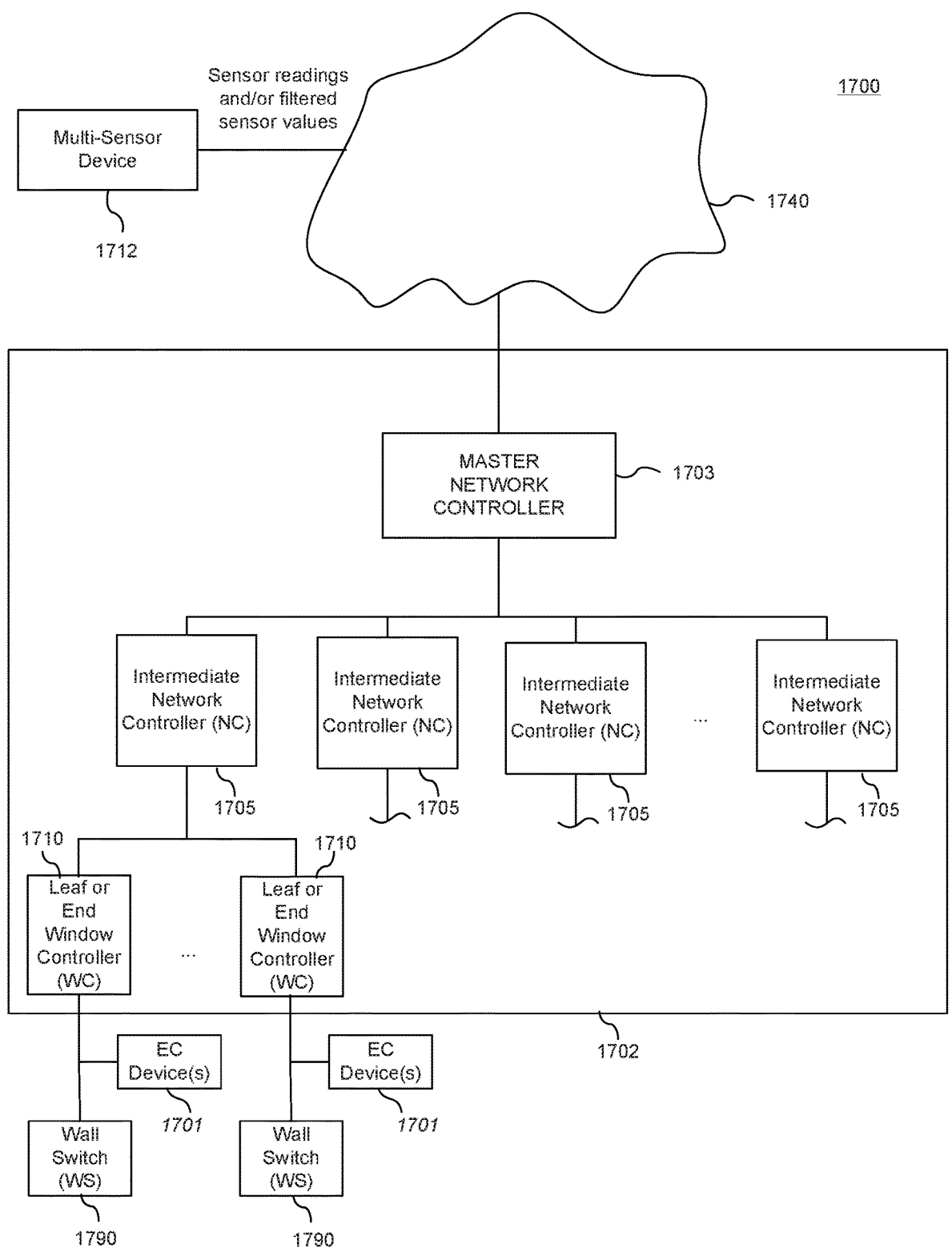
FIG. 17 is a block diagram of components of a system for controlling functions of one or more tintable windows of a building, according to embodiments.

FIG. 17 is a block diagram of components of a system 1700 for controlling functions (e.g., transitioning to different tint levels) of electrochromic devices 1701 of one or more tintable windows of a building (e.g., building 1601 shown in FIG. 16), according to embodiments. System 1700 may be one of the building systems managed by a BMS (e.g., BMS 1600 shown in FIG. 16) or may operate independently of a BMS. System 1700 includes a master window controller 1703 that can send control signals to the one or more tintable windows to control their functions. System 1700 also includes a network 1740 in electronic communication with master window controller 1703. The control logic, other control logic and instructions for controlling functions of the tintable window(s), and/or sensor and other data may be communicated to the master window controller 1703 through the network 1740. Network 1740 can be a wired or wireless network (e.g. cloud network). In one embodiment, network 1740 may be in communication with a BMS to allow the BMS to send instructions for controlling the tintable window(s) through network 1740 to the tintable window(s) in a building.

System 1700 also includes EC devices 1701 of the one or more tintable windows (not shown) and optional wall switches 1790, which are both in electronic communication with master window controller 1703. In this illustrated example, master window controller 1703 can send control signals to EC device(s) 1701 to control the tint level of the tintable windows having the EC device(s) 1701. Each wall switch 1790 is also in communication with EC device(s) 1701 and master window controller 1703. An end user (e.g., occupant of a room having the tintable window) can use the wall switch 1790 to control the tint level and other functions of the tintable window having the EC device(s) 1701.

In FIG. 17, master window controller 1703 is depicted as a distributed network of window controllers including a master network controller 1703, a plurality of intermediate network controllers 1705 in communication with the master network controller 1703, and multiple pluralities of end or leaf window controllers 1710. Each plurality of end or leaf window controllers 1710 is in communication with a single intermediate network controller 1705. Although master window controller 1703 is illustrated as a distributed network of window controllers, master window controller 1703 could also be a single window controller controlling the functions of a single tintable window in other embodiments. The components of the system 1700 in FIG. 17 may be similar in some respects to components described with respect to FIG. 16. For example, master network controller 1703 may be similar to master network controller 1303 and intermediate network controllers 1705 may be similar to intermediate network controllers 1705. Each of the window controllers in the distributed network of FIG. 17 may include a processor (e.g., microprocessor) and a computer readable medium in electrical communication with the processor.

In FIG. 17, each leaf or end window controller 1710 is in communication with EC device(s) 1701 of a single tintable window to control the tint level of that tintable window in the building. In the case of an IGU, the leaf or end window controller 1710 may be in communication with EC devices 1701 on multiple lites of the IGU to control the tint level of the IGU. In other embodiments, each leaf or end window controller 1710 may be in communication with a plurality of tintable windows, for example, of a zone of windows. The leaf or end window controller 1710 may be integrated into the tintable window or may be separate from the tintable window that it controls. Leaf and end window controllers 1710 in FIG. 17 may be similar to the end or leaf controllers 1610 in FIG. 16.

Each wall switch 1790 can be operated by an end user (e.g., occupant of the room) to control the tint level and other functions of the tintable window in communication with the wall switch 1790. The end user can operate the wall switch 1790 to communicate control signals to the EC devices 1701 in the associated tintable window. These signals from the wall switch 1790 may override signals from master window controller 1703 in some cases. In other cases (e.g., high demand cases), control signals from the master window controller 1703 may override the control signals from wall switch 1790. Each wall switch 1790 is also in communication with the leaf or end window controller 1710 to send information about the control signals (e.g. time, date, tint level requested, etc.) sent from wall switch 1790 back to master window controller 1703. In some cases, wall switches 1790 may be manually operated. In other cases, wall switches 1790 may be wirelessly controlled by the end user using a remote device (e.g., cell phone, tablet, etc.) sending wireless communications with the control signals, for example, using infrared (IR), and/or radio frequency (RF) signals. In some cases, wall switches 1790 may include a wireless protocol chip, such as Bluetooth, EnOcean, WiFi, Zigbee, and the like. Although wall switches 1790 depicted in FIG. 17 are located on the wall(s), other embodiments of system 1700 may have switches located elsewhere in the room. System 1700 also includes a multi-sensor device 1712 in electronic communication with one or more controllers via a communication network 1740 in order to communicate sensor readings and/or filtered sensor values to the controller(s).

Figure 18:
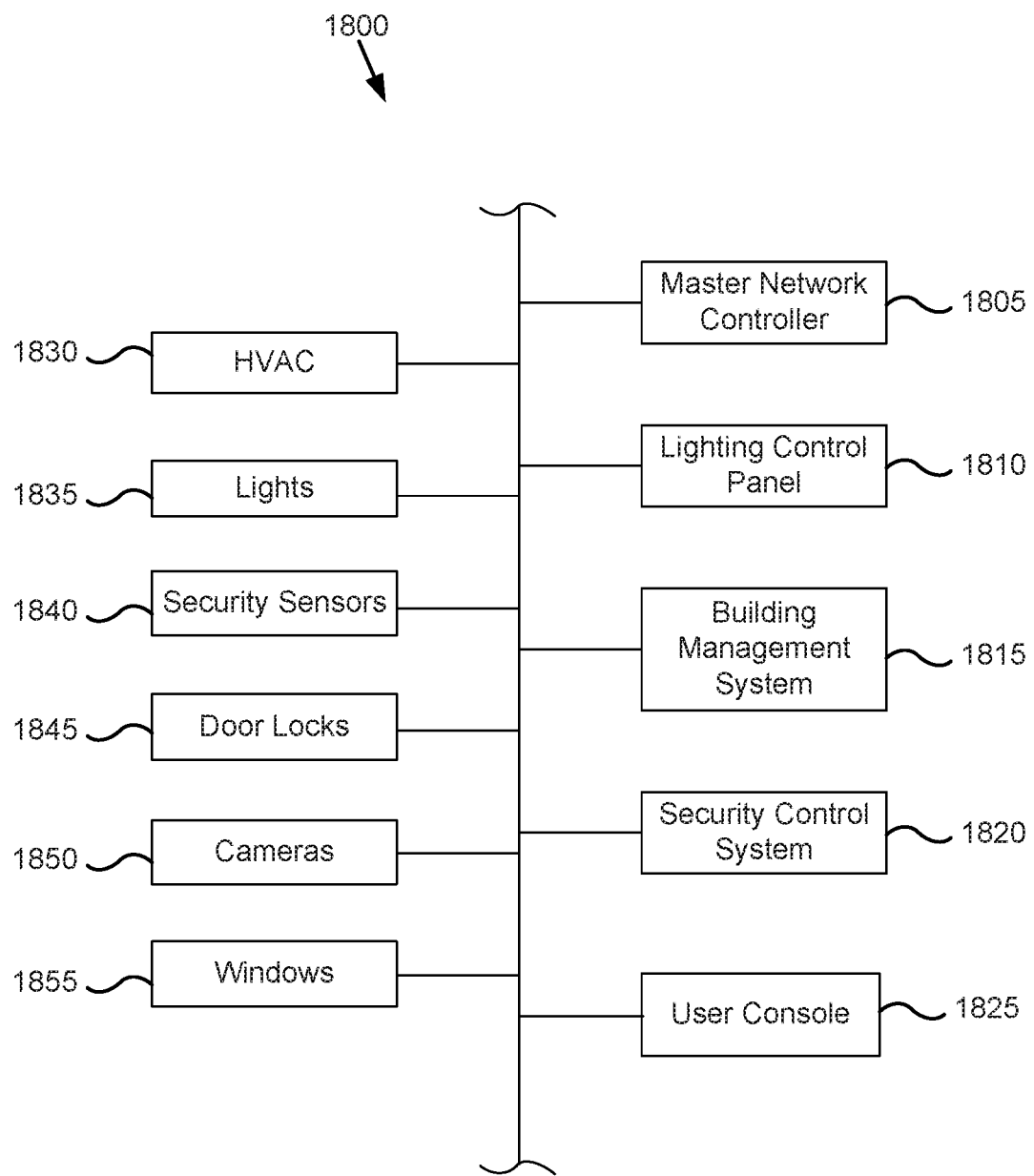
FIG. 18 depicts a block diagram of an embodiment of a building network for a building, according to an implementation.

FIG. 18 depicts a block diagram of an embodiment of a building network 1800 for a building. As noted above, building network 1800 may employ any number of different communication protocols, including BACnet. As shown, building network 1800 includes a master network controller 1805, a lighting control panel 1810, a BMS 1815, a security control system, 1820, and a user console, 1825. These different controllers and systems in the building may be used to receive input from and/or control a HVAC system 1830, lights 1835, security sensors 1840, door locks 1845, cameras 1850, and tintable windows 1855, of the building.

Master network controller 1805 may function in a similar manner as master network controller 3403 described with respect to FIG. 17. Lighting control panel 1810 may include circuits to control the interior lighting, the exterior lighting, the emergency warning lights, the emergency exit signs, and the emergency floor egress lighting. Lighting control panel 1810 also may include occupancy sensors in the rooms of the building. BMS 1815 may include a computer server that receives data from and issues commands to the other systems and controllers of network 1800. For example, BMS 1815 may receive data from and issue commands to each of the master network controller 1805, lighting control panel 1810, and security control system 1820. Security control system 1820 may include magnetic card access, turnstiles, solenoid driven door locks, surveillance cameras, burglar alarms, metal detectors, and the like. User console 1825 may be a computer terminal that can be used by the building manager to schedule operations of, control, monitor, optimize, and troubleshoot the different systems of the building. Software from Tridium, Inc. may generate visual representations of data from different systems for user console 1225.

Each of the different controls may control different types of devices/apparatus. Master network controller 1805 controls windows 1855. Lighting control panel 1810 controls lights 1835. BMS 1815 may control HVAC 1830. Security control system 1820 controls security sensors 1840, door locks 1845, and cameras 1850. Data may be exchanged and/or shared between all of the different devices/apparatus and controllers that are part of building network 1800.

C. Examples of Window Controllers for Independent Control of Multiple Tinting Zones In certain aspects, a single window controller or multiple window controllers can be used to independently control multiple zones of a single electrochromic device of a multi-zone tintable window or multiple tintable windows of a zone. In a first design, a single window controller is electrically communicating with multiple voltage regulators. In a second design, a main window controller is electrically communicating with multiple subcontrollers. In some cases, each multi-zone tintable window includes a memory, chip or card that stores information about the window, including physical characteristics, production information (date, location, fabrication parameters, lot number, etc.), and the like. The memory, chip or card may be part of an onboard window controller or not, e.g. in a wiring harness, pigtail and/or connector to which the window controller connects. Window controllers, whether on or part of the window or not, that control multi-zone tintable windows are described herein. Other information that may be included in the memory are described in U.S. patent application Ser. No. 13/049,756, titled "MULTIPURPOSE CONTROLLER FOR MULTISTATE WINDOWS" and filed on Mar. 16, 2011 and in U.S. patent application Ser. No. 14/951,410, titled "SELF-CONTAINED EC IGU" and filed on Nov. 24, 2015, both of which are incorporated by reference herein for all purposes.

—Controller Design 1

As mentioned above, a window controller according to the first design is connected to multiple voltage regulators, which it controls. Each voltage regulator is in electrical communication with one of the tinting zones. In one embodiment, the voltage regulators are onboard, i.e. part of the window assembly, e.g. in the secondary seal of an insulated glass unit. They may be physically separate from the controller, or part of the controller, whether the controller is onboard or separate from the window. The window controller is in electrically communication with each voltage regulator to be able to independently instruct each voltage regulator to deliver voltage to its own tinting zone. Each voltage regulator delivers current to only one of two bus bars in a particular tinting zone. This design involves multiple voltage regulators, one for each tinting zone, and collectively all the voltage regulators being controlled by a single window controller via a communication bus (not depicted).

Figure 19:
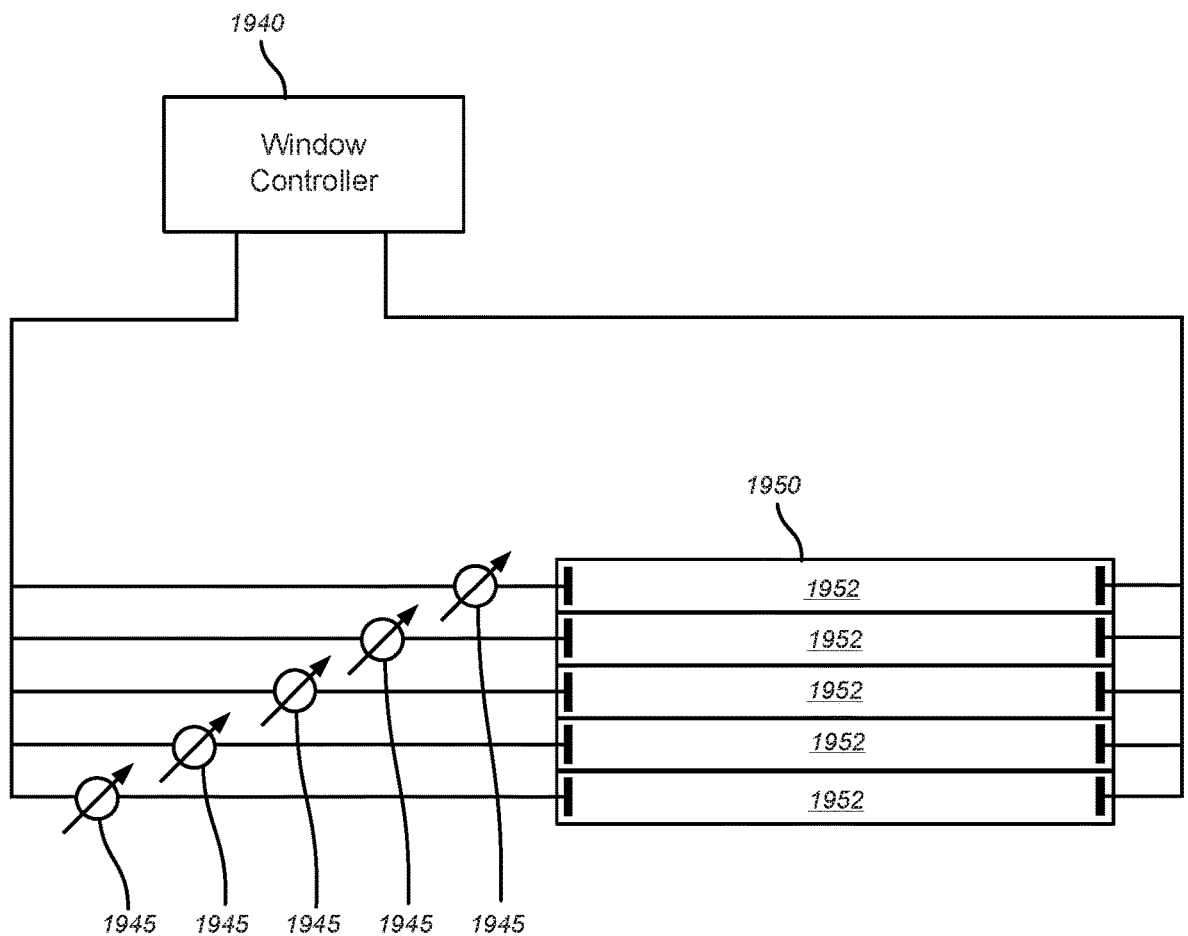
FIG. 19 is a schematic illustration of a window controller connected to multiple voltage regulators in parallel, according to an embodiment.

FIG. 19 is a schematic diagram of a control system with a window controller 1940 connected to five (5) voltage regulators 1945, according to this first design. Each voltage regulator 1945 is electrically connected to one of the bus bars of a corresponding tinting zone 1952 of a window 1950 and to the window controller 1940. In this example, the window controller 1940 instructs each voltage regulator 1945 to independently deliver voltage to its own tinting zone 1952. Each voltage regulator 1945 delivers current to only one of two bus bars on its tinting zone 1952. In this way, each zone 1952 may be independently tinted relative to the other zones 1952.

Another structural feature of this first design is that each of the voltage regulators is directed or connected to only one of the bus bars in the respective zone of the multi-zone electrochromic device. The bus bars of the zones that oppose the voltage-regulated bus bars all receive the same voltage from the window controller. This presents a challenge if one of the tinting zones needs to be driven in an opposite direction from that of the other zones because the polarity on the two bus bars cannot be reversed if the voltage applied to the other zones is inconsistent with such reversed polarity.

In this design, each voltage regulator is a simple design that has logic (e.g., instructions stored on memory and retrieved for execution by a processor) for applying a voltage as instructed by the window controller. A local window controller includes logic with instructions for implementing roles comprising: 1) communicating with higher level window controllers, 2) to step down power if necessary, 3) and determining the actual voltage that should be applied to each of the individual tinting zones. As an example of communication with higher level window controllers, the local window controller may receive instructions to place each of the individual zones in respective tint states. The window controller may then interpret this information and decide how to best accomplish this result by driving transitions by applying appropriate drive voltages, hold times, ramp profiles, hold voltages, etc. Details of control instructions for driving transitions in optically switchable windows are described in U.S. patent application Ser. No. 13/449,248, filed on Apr. 17, 2012 and titled "CONTROLLER FOR OPTICALLY-SWITCHABLE WINDOWS," and in in U.S. patent application Ser. No. 13/449,251, filed on Apr. 17, 2012 and titled "CONTROLLER FOR OPTICALLY-SWITCHABLE WINDOWS," both of which are hereby incorporated by reference in their entireties.

—Controller Design 2

In a second design, a separate subcontroller is used to control each of the tinting zones. In this design, the subcontrollers receive general tint instructions from a main window controller. For example, the main (upper-level) window controller may send a signal to the subcontroller with tint instructions to drive a transition of a particular tinting zone to a new tint state. The subcontroller comprises memory that includes control instructions for driving transitions including instructions that determine the appropriate drive voltage, hold time, ramp profile, etc. necessary to drive transitions. The main window controller for the multi-zone window is in communication with higher level control entities on the control network main window controller also functions to step the power from the power source to an appropriate level for the subcontrollers to perform their functions.

In this design, each subcontroller has leads going to each bus bar of the respective tinting zone for which it is responsible. In this way, the polarity across the pair of bus bars for each zone can be independently controlled. If one of the tinting zones needs to be driven in an opposite polarity from that of the other zones, the polarity on the two bus bars can be reversed with this design. This is an advantage over the first design, because each zone can be independently tinted or cleared.

Figure 20:
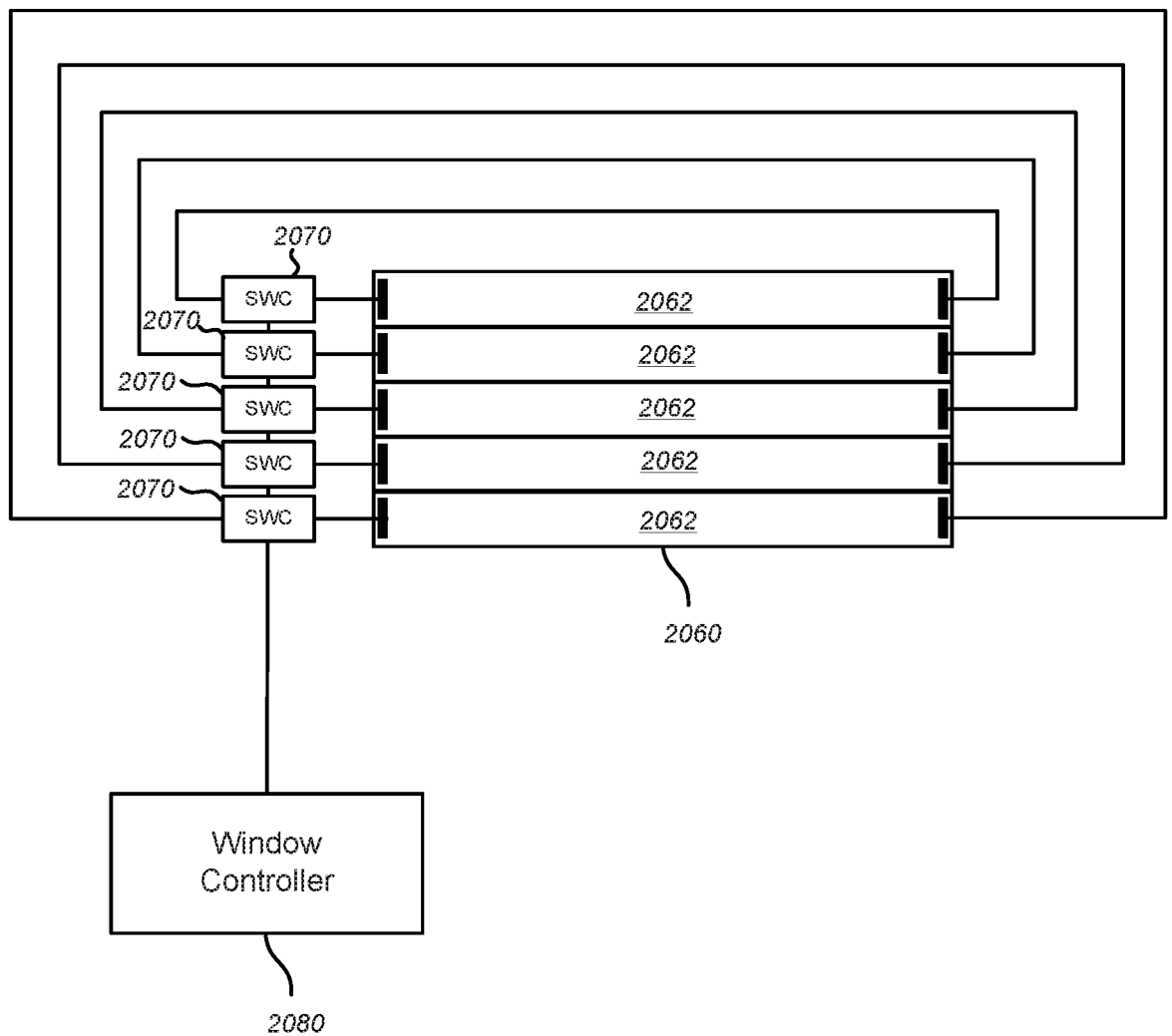
FIG. 20 is a schematic illustration of a window controller connected to multiple subcontrollers in series, according to an embodiment.

FIG. 20 is a schematic diagram of a single window controller connected to five subcontrollers (SWCs) 2070, according to this second design. Each subcontroller 2070 has two leads going to the bus bars of a corresponding tinting zone 2062. In this example, the SWCs 2070 are electrically connected in series with the one SWC 2070 at the end of the series connected to main window controller 2080. In this example, the window controller 2080 sends a signal to a subcontroller 2070 with tint instructions to drive a transition of its associated tinting zone 2062.

D. Photovoltaic Power

In certain implementations, a tintable window (e.g., electrochromic window) comprises a photovoltaic (PV) film or other light harvesting device. The light harvesting device harvests energy converting the solar energy to provide electrical power to the window controller and/or other window devices or for storage in a battery.

E. Onboard Window Controller

In some aspects, a tintable window has a window controller that is onboard the window. Details of examples of onboard window controllers are described in U.S. patent application Ser. No. 14/951,410, titled "SELF-CONTAINED EC IGU," filed on Nov. 24, 2015, which is hereby incorporated by reference in its entirety.

F. Wireless Powering

According to one aspect, a multi-zone window may be powered wirelessly, for example through radio frequency, magnetic induction, lasers, microwave energy, etc. Details regarding components of a wireless powered window can be found in international PCT application PCT/US17/52798, titled "WIRELESS POWERED ELECTROCHROMIC WINDOWS," filed on Sep. 21, 2017, which is hereby incorporated by reference in its entirety.

In one aspect, a multi-zone tintable window comprises a radio frequency (RF) antenna that converts RF power into an electrical potential used to power the transition of one or more tinting zones in the multi-zone tintable window. The RF antenna may be located in the frame of the multi-zone window or in another structure (e.g., spacer of an insulated glass unit). For example, the RF antenna may be located in the spacer of an insulated glass unit having multiple lites with at least one lite comprising a multi-zone electrochromic device. The RF antenna receives RF signals from a RF transmitter. In one case, the RF transmitter provides RF signals to multiple RF antennas. Details regarding examples of antennas are described in PCT application PCT/US15/62387, titled "WINDOW ANTENNAS" and filed on Nov. 24, 2015, which is hereby incorporated by reference in its entirety.

IV. Control Logic for Controlling Functions of Tintable Windows and/or Other Building Systems In certain implementations, control logic used to determine tint decisions for groups (zones) of windows can operate similarly to control logic used to determine tint decisions for multiple tinting zones in a window or individual windows of a group of windows. That is, the control logic for multiple windows determines a tint state for each window according the location and direction of the window. The control logic for multiple zones of a window would determine a tint state for each zone of the window according to the location and direction of the zone. An example of control logic for determining tint decisions for multiple windows and transitioning the windows to the determined tint states can be found in PCT application PCT/US15/29675, filed on May 5, 2015 and titled "CONTROL METHOD FOR TINTABLE WINDOWS," which is hereby incorporated by reference in its entirety. In certain aspects, certain operations of this control logic may be adapted to determine tinting decisions for multiple tinting zones and powering transitions according to the tinting decisions as described herein.

In some aspects, control logic may be adapted to address the visual transition in tinting within a particular tinting zone and/or between adjacent tinting zones. For example, the control logic may include logic that determines tint states that create a sharp contrast between different tint states in different zones or to create diffuse blending of color from zone to zone, e.g. using resistive region technology. As discussed above, a resistive region (rather than a physical bifurcation) between adjacent tinting zones can be used to generate a tinting gradient between adjacent zones. The tinting gradient is generally present across the width of the resistive region and thus, the visual transition is more gradual, the greater the width of the resistive region. The control logic may be adapted to account for the tinting gradient in the resistive region and/or may be adapted to apply a gradient voltage along the length of the bus bars of a tinting zone to generate a tinting gradient within the tinting zone (or a monolithic EC device film). In one example, a bus bar may be tapered to apply a gradient voltage along the length and generate a length-wise tinting gradient. In another aspect, control logic may be adapted to control windows with many tinting zones to determine tint states that will blend the color through the many zones. In one aspect, control logic may be adapted to control the tint state of a series of adjacent zones such that there is not too abrupt of a transition from a zone that needs to be particularly dark to the zone that needs to be particularly clear.

Another modification to control logic may involve a separate routine (e.g., a module beyond Modules A-D of the PCT application PCT/US15/29675, which describes aspects of Intelligence® as described above) for applying considerations associated with the additional features of a multi-zone window beyond the usual considerations of glare control, view, natural lighting, occupant thermal comfort, building energy management, etc. For example, where light harvesting is a motivation, then an additional module may have to be built on the control logic to address the additional consideration. The order in which the functionality for addressing that additional feature or function of the tinting zone sits in a processing pipeline for the usual considerations may be irrelevant in some cases. For example, the Intelligence® modules do not necessarily need to operate in the following order: A→B→C→D in one case. It would be understood that it is possible that the order of execution of the modules does matter in other cases.

The control logic may also be adjusted to account for highly localized glare control across multiple zones. For example, this can be addressed with a modification to module A of the control logic described in detail in PCT application PCT/US15/29675.

Different designs of window controllers that can power tinting transitions of multiple tinting zones of one or more multi-zone tintable windows are described above. In some aspects, a tinting zone may have two tint states: a first bleached tint state and a second darkened tint state. In other aspects, a tinting zone may have four tint states. In other aspects, a tinting zone may have more than four tint states.

A. Example of Tinting Control Logic for Multiple Tinting Zones/Windows

Figure 21:
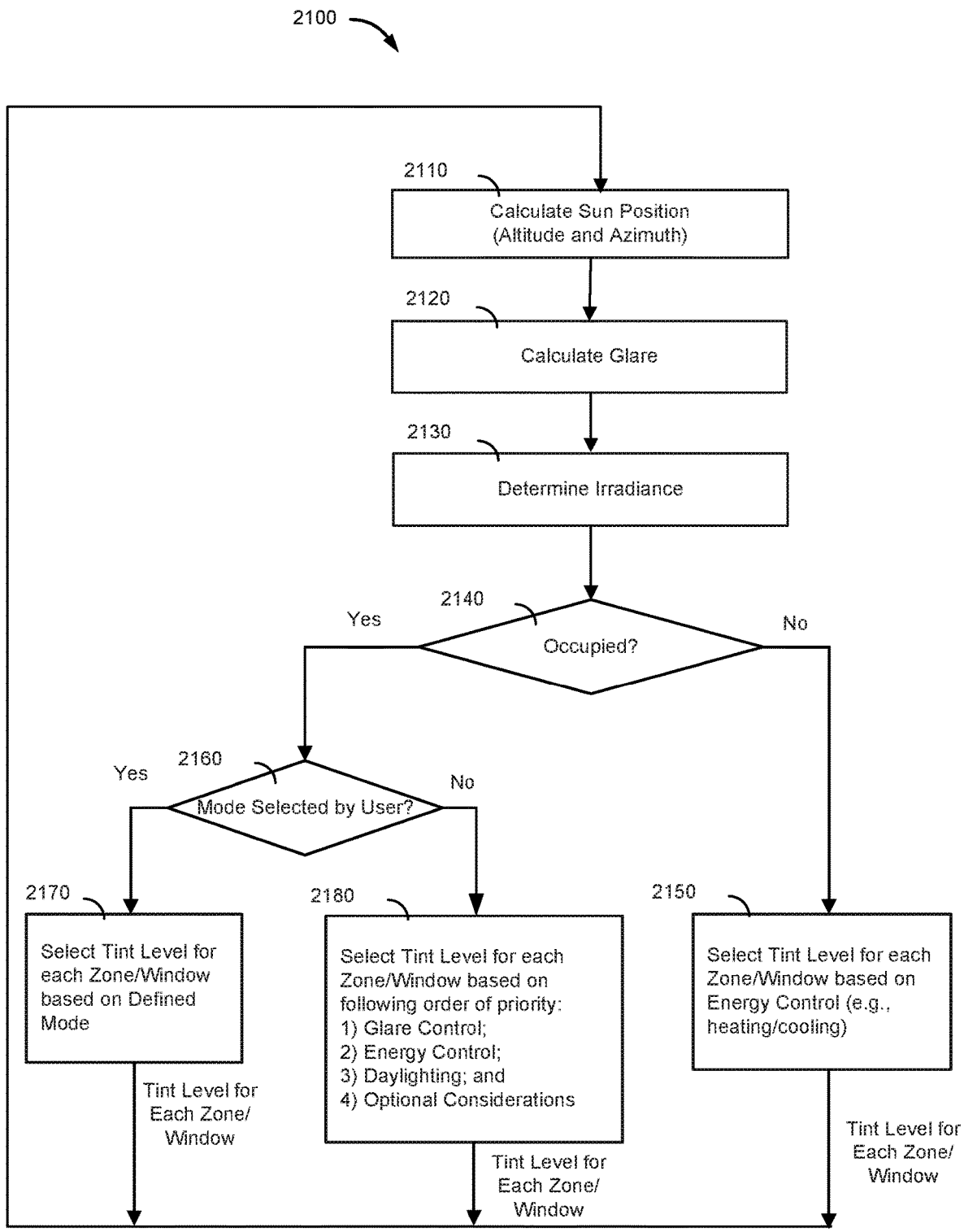
FIG. 21 is a flowchart of a control method for making tint decisions used to control multiple tinting zones of a multi-zone tintable window or of multiple tintable windows, according to embodiments.

FIG. 21 includes a flowchart depicting a method, 2100, illustrating operations used to make tinting decisions for multiple tinting zones/windows, according to embodiments. This control logic can be used to determine tinting decisions for multiple windows and/or for multiple tinting zones in one or more tintable windows, or combinations thereof. The instructions for this control logic are stored in memory and can be retrieved and executed by, e.g., a window controller such as the window controllers shown and described herein, particularly in relation to FIGS. 19 and 20. The control logic includes both instructions for making the illustrated tinting decisions to determine tint levels for the multiple tinting zones/windows as illustrated in the flowchart. The control logic also includes instructions for independently controlling the tinting zones/windows to transition them to the determined tint levels. In certain aspects, operations of this control logic may be adapted to determine tinting decisions to implement tinting configurations described herein.

At operation 2110, the position of the sun is calculated at the latitude and longitude coordinates of the window(s) and the date and time of day of a particular instant in time, $t_i$. The latitude and longitude coordinates may be input from a configuration file. The date and time of day may be based on the current time provided by a timer.

At operation 2120, the amount of direct sunlight transmitted into the room through each of the zones/windows is calculated at the particular instant in time used in operation 2110. The amount of sunlight (e.g., penetration depth) is calculated based on the position of the sun calculated in operation 2110 and the configuration of each zone/window. The zone/window configuration includes information such as the position of the window, dimensions of the window, orientation of the window (i.e. direction facing), and the details of any exterior shading. The zone/window configuration information is input from the configuration file associated with the zone/window.

At operation 2130, the level of irradiance in the room is determined. In some cases, the level of irradiance is calculated based on clear sky conditions to determine clear sky irradiance. A level of clear sky irradiance is determined based on window orientation from the configuration file and based on latitude and longitude of the building. These calculations may also be based on a time of day and date at the particular instant in time used in operation 2110. Publicly available software such as the RADIANCE program, which is an open-source program, can provide the calculations for determining clear sky irradiance. In addition, the level of irradiance may be based on one or more sensor readings. For example, a photosensor in the room may take periodic readings that determine the actual irradiance in the room.

Figure 23:
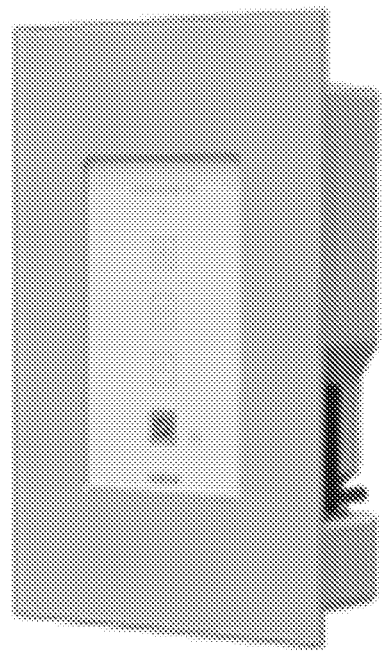
FIG. 23 is a photograph of a manual control panel, according to an embodiment.

At operation 2140, the control logic determines whether the room is occupied. The control logic may make its determination based on one or more types of information including, for example, scheduling information, occupancy sensor data, asset tracking information, activation data from a user via a remote control or a wall unit such as shown in FIG. 23, etc. For example, the control logic may determine that the room is occupied if scheduling information indicates that the occupant is likely to be in the room such as during typical working hours. As another example, the control logic may determine that the room is unoccupied if scheduling information indicates that it is a holiday/weekend. As another example, the control logic may determine that the room is occupied based on readings from an occupancy sensor. In yet another example, the control logic may determine that the room is occupied if the occupant has entered information at a manual control panel of a wall unit or remote control that indicates occupancy. In yet another example, the control logic may determine that the room is occupied (occupancy) based on information received from an asset tracking device such as a RFID tag. In this example, the occupants themselves are not being tracked. Including an occupancy sensor in the room either through a system like Bluetooth low energy (BLE) working with a device on an asset of the occupant or with an occupancy sensor, the control logic can determine whether the room is occupied.

If it is determined at operation 2140 that the room is unoccupied, the control logic selects a tint level for each zone/window prioritizing energy control to heat/cool the building (operation 2150). In some cases, other factors may be weighed in the selection of the tint level such as security or other safety concerns. The tint level determined at operation 2140 is used to transition the zone/window. The control logic then returns to operations 2110, 2120, and 2130, which are typically conducted on a periodic basis.

If it is determined at operation 2140 that the room is in occupied, the control logic determines whether a mode has been selected by a user (operation 2160) or for a particular occupant based on an occupancy profile. For example, a user (e.g. occupant or building operator) may select a mode at a user interface on a remote control or a wall unit such as shown in FIG. 23. In some cases, the GUI may have a button (e.g. icon) designated for selecting the mode, for example, a daylighting icon. Some examples of modes include: "daylighting mode," "uniform mode," "wellbeing mode," "emergency mode" as a user defined modes. For example, the user may define a "user 1-mode 1" with a particular tinting configuration.

If it is determined at operation 2160 that a mode has been selected by the user, then the control logic selects a tint level for each zone/window based on the mode (operation 2170). For example, if a "daylighting mode" has been turned on, then the tint level may determine the tint level based on the following factors in order of priority: avoiding glare and allowing natural light into the room through daylighting regions. The tint level selected at operation 2160 is used to transition the zone/window. The control logic then returns to operations 2110, 2120, and 2130, which are typically conducted on a periodic basis.

In some cases, three-dimensional projections of sunlight through each zone/window are calculated to the amount of direct sunlight transmitted into the room and to determine whether a glare condition exists in the room with the zone/window. A discussion of light projections and determining a glare condition based on light projections is discussed below with respect to FIGS. 24A, 24B, and 24C.

If it is determined at operation 2160 that a mode has not been selected by the user, then the control logic selects a tint level for each zone/window based on factors in the following order of priority: 1) glare control, 2) energy control, and 3) daylighting (operation 2180). In some cases, other secondary factors may also be weighted into the selection of the tint level including one or more of: a time delay to prevent rapid transitioning, color rendering, tinting gradient, feedback based on historical data, occupant's view of the external environment, and light harvesting. For example, when an occupant is in their typical location in the room, it may be desirable for them to see out the window, for example, to view weather patterns. If occupant's view of the external environment is taken under consideration in making the tinting decision, the control logic may determine that although a darkened tint state of a particular tinting zone/window would avoid glare, a lower tint level will be used to provide a more clear view of the external environment.

In one embodiment, three-dimensional projections of sunlight through each zone/window are calculated to the amount of direct sunlight transmitted into the room and to determine whether a glare condition exists in the room with the zone/window. A discussion of light projections and determining a glare condition based on light projections is discussed below with respect to FIGS. 24A, 24B, and 24C.

At operation 2180, to determine a tint level appropriate for the amount of glare determined in operation 2120, the control logic may use an occupancy lookup table to select an appropriate tint level for the zone/window based on the space type associated with the zone/window, glare amount calculated at operation 2120, and the acceptance angle of the zone/window. The space type and occupancy lookup table are provided as input from the configuration file for the particular window. Examples of an occupancy lookup table have different tint levels for different combinations of amount of glare and space type. For example, an occupancy lookup table may have eight (8) tint levels including 0 (lightest), 5, 10, 15, 20, 25, 30, and 35 (lightest). The lightest tint level of 0 corresponds to an SHGC value of 0.80, the tint level of 5 corresponds to an SHGC value of 0.70, the tint level of 10 corresponds to an SHGC value of 0.60, the tint level of 15 corresponds to an SHGC value of 0.50, the tint level of 20 corresponds to an SHGC value of 0.40, the tint level of 25 corresponds to an SHGC value of 0.30, the tint level of 30 corresponds to an SHGC value of 0.20, and the tint level of 35 (darkest) corresponds to an SHGC value of 0.10. In this example, the occupancy lookup table has three space types: Desk 1, Desk 2, and Lobby and six amounts of glare (e.g., penetration depths of sunlight into the room through the zone/window). The tint levels for Desk 1 close to the window are higher than the tint levels for Desk 2 far from window to prevent glare when the desk is closer to the window. An illustrated example of such an occupancy lookup table can be found in PCT/US15/29675, filed on May 5, 2015 and titled "CONTROL METHOD FOR TINTABLE WINDOWS."

In one embodiment, the control logic may decrease the tint level determined based on the amount of glare determined in operation 2120 based on irradiance levels determined at operation 2130. For example, the control logic may receive sensor readings of irradiance which indicates that a cloudy condition exists. In this case, the control logic may decrease the tint level of the zone/window that was determined to be associated with a glare condition.

At operation 2180, the control logic then determines whether to change, based on the second priority of energy control in the building, the tint level selected as appropriate for the amount of glare. For example, if the outside temperature is extremely high such that the cooling load is high, the control logic may increase the tint level in one or more zones/windows to reduce the cooling load. As another example, if the outside temperature is extremely cold, the control logic may decrease the tint level in one or more zones/windows while maintaining a darkened tint state in a zone/window that would otherwise cause glare on the occupancy region. The control logic then determines whether to change the tint level based on the third level of priority daylighting while accounting for energy control in the building and maintaining a darkened tint state in a zone/window that would otherwise cause glare on the occupancy region. The tint level determined at operation 2180 is used to transition the zone/window. The control logic then returns to operations 2110, 2120, and 2130, which are typically conducted on a periodic basis.

B. Factors for Improving Occupant Wellness

According to some aspects, control logic is designed to control the tinting of the tintable windows and functions of the other building systems to improve occupant wellness by maintaining visual comfort, thermal comfort, acoustic comfort, air quality, and other comfort factors for the particular occupant and associated space. For example, control logic discussed can maintain visual comfort by avoiding glare on the occupant's position or likely position, maintaining a light level and color temperature associated with occupant's visual comfort, minimizing contrast ratios in the room by adjusting natural lighting and/or adjusting the tinting of the windows and associated color of light in the room. Other techniques for avoiding glare are discussed below. Additionally or alternatively, the control logic may control the rate of transition between tint states. Also, certain tinting configurations may control the tinting gradient between adjacent tinting zones in different tint states and/or the tinting gradient within a particular tinting. Some configurations for controlling the tinting gradient between adjacent zones and within a particular zone are discussed above. Some configurations that address avoiding glare on the occupant's position or likely position, increasing natural lighting in the room, and/or the color of the windows and associated color of light in the room are also discussed above.

1. Glare Avoidance Using Passive or Active Manipulation of Light

In certain implementations, a multi-zone window includes one or more techniques for passive or active manipulation of light passing through the window to ensure there is no glare on the occupancy region and controls heat load while allowing for continuous daylighting into the room. These techniques can function along with controlling the tinting of the multi-zone window.

In one aspect, the window may have active or passive control over the direction of the light going into the room. Some examples of such techniques include micro shades, hexcells, light tubes, IR mirrors or IR reflectors, a film that absorbs IR or reflects IR. In one example, a window is designed to ensure that light is directed to be parallel when coming into a room by using micro shades, or hexcells, or thin film coatings. These techniques can be used to allow natural light into the building while avoiding glare, controls heat and allow for manipulation of the light, provides beneficial color rendering using natural daylight. In one example, a multi-zone window in the form of an IGU has light tubes in the region between the two lites. The light tubes are in a region proximal the tinting zones of the lites. Both tinting zones are in the clear state for continuous daylighting to pass sunlight incident the outer surface.

In another aspect, a multi-zone window in the form of an IGU includes one or more IR mirrors or IR reflectors in the region between the two lites of the IGU. In one example, the mirrors/reflectors are located in region aligned with one or more tinting zones that can be held in the clear state to allow continuous daylighting into the room when sunlight is incident the outer surface at that region.

In yet another aspect, a multi-zone window with an electrochromic device that comprises a film that absorbs IR or reflects IR to control the heat that is coming into a building and has active or passive control over the direction of the light going into the room.

—Microshades

In implementations with microshades, the micro shades or the window could be articulated to adjust the direction of the light that is going into the room. For example, the microshades can be articulated to orient them to direct light to bounce off the ceiling and/or to be kept parallel. In one example, a multi-zone window is round and can be (at least) rotated in the plane of the wall in which it is installed in order to harvest the light as the sun position and azimuth changes, for example, to direct light in the same direction as the position of the sun changes. The round window could additionally have controllably articulating microshades to change their orientation to ensure proper non-glare daylighting throughout the day. Some details of microshades and MEMS devices are described in U.S. patent application Ser. No. 14/443,353, titled "MULTI-PANE WINDOWS INCLUDING ELECTROCHROMIC DEVICES AND ELECTROMECHANICAL SYSTEMS DEVICES" and filed on May 15, 2015, which is hereby incorporated by reference in its entirety.

A multi-zone window with microshades would typically be installed above a tintable window/zone without microshades, and above the height of the occupant to help ensure that there will never be any glare on the occupant. If the window has active or passive aiming of the incoming light, the angle of the microshades can be adjusted to modify the angle to ensure there is no glare even if they were placed below the height of the occupant.

In some cases, multi-zone window with techniques for passive or active manipulation of light can be controlled based on input from a camera in the room or a sensor such as an occupancy sensor. When coupled with a camera in the room or a sensor, this configuration can use active aiming to optimally heat up the room when that is desired. In addition, coupling with interior active or passive reflective surfaces, the system could harvest the light and direct it to other areas of the building. For example, the light can be channeled to other areas using light tubes or directed to other areas by simply cutting holes in walls to allow the light to penetrate deeper into a building.

2. Color Rendering and Modified Color Temperature

The tint of a tintable window can change the amount of light transmitted through a tintable window, and the wavelength spectrum and associated color of the interior light transmitted into the room. Some tinting configurations described herein have techniques that provide preferential spectral selection of the incoming light. These techniques can augment lighting to balance both the interior rendered color and the amount of natural light in the appropriate wavelength to improve visual comfort, circadian rhythm regulation, and associated psychological effect. For example, a tintable window may include a filter layer that controls the transmission of natural daylight through the window. These techniques can improve the color and spectrum of the incoming daylight into the room and the comfort, visual perception, mood and wellbeing of the occupant. Some techniques can change the CCT (correlated color temperature) and CRI (color rendering index) of the light in a room to have incoming light-color closer to natural light.

One tinting configuration provides both natural lighting as well as filtered light. These configurations may also use artificial lighting to augment and/or adjust CCT and/or CRI. Other methods provide only filtered light and artificial lighting to augment and/or adjust CCT and/or CRI.

—Preferred Lighting for Occupant Using Color Balancing

As outlined above, described methods call for tinting in certain areas while not tinting in other areas, e.g. certain zones of a multi-zone tintable window or certain windows in a group of tintable windows, to reduce glare for the occupant while allowing ambient light to enter, so called "daylighting," that uses natural light to satisfy illumination requirements and color offset (color balance) e.g. from a tintable window's unwanted blue hue imparted to the occupant's space. Generally speaking, an occupant prefers natural sunlight over artificial lighting from, for example, incandescent, light-emitting diode (LED), or fluorescent lighting. However, with advancements in LED lighting technology, a much greater range of lighting possibilities, wavelengths, frequencies, colors, intensity or lumen ranges, and the like are possible. Specific embodiments use LED lighting technology to offset the blueness or other unwanted hue in the occupant's space due to the transmitted light from tintable windows. In certain embodiments, control of tintable windows includes control over LED lighting to correct this perceived and rendered color to produce an ambient lighting condition that the occupant would prefer. These methods can improve the color and spectrum of the incoming daylight into the room and the comfort, visual perception, mood and wellbeing of the occupant. Some methods change the CCT (correlated color temperature) and CRI (color rendering index) of the light in a room to have incoming light-color closer to natural light.

In some embodiments, LED lighting is used to augment daylighting from natural light sources, e.g. when the amount, angle of natural light entering the room or other factors make the natural lighting insufficient to offset coloration from the light filtered through tintable windows. For example, electrochromic windows may change the spectrum bandwidth, color and the amount of natural light that enters the room. By providing a preferred spectral selection to the incoming light one can provide augmented lighting to balance both the interior rendered color and the amount of natural light required in the appropriate frequency to ensure visual comfort, and, e.g., circadian regulation and improved psychological effect.

In certain embodiments, LED lighting is used as an alternative to natural light in order to achieve daylighting; that is, when only light filtered through tinted windows is available, LED lighting is adjusted to compensate for the unwanted color imparted by the tintable windows. For example, it may be the case that certain occupants desire a uniform window façade in terms of tinting, i.e. multi-zone windows or tinting some windows while not tinting others is undesirable from an aesthetics standpoint. In one embodiment, filtered light from a uniformly tinted window or group of windows, i.e. not using certain windows or zones to allow daylighting in to offset color, is measured for its color and light characteristics or calculated based on known filtering characteristics of the tintable windows. Based on the value obtained, LED lighting is used to offset unwanted color hue or other light characteristics in order to improve occupant comfort. Some methods change the CCT (correlated color temperature) and CRI (color rendering index) of the light in a room to have ambient light-color closer to that of natural light.

In these embodiments, the incoming light, with or without natural light, is either modeled through a predictive algorithm or directly measured with an in-room sensor, e.g. on the wall, e.g. in a wall unit such as described in relation to FIG. 23, or in one or more of the tintable windows allowing light into the space. In one example, a higher color temperature is maintained using LED lighting when tintable windows are in a less tinted (less absorptive) state, and a lower color temperature (e.g. more yellow) is imparted by the LED lighting when tintable windows are in a more tinted (more absorptive) state in order to maintain a CRI closer to natural lighting in the space. Further aspects of these embodiments are described below in the "Circadian rhythm regulation" and "Wellbeing Mode" sections of this description.

—Circadian Rhythm Regulation

In certain tinting configurations, the tinting is controlled, e.g., with filter(s), to change the wavelength spectrum of the incoming light to the appropriate light-wavelength to regulate the circadian rhythm and hence benefit the occupant.

In one technique, the tinting is controlled, e.g., with filter(s), to change the wavelength spectrum of the incoming light to a rendered color that the occupant would prefer. This technique allows for control over LED lighting or other lighting to correct this perceived and rendered color to a preferred lighting condition for the occupant. By controlling the transmission of a certain amount of natural daylighting at the appropriate wavelength/wavelengths, the circadian rhythm can be regulated which can be of benefit to the health and wellbeing of the occupant.

In these configurations, control logic can have operations that predict the amount and direction of the solar radiation or a sensor or sensors in the room can measure the amount and direction of the solar radiation. For example, an irradiance sensor in the room located on the wall or the window can send signals to the window controller with periodic measurements. In one case, this sensor may be certified, as in a health care setting, to be properly sensitive/tested and calibrated to guarantee the correct outcome. Alternatively we can get this information from the lighting system.

To provide circadian smart lighting, the window can have a specific sensor with a band gap filter and a time tracker to guarantee the window has provided the correct spectrum of natural light required for a specific time of day. This may be provided by the daylight coming through the window and/or by the augmented interior lighting that has been requested to provide the correct amount of appropriate wavelength of lighting.

—"Wellbeing Mode"

Moreover, the color of the interior light could have influence on the occupant's behavior in different spaces based on the function of the space. The control logic may have a separate logic module for control of the filtered natural light or augmented interior lighting to benefit the occupant's mood and behavior. The operations of this module may function differently depending on the function of the occupant's space in the room. In some cases, the user may be able to select a "wellbeing mode" on a user control panel to have the light in the room controlled according to this module designed to improve the occupant's mood and behavior.

In some cases, the control logic can be adapted to predict the wavelength and intensity of the exterior lighting and then combine it with the current tint-level spectral characteristics and predict the spectral distribution of incoming daylight into the room. The wavelength and intensity of the exterior lighting could be predicted, for example, using a weather service and a calculated sun angle based on a solar calculator.

Including an occupancy sensor in the room either through a system like BLE working with a device on the occupant or with an occupancy sensor, the control logic can choose whether to control the daylighting and the windows with respect to the occupancy profile.

Alternatively if the room has a camera capable to record luminance and light-spectrum in the room, the camera images can be used to determine both whether there is an occupant, where the occupant is located, and what offset or change in the interior light would be needed to correct the EC filtered light. This camera could also be calibrated to ensure the occupant with respect to time-of-day and specific location is getting the appropriate amount of appropriate light spectrum to benefit their circadian rhythm. Alternatively by using a plethora of sensors in the ceiling or in each light, the sensor data can be used to verify an occupant, whether there is occupancy in a particular location and the color rendering of the lighting needed as well as the appropriate amount of light spectrum to benefit occupant's circadian rhythm.

Tinting decisions based on wellbeing considerations are based on one or more factors including: (1) lighting in the room with the appropriate wavelength spectrum to regulate occupant's circadian rhythm; (2) determining of occupancy location to verify the lighting and exposure time for that occupant is met; (3) providing appropriate color rendering index of the interior light in the room to correct the EC IGU's filtered light color based on a predefined color rendering; (4) Correlated color temperature of the interior light in the room to correct the EC IGU's filtered light color based on a predefined CCT amount, which can be applied to improve psychological effect of light in specified interior spaces; (5) account for unique sensors that are certified to support the appropriate spectral distribution of lighting to benefit occupant's circadian rhythm; and (6) lighting objectives that change based on if there is an occupant being effected by the lighting that is being controlled by either the interior lighting or the EC IGU's filtered light.

C. Example of Control Logic for Controlling Tint of Tintable Window(s)

In certain implementations, control logic includes operations that determine and control tint in a tintable window (e.g., electrochromic window) to account for occupant comfort and/or energy conservation considerations. In some cases, the control logic includes multiple logic modules. Tint level and/or other calculations determined by one logic module are input to another logic module to calculate a final tint level determined by all the modules. If an override applies, an override value may be used as the final tint level. Once the control logic determines the final tint level, the control logic sends control signals with tint instructions to transition the tintable window to the final tint level. An example of control logic with logic modules configured to determine a tint level for a tintable window can be found in international PCT application PCT/US15/29675, filed on May 5, 2015 and titled "CONTROL METHOD FOR TINTABLE WINDOWS," which is hereby incorporated by reference in its entirety. Another example of control logic with logic modules configured to determine a tint level for a tintable window can be found in international PCT application PCT/US16/41344, filed on Jul. 7, 2017 and titled "CONTROL METHOD FOR TINTABLE WINDOWS," which is hereby incorporated by reference in its entirety.

In some implementations, control logic uses one or more of three logic modules (also referred to herein as "Module A," "Module B," and "Module C") to determine the tint level for a tintable window between the interior and exterior of a building. Each control logic module can determine a tint level based on a time in the future. For example, the future time used in the calculations may be a time in the future that is sufficient to allow the transition to be completed after receiving tint instructions. In this example, the controller can send tint instructions in the present time in advance of the actual transition. By the completion of the transition, the window will have transitioned to a tint level that is desired for that time.

Module A can be used to determine tint level that considers occupant comfort from direct sunlight through the tintable window onto an occupancy area or their activity area. The tint level is determined based on a calculated penetration depth of direct sunlight into the room and the space type (e.g., desk near window, lobby, etc.) in the room at a particular instant in time. In one example, the penetration depth is calculated at a time in the future to account for the time it takes to transition the window to a new tint level. Publicly-available programs can be used to calculate the sun's position based on time of day, day of year, and latitude and longitude of the building. The first module can calculate the penetration depth is calculated based upon the geometry of the window (e.g., window dimensions), its position and orientation in the room, any fins or other exterior shading outside of the window, and the calculated position of the sun (e.g. angle of direct sunlight for a particular time of day and date). Each space type is associated with different tint levels for occupant comfort. For example, if the activity is a critical activity such as work in an office being done at a desk or computer, and the desk is located near the window, the desired tint level may be higher than if the desk were further away from the window. As another example, if the activity is non-critical, such as the activity in a lobby, the desired tint level may be lower than for the same space having a desk. The tint level calculated by Module A is input to Module B.

The control logic of Module B can be used to determine tint level based on irradiance transmitted through the window(s) under clear sky conditions (also referred to as "clear sky irradiance"). The radiation may be from sunlight scattered by molecules and particles in the atmosphere. A program such as the open source program RADIANCE program, can be used to calculate clear sky irradiance based on latitude and longitude of the building, day of year and time of day, and orientation of the window(s). In one example, Module B can be used to determine a tint level that is darker than the tint level input from Module A and transmits less heat than the datum glass is calculated to transmit under maximum clear sky irradiance. Maximum clear sky irradiance is the highest level of irradiance for all times calculated for clear sky conditions. In one example, Module C then uses the solar heat gain coefficient of the datum glass (Datum SHGC) and calculated maximum clear sky irradiance to determine a tint level. Module B increases tint level calculated in Module A incrementally and picks a tint level where the inside radiation is less than or equal to the Datum Inside Irradiance (Datum SHGC×Maximum Clear Sky Irradiance). The tint level calculated in Module B and the calculated clear sky irradiance are input into Module C.

The control logic in Module C can be used to determine tint level based on real-time external irradiance based on direct or reflected light impinging the tintable window. The real-time external irradiance accounts for light that may be obstructed by or reflected from objects such as buildings or weather conditions (e.g., clouds) that are not accounted for in the clear sky calculations made in Module B. The real-time external irradiance can be calculated based on one or more of: measurements taken by external sensor(s), weather feed data received over a communication network, determined cloud cover conditions at the building, etc. Generally, the control logic of Module B will determine a tint level that darkens (or does not change) the tint level determined by Module A and the control logic of Module C will determine a tint level that lightens (or does not change) the tint level determined by Module B.

The control logic in Module C can determine the inside irradiance in the room based on the external irradiance and the current tint level of the tintable window. For example, Module C can determine a calculated inside irradiance based on clear sky irradiance calculations using the equation: Calculated Inside Irradiance=Tint Level SHGC×Calculated Clear Sky Irradiance. Module C can calculate a real-time inside irradiance based on external sensor readings or other external data using the equation: Real-time Inside Irradiance=Tint Level SHGC×Irradiance Readings. In one implementation, Module C calculates the inside irradiance of the room with the tintable window having the tint level determined in Module B using the above equation and then determines a tint level that meets the condition where the Real-time Inside Irradiance is less than or equal to the Calculated Inside Irradiance based on the tint level from B.

Module B and/or Module C can determine a tint level that accounts for energy conservation in addition to occupant comfort. These modules may determine energy savings associated with a particular tint level by comparing the performance of the tintable window at the determined tint level to a datum glass or other standard reference window. The purpose of using this reference window can be to ensure that the control logic conforms to requirements of the municipal building code or other requirements for reference windows used in the locale of the building. Often municipalities define reference windows using conventional low emissivity glass to control the amount of air conditioning load in the building. As an example of how the reference window fits into the control logic, the logic may be designed so that the irradiance coming through a given tintable window is never greater than the maximum irradiance coming through a reference window as specified by the respective municipality. In disclosed embodiments, control logic may use the SHGC value of the tintable window at a particular tint level and the SHGC of the reference window to determine the energy savings of using the tint level. Generally, the value of the SHGC is the fraction of incident light of all wavelengths transmitted through the window. Although a datum glass is described in many embodiments, other standard reference windows can be used. Generally the SHGC of the reference window (e.g., datum glass) is a variable that can be different for different geographical locations and window orientations, and is based on code requirements specified by the respective municipality.

Once Modules A, B, and C determine a final tint level, the control logic may receive an override that causes an override value to be used as the final tint value. One type of override is a manual override by an occupant of a room that determines that a particular tint level (override value) is desirable. There may be situations where the manual override is itself overridden. Another example of an override is a high demand (or peak load) override, which is associated with a requirement of a utility that energy consumption in the building be reduced. Once the control logic determines the final tint level, the control logic sends control signals with tint instructions to transition the tintable window to the final tint level.

D. Control Logic for Adjusting Artificial Interior Lighting and/or Tinting

As mentioned above, the tint of an electrochromic window or other tintable window can change the wavelength spectrum and associated color of the light transmitted through the tinted window to render color in the room. For example, certain electrochromic windows in darker tint states may impart a blue color in the room. Certain techniques described herein involve control logic for controlling artificial interior lighting to augment the interior rendered color from one or more electrochromic windows or other tintable windows in the room. These techniques can be used to control the levels of the color rendering index (CRI) and/or correlated color temperature (CCT) in the interior of the room in order to, for example, improve visual comfort, regulate circadian rhythm, etc. The CRI is a measurement of the ability of interior lighting to accurately render all colors of objects to the human eye. Usually CRI values are measured on a scale from 0 to 100 percent where the higher to the CRI value, the better the color rendering. The CCT is a temperature measurement of the color characteristics of lighting in the visible spectrum. CCT values are typically measured in degrees of Kelvin (K).

In certain implementations, techniques involve control logic that determines the current value of the internal CRI of a room and if the current value is not the desired value, control signals are sent to adjust the artificial interior lighting to augment the internal lighting to render the desired internal CRI. In addition or alternatively, certain implementations determine the current value of the internal CCT of a room and/or adjust the interior lighting to render the desired internal CCT. In these techniques, the current value of the internal CRI/CCT is determined based on input from external sensors located outside the building, internal sensors located in the room, and/or tint state of one or more electrochromic windows between the interior of the room and the exterior of the building. Some examples of types of external sensors that may be implemented include an infrared sensor, an ambient temperature sensor, and a visible light photosensor. In implementations with one or more external sensors, the external sensors are generally located in contact with the environment outside the building with the room. In some cases, the external sensors are located on a facade near the electrochromic window(s), for example, to determine the level of irradiance at the windows in order to determine an external CRI/CCT outside the window. In another case, external sensors may be located on a roof of the building. In other cases, the external sensors may be located at a different building. In some cases, external sensor data may be used to forecast weather conditions and the weather feed data communicated to a controller sending control signals to the artificial interior lighting for adjustments and/or to the electrochromic windows to transition tinting. An example of an arrangement of external sensors that can be used is in a multi-sensor device described in detail in U.S. patent application Ser. No. 15/287,646, titled "MULTI-SENSOR," which is hereby incorporated by reference in its entirety. Such a multi-sensor device can be installed on the roof of a building. In one implementation, the multi-sensor device includes a ring of radially-oriented and outwardly-facing photosensors with different orientations, a photosensor facing vertically upward, one or more IR sensors, and a temperature sensors. In one example, the readings from the IR sensors and the temperature sensor can be used to determine cloud cover conditions. In addition or alternatively, the irradiance readings from different radially-oriented photosensors can be used to calculate an irradiance value in an orientation that is different from the orientations of the photosensors. Using this technique, the external irradiance from different radially-oriented photosensors can be used to determine the external irradiance of a window of another orientation. An example of such a technique is described in PCT publication PCT/US15/52822, titled "COMBI-SENSOR SYSTEMS" filed on Apr. 7, 2016, which is hereby incorporated by reference in its entirety. Some examples of internal sensors that can be implemented by these techniques include a visible light photosensor, a temperature sensor, and other sensors that can be used to calculate the internal CRI of the room and the CRI external to the window. The internal sensors may be located at various suitable locations within the room such as, for example, at or near the artificial interior lighting, at or near occupant activity areas such as desktops or the tops of conference room tables, walls, etc. In addition, an example of a commercially-available device for measuring CRI and that can be used as either an internal sensor for measuring internal CRI or an external sensor for measuring external CRI is the CL-70F CRI illumination meter by Konica Minolta®. Another example is the C-700 SpectroMaster by Sekonic.

These techniques can be used with various types of artificial interior lighting including, for example, incandescent lighting, light-emitting diode (LED), and/or fluorescent lighting. A commercially-available example of artificial interior lighting that can be used in these implementations is the hue' personal wireless lighting system made by Phillips®. Another commercially-available example of artificial interior lighting that can be used is the Aurora Lighting Smarter Kit made by Nanoleaf®.

Below is a chart illustrating four exemplary scenarios of combinations of input that can be used by control logic to control the internal CRI in a room. Although the control logic of these scenarios is described with reference to a single electrochromic window, it would be understood that the disclosure is not limiting and that this control logic can be used with a room having multiple electrochromic windows or other tintable windows.

| Scenario | External Sensor(s) | Internal Sensor(s) | Internal Color Rendering Index (CRI) Control |
| --- | --- | --- | --- |
| 1 | No | No | Based only on tint state of glass |
| 2 | No | Yes | Based on internal sensor readings, CRI is adjusted using LED lighting |
| 3 | Yes | No | Based on external sensor reading & tint state of glass, internal CRI is determined as a function of external CRI being transformed to an internal CRI which is adjusted to a desired CRI using LED lighting |
| 4 | Yes | Yes | Selectable for #2, #3, or both (by user or algorithm) |

In the first scenario, the internal CRI is controlled based only on the tint state of the electrochromic window. Input from any internal or external sensors is not used to control the internal CRI. In one implementation, each tint state of the electrochromic window is mapped to a particular internal CRI value or a range of internal CRI values (e.g., in a lookup table). These values may be calculated ahead of time e.g. by measuring CRI values through various tint states of the product glass in questions. The control logic determines the tint state of the electrochromic window that maps to the desired CRI value/range. For example, the darkest tint state (e.g., 1% T) may map to an internal CRI value corresponding to rendering a blue hue in the room. In this implementation, the control of the internal CRI value/range may not depend on knowledge of the light conditions external to the electrochromic window. It may depend, e.g., on whether the room is occupied or not, more specifically if the lights are on or not. The desired CRI may be preset to user preferences based on the tint state of the glass. For example, when the tint state is at a certain level, and the lights are on in a room occupied by the user, the internal lights may be automatically adjusted to provide the preset CRI. The lighting adjustment may be after the tint state of the glass is reached, or the lighting may change dynamically during the glass' tint state change. No sensor readings are needed for input in this mode, because the CRI is not actively measured, but rather preset based on measurements and/or calculations based on user preferences ahead of time. The external conditions, though relevant to the internal CRI, are not measured, that is, because the glass is in a particular tint state, it is assumed that the external lighting conditions warrant the glass being so tinted, therefore the CRT is adjusted based solely on the tint state of the glass.

In certain embodiments, sensor readings are used to augment accuracy of the CRT adjustment to the desired value. For example, in the second scenario, measurements from one or more internal sensors in the room are used to control the internal CRT value of the room. Measurements from any external sensors or the tint state of the electrochromic window are not used to determine the internal CRT value. Since the electrochromic glass transforms the exterior light as it passes through the glass, in this embodiment, the external lighting conditions are irrelevant, the internal lighting conditions are determined using one or more internal sensors and adjusted accordingly to obtain the proper/desired CRT. An occupancy sensor may be used to augment the CRT adjustment along with a light sensor. For example, if the room is not currently occupied, the CRT adjustment may be avoided or made less optimal for occupants and e.g. more in line with energy savings from the lighting system. When the room is occupied, the CRT adjustment using lighting may override potential energy-saving settings in favor of optimal CRT for the occupants. In one implementation, the one or more internal sensors may be calibrated or designed to measure the internal CRT of the room. In another implementation, ranges of internal sensor measurements may be mapped to internal CRT values (or ranges), for example, in a lookup table. The control logic in this example determines that the internal sensor measurement is within a particular range and determines the CRT value associated with that range. In this second scenario, the artificial interior lighting is adjusted based on the internal sensor(s) measurements. The measurements from the internal sensor(s) control adjustments made to the artificial interior lighting. In some embodiments, the internal CRT is simply adjusted to user preference with internal sensor measurements as an input to obtain the desired result. In another embodiment, the control logic compares the measured internal CRT value to the proper/desired value and if there is a difference, the control signals adjust the artificial interior lighting to augment internal lighting in the room based on the difference.

In the third scenario, measurements from one or more external sensors and the tint state are used to obtain the desired internal CRT value of the room (also referred to herein as "CRT in"). The control logic calculates or measures (e.g., utilizing the multi-sensor device) the external CRI (also referred to herein as "CRI out"). Based on the tint state of the electrochromic glass, the control logic transforms the external CRI into an internal CRI by calculating the internal CRI based on the external CRI and know light absorption and color changing characteristics of the glass in question. Then, the control logic sends a signal to the artificial lighting (e.g., LED lighting) to tune to a preferred or customized CRI value in the room (if the calculated internal CRI is not already at the preferred level, the logic makes this comparison). In this third scenario, measurements from internal sensors are not used. Since the electrochromic glass transforms the exterior light as it passes through the tinted glass, the internal CRI can be calculated based on the measurements of the external CRI and the tint state of the glass. The internal lighting conditions are not needed. The external CRI can be based on measurements taken by one or more external sensors. In one implementation, the one or more external sensors may be calibrated or designed to measure the external CRI proximate the window(s) and/or the building area generally. In another implementation, ranges of external sensor measurements may be mapped to external CRI values (or ranges), for example, in a lookup table. The control logic uses the external CRI value and the tint state characteristics of the glass to obtain the internal CRI value and then adjusts it to match a desired value, if it does not already match it. In one implementation, different combinations of tint states and external CRI values may map to particular internal CRI values. For example, assuming a curtain wall of windows are all in the same tint state, one internal CRI may be obtained, but if one or more windows of the curtain wall of windows are tinted to different tint states, a different internal CRI value is obtained and can be adjusted by changing the interior lighting accordingly. In one embodiment, the internal CRI is simply adjusted from a calculated value based on the tint state of the window(s) and the measured external CRI. In another embodiment, the control logic compares the calculated internal CRI value to the desired result. In another embodiment, the control logic compares the measured internal CRI value to the proper/desired value and if there is a difference, the control signals adjust the artificial interior lighting to augment internal lighting in the room based on the difference.

In the fourth scenario, the control logic uses user input to determine whether to control the internal CRI in the room based on measurements from one or more external sensors and/or based on measurements from one or more internal sensors. That is, combinations of the second and third scenarios, e.g. based on user preference and/or accuracy of the method (inside sensor(s), outside sensor(s) or both), which may depend on the internal and external CRI measurement accuracy (which may be a function of the lighting conditions and accuracy or effectiveness of sensors in those conditions, e.g. overcast conditions for an external sensor). If the user input selects external sensors to be used, the control logic uses measurements from one or more external sensors to determine the internal CRI in the room according to the third scenario described above. If the user input selects internal sensors to be used, the control logic uses measurements from one or more internal sensors to determine the internal CRI according to the second scenario described above. The control logic then sends control signals to adjust the artificial interior lighting to augment internal lighting in the room to or near the desired internal CRI. In other embodiments, external CRI is determined using sensors and thus a more accurate determination of internal CRI may be made, either by calculation or with the aid of internal sensor measurements. The user has preference, or the algorithm chooses based on preset criteria, whether or not to use one or both of internal and external sensors to determine external and/or internal lighting conditions as input(s) to determining the proper internal CRI. The import of the fourth embodiment is that sensors, internal and/or external, may be more helpful in certain ambient conditions than others. For example, it may be that when overcast conditions dominate externally, external sensors are less effective to provide accurate data for input to control logic, and it is more accurate to simply use internal sensors only for determining and adjusting internal CRI.

Although these four scenarios are described above in terms of adjusting artificial interior lighting so that the lighting in the room is at or near a desired internal CRI, it would be understood that adjusting artificial interior lighting can be used to alter the lighting in the room to match particular preset values of CRI and CCT, or CCT in other embodiments.

In certain implementations of these techniques that adjust artificial internal lighting, the user may input settings that are used to adjust the artificial interior lighting. In one implementation, in the fourth scenario, the user can determine whether to internal and/or external sensors are used to control the internal CRI of the room. For example, the user may be a building system administrator that selects using external sensors when there are no internal sensors in the room or when the internal sensors are not operational. In another implementation, a user provides CRI and/or CCT settings for use in the room. The user may enter the settings on a user interface, for example, of a mobile device, a wall unit such as, for example, shown in FIG. 23, or other suitable computing device in communication through a communication network with the controller or controllers executing the control logic. In some cases, the user may input a schedule of different preferred CRI and/or CCT settings to use at different times of day and days of the year. In other cases, the user may enter an override setting. In another implementation, the user may select what type of sensor input or combination of sensors input is used to determine the internal CRI of the room. For example, the user may select to use weather feed data to determine the internal CRI according to the third scenario where the weather feed data is derived from a particular combination of external sensors. In some cases, these external sensors may be located at a separate building and the weather feed data communicated via a communication network to the controller(s) at the building with the room. In certain implementations, the control software automatically takes into account ambient weather conditions as an input to adjust internal CRI and whether or not to use external and/or internal sensors.

In one implementation, the control logic learns from the historical data of user input. For example, instances of one or more users in a room inputting CRI/CCT settings and the associated times (day of year and time of day) of the input may be stored in memory as historical data. The trends in the historical data may be evaluated to predict appropriate CRI/CCT settings at a future time. For example, an occupant of a room may select a particular CRI setting every day at the same time each work day in a week. The control logic stores this information as historical data, evaluates the historical data as a trend, and sets the desired internal CRI level to this setting at that same time (or just before that time) during the work day of the following week. In this way, the control logic can adapt its CRI/CCT settings automatically to user preferences.

According to certain implementations, the control logic of the above scenarios is incorporated into predictive logic that determines tint state of one or more electrochromic windows and/or adjustments to interior lighting to obtain the desired internal CRI at a time in the future. An example of logic modulus Module A, Module B, and Module C of Intelligence®, commercially available from View, Inc. of Milpitas, California, that can be used to calculate tint state of one or more electrochromic windows to account for occupancy comfort and/or energy considerations is described in the section above. Another example of other predictive control logic for determining tint state of electrochromic windows is described in U.S. patent application Ser. No. 15/347,677, filed on May 7, 2015, and titled "CONTROL METHOD FOR TINTABLE WINDOWS," which is hereby incorporated by reference in its entirety.

Figure 22:
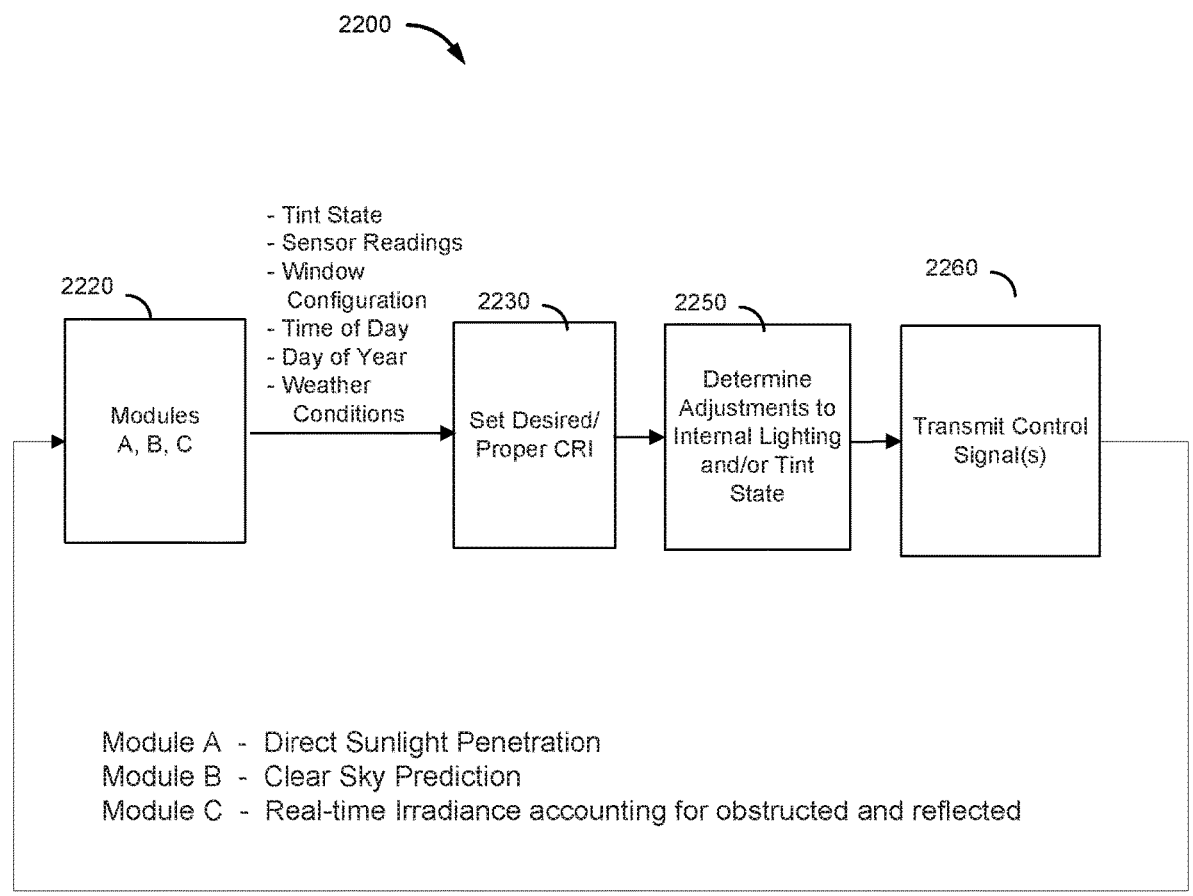
FIG. 22 is a flowchart of a method that implements control logic for adjusting artificial interior lighting to augment the interior rendered color in a room having one or more tintable windows, according to embodiments.

FIG. 22 is a flowchart 2200 of a method that implements predictive control logic for controlling the internal CRI of a room having one or more electrochromic windows, according to embodiments. Although this method is described with respect to electrochromic windows, the method can be implemented with other tintable windows. At operation 2220, the control logic uses one or more of Modules A, B, and C to calculate tint levels for one or more electrochromic window(s) in a room at a time in the future. In one case, the future time used in the calculations may be a time sufficiently far into the future to allow transition of the windows to be complete after receiving control signals with tint instructions. Details regarding Module A, B, and C are described in the section above. Module A, B, and C output tint levels for the one or more electrochromic window(s) at a future time, sensor readings (interior and/or exterior), window configuration including orientation, time of day, day of year, optionally weather conditions, and other data used by the modules.

At operation 2230, the predictive control logic determines the desired/proper internal CRI at the future time. In certain implementations, the desired internal CRI is preset to user preferences. In one example, the desired internal CRI may be based a trend in historical data of user input for controlling the artificial interior lighting in the room. As another example, the desired internal CRI may be an override value entered by a user. Additionally or alternatively, the desired internal CRI may be based on schedule information. This schedule may be determined or adjusted by the user in some cases. In other cases, the control logic may adjust the schedule based on historical data.

At operation 2250, the control logic determines adjustments to the interior lighting and/or tint states of the electrochromic windows to obtain the desired/proper internal CRI in the room. For example, the control logic may determine the types of lights to activate, color or colors or light to activate, the intensity level settings of the activated lights, location of the lights activated, number and arrangement of lights to activate, etc.

Once the adjustments are determined, the control logic sends control signals for adjusting the artificial interior lighting in the room and/or tint state of the electrochromic windows (operation 2260). The method then iterates back to operation 2220.

In an implementation according to the first scenario, the internal CRI of the room is determined based on the tint state of the one or more electrochromic windows. In one example, when the tint state from Modules A, B, and C is at a certain level, and the interior lighting is on in the room occupied by the user, the control logic automatically determines adjustments and sends control signals to automatically adjust the internal lights to provide the internal CRI preset by the user.

According to an implementation of the second scenario, the measurements from one or more internal sensors in the room are used to determine the internal CRI value of the room. In one example, the control logic automatically determines adjustments to the interior lighting and/or tint levels that adjust the CRI value to the desired level.

According to an implementation of the third scenario, measurements from the one or more external sensors can be used to determine an external CRI which is transformed to an internal CRI based on the tint levels of the one or more electrochromic windows. For example, assuming a curtain wall of windows are all in the same tint state one internal CRI may be obtained, but if one or more windows of the curtain wall of windows are tinted to different tint states, a different internal CRI value is obtained and can be adjusted by changing the interior lighting accordingly. In one embodiment, the internal CRI is simply adjusted from a calculated value based on the tint state of the window(s) and the measured external CRI.

According to an implementation of the fourth scenario, measurements from the one or more external sensors and/or internal sensor may be used to determine the internal CRI and determine adjustments as described above with respect to the first and second scenarios.

In certain implementations, predictive control logic with Modules A, B, and C also includes an override logic module based on the four scenarios. In this implementation, the override logic module can adjust (override) the tint state of the one or more electrochromic windows determined by Module A, B, and C and/or adjust the interior lighting to obtain the desired CRI in the room. For example, when implementing the third scenario, the control logic may determine that if the tint levels output from Module A, B, and C were used, a curtain wall of windows would be in the darkest tint state at a future time. In this case, to obtain the proper CRI the interior lighting would need to be adjusted to high intensity settings at the future time. The control logic may also determine that if a subset of the windows were kept at a lower tint state, a proper CRI can be obtained without interior lighting being on. In this example, the control logic may determine to adjust the subset of the windows to the lower tint state at the future time and not adjust the interior lighting.

E. Occupancy Input and Dynamic Awareness of Occupant(s) Locations

In certain implementations, control logic is used to control the tint state of each of the tinting zones of a multi-zone tintable window, individual windows of a group (or zone) of windows, or combinations thereof. In some cases, the control logic first determines whether the room with the window is occupied or unoccupied. The control logic may make its determination based on one or more data such as, for example, one or more of scheduling information, occupancy sensor data, asset tracking information or other occupant tracking data, activation data from a user via a remote control or a wall unit such as shown in FIG. 23, etc. The remote control may be in the form of handheld device such as a smart phone or may be a computing device such as a laptop. For example, the control logic may determine that the room is occupied if scheduling information indicates that the occupant is likely to be in the room. As another example, the control logic may determine that the room is occupied based on readings from an occupancy sensor. In yet another example, the control logic may determine that the room is occupied if the occupant has entered information at a manual control panel of a wall unit or remote control that indicates occupancy.

If the room is occupied, the control logic determines whether a glare condition exists in the area that is occupied or is likely occupied. The control logic determines the tint states for the tinting zones based on the locations of the occupant(s) in the room. For example, the tint states can be determined to avoid glare on a desk or other area that may be likely or is occupied. In some cases, the current location of the occupant(s) is based on the information retrieved from an occupancy lookup table. In other cases, the current location of occupants is based on the data in a signal from a sensor (e.g., occupancy sensor). The sensor may generate the signal with the location of an occupant in the room. The window controller may receive the signal. As another example, a user may provide data regarding the location of an occupant in the room, for example, via a control panel in the room.

FIG. 23 is a photograph of an example of a wall unit with a manual control panel, according to an embodiment.

In certain aspects, a control method determines tint states for tinting zones in a multi-zone tintable window having a daylighting tinting zone. In these cases, the control method determines tint states that maximize daylight while controlling glare and/or heat load from solar radiation entering the room. In certain aspects, the user can use a control panel (e.g., manual control panel in room or computer interface) to select a "daylighting mode" or a "uniform mode," another predetermined mode, or a mode customized by the user. For example, the user may be able to customize different tint states for the zones of the windows in the room e.g., "user 1-mode 1." In the "daylighting mode," the control method determines a clear or lighter tinting state for the daylighting tinting zone than for other tinting zones of the window. In the "uniform mode," the control method determines tint states for the zones based on criteria other than for purpose of daylighting.

E. Feedback Learning Multi-Zone Preferences/Occupancy Patterns

In certain aspects, the control logic used to control the tint states of the tinting zones/windows is based on feedback learning of preferences and occupancy patterns. For example, the locations of an occupant at different times/dates as determined by sensors, from user input, etc. may be stored as occupancy patterns. These locations of occupancy at different times/dates may be used to predict the locations of the occupant at a future time. The control method may then control the tint states based on the predicted locations of the occupant.

As another example, user input selecting certain tint states at certain times for different tinting zones may be stored. These tinting selections of the user may be used to predict the tint states that may be desired in the room. The control method may then control the tint states according to these predicted tint states desired by the user.

F. Light Projections into Room Used to Determine Glare Condition

In certain implementations, control logic includes instructions that determine whether direct sunlight through a tinting zone generates a glare condition in an occupancy region by calculating a three-dimensional projection of light from the tinting zone through the room. The three-dimensional projection of light may be considered to be a volume of light in a room where the outside light directly penetrates into the room. For example, the three dimensional projection may be defined by parallel light rays from the sun through a tinting zone of the multi-zone window. The direction of the three-dimensional projection into the room is based on Sun azimuth and/or sun altitude that can be calculated with a solar calculator based on the time of day and the longitudinal and latitudinal coordinates of the window. The three-dimensional projection of light can be used to determine intersections with occupancy regions in the room. The control logic determines the light projection at a particular plane and determines the amount that the light projection or a glare area associated with the light projection overlaps with the occupancy region. If the light projection is outside of the occupancy region, a glare scenario is determined to not exist. Details of control logic that uses three-dimensional projection of light to determine glare scenarios is described in PCT application PCT/US15/29675, filed on May 5, 2015 and titled "CONTROL METHOD FOR TINTABLE WINDOWS," which is hereby incorporated by reference in its entirety.

Figure 24A:
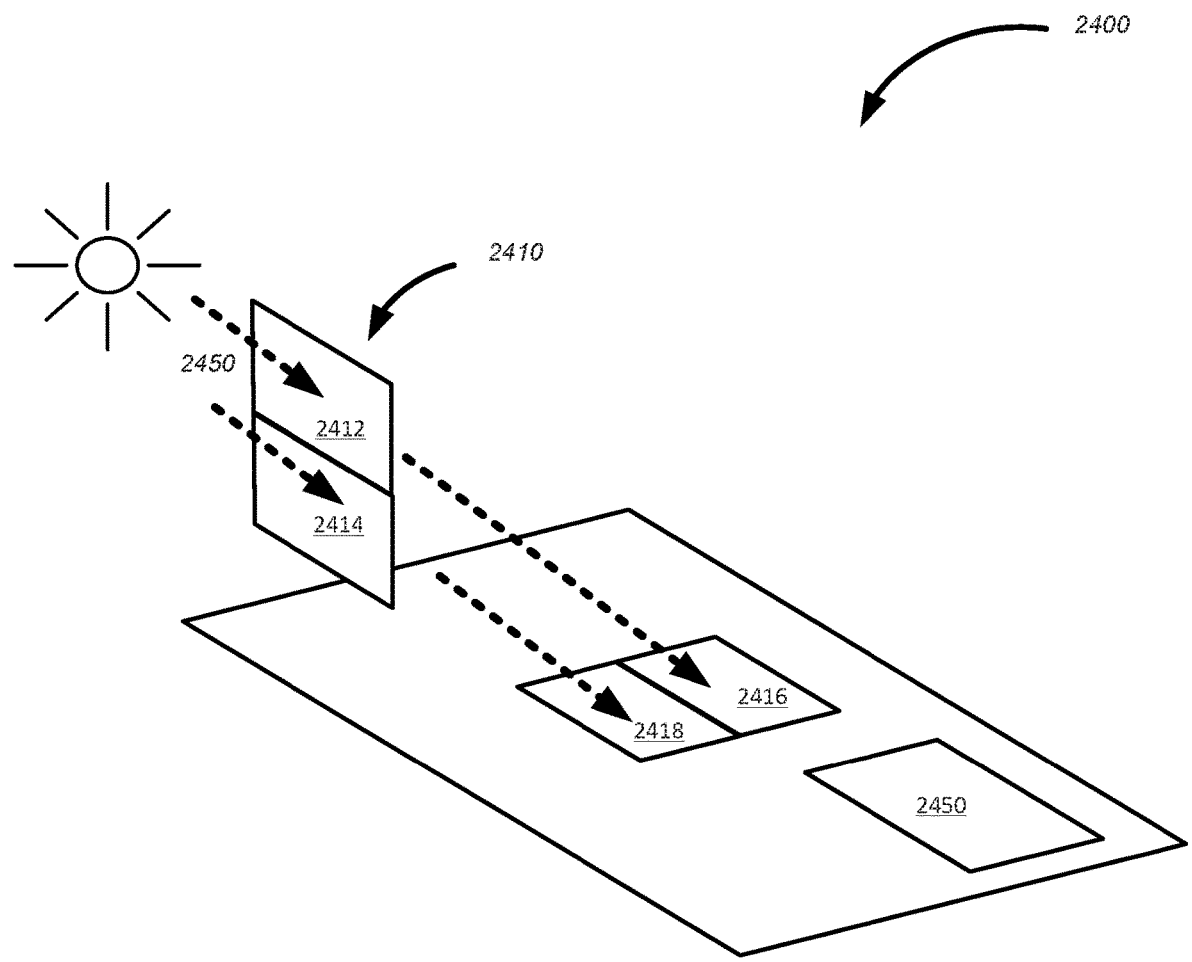
FIG. 24A is a schematic drawing of a view of a room having a multi-zone window and light projections through the tinting zones, according to an embodiment.
Figure 24B:
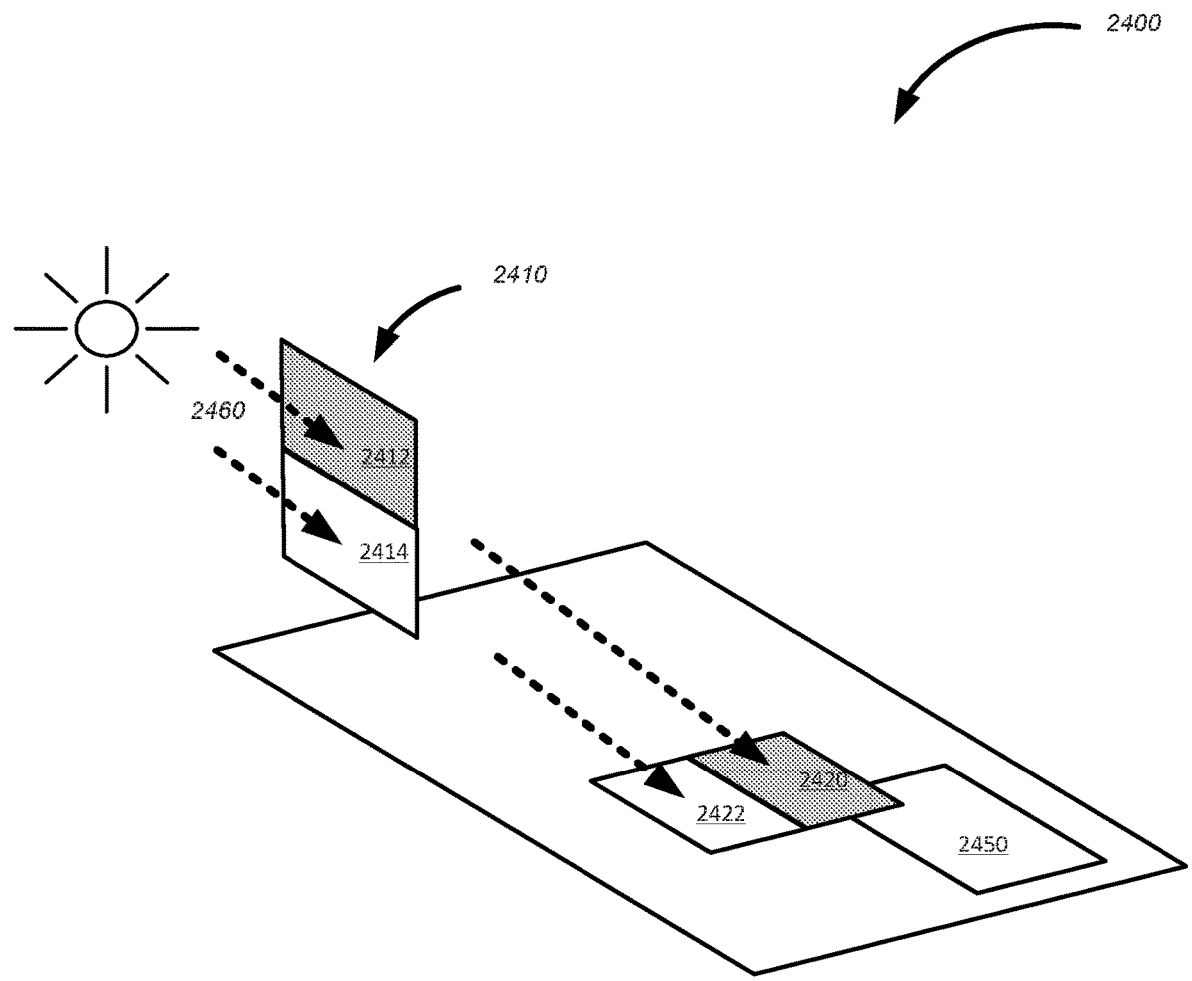
FIG. 24B is a schematic drawing of a view of the room in FIG. 24A with light projections through the tinting zones, according to an embodiment.
Figure 24C:
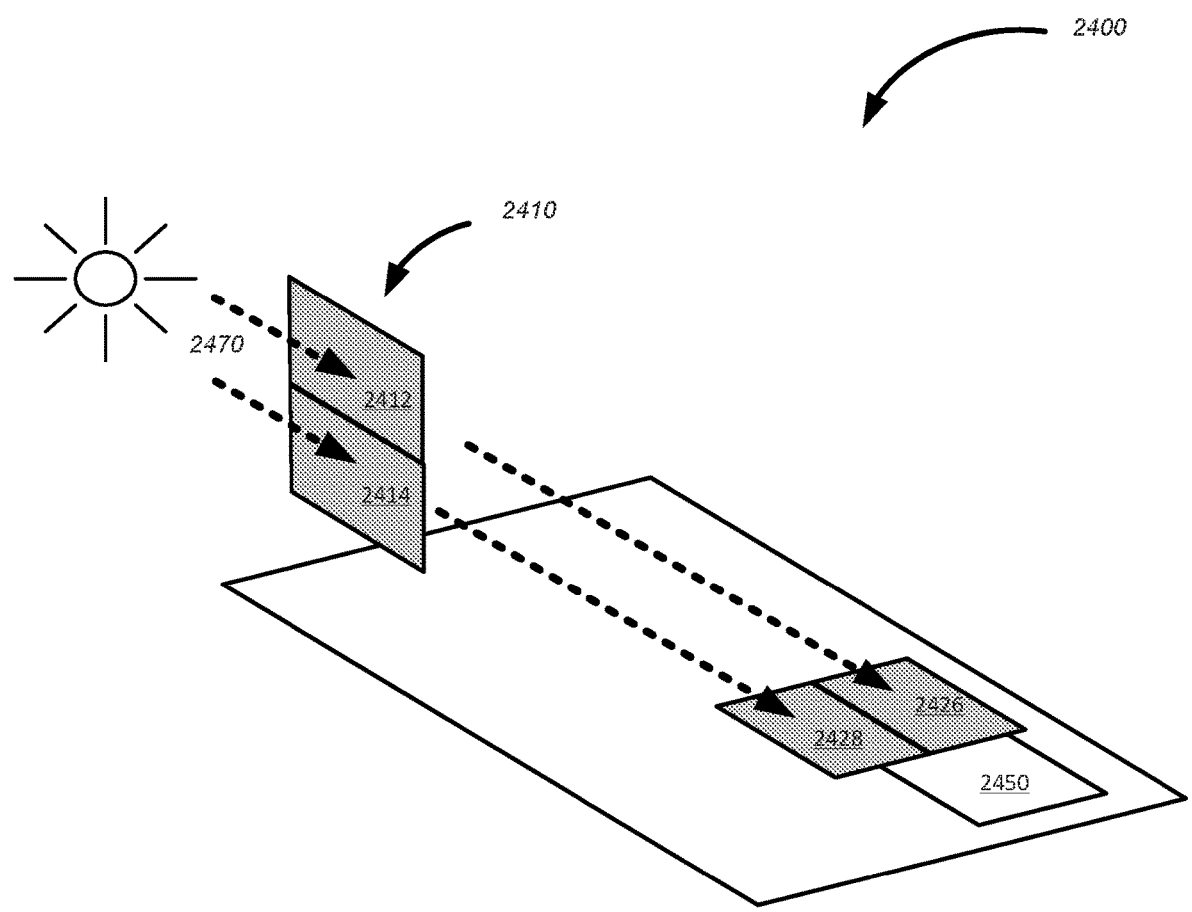
FIG. 24C is a schematic drawing of a view of the room in FIG. 24A with light projections through the tinting zones, according to an embodiment.

FIGS. 24A, 24B, and 24C are schematic drawings, each having a perspective view of a room (vertical walls not shown) 2400 having a multi-zone window 2410 with a first tinting zone 2412 and a second tinting zone 2414 in a vertical wall between the outside of a building and the inside of the room 2400, according to an embodiment. FIGS. 24A, 24B, and 28C illustrate respectively three different sunlight scenarios where sunlight is shining through the multi-zone window 2410 in three different directions 2450, 2460, 2470 (depicted as dotted arrows) associated with different positions of the sun. In the illustrated example, the room 2400 has an occupancy region 2450 that is a position or likely position of an occupant. The occupancy region 2450 may be, for example, a desk or another workspace. In this example, the occupancy region 2450 is defined as a two dimensional area on the floor of the room 2400. In each of the illustrated examples shown in FIGS. 24A, 24B, and 28C, sunlight (depicted as directional arrows) is impinging the first tinting zone 2412 and the second tinting zone 2414 of the multi-zone window 2410.

According to one aspect, control logic determines the projection of light through each of the two tinting zones 2412, 2414 and through the room 2400 based on the position of the sun. The control logic determines two-dimensional light projections at the intersection of the light through each two tinting zones 2412, 2414 with a plane including the two-dimensional occupancy region 2450, which is coplanar to the surface of the floor of the room 2400. In FIG. 24A, a first two-dimensional light projection 2416 is depicted through the first tinting zone 2412 and a second two-dimensional light projection 2418 is depicted through the second tinting zone 2414 on the floor of the room 2400. In FIG. 24B, a first two-dimensional light projection 2416 is depicted through the first tinting zone 2412 and a second two-dimensional light projection 2420 is depicted through the second tinting zone 2414 on the floor of the room 2400. In FIG. 24C, a first two-dimensional light projection 2426 is depicted through the first tinting zone 2412 and a second two-dimensional light projection 2428 is depicted through the second tinting zone 2414 on the floor of the room 2400. The control logic then determines whether a two-dimensional light projection from a tinting zone intersects the occupancy region. If a two-dimensional light projection intersects the occupancy region, the control logic places (holds or transitions to) the corresponding tinting zone in a darkened tint state. Although two tinting zones are shown, it would be understood that additional zones and/or different locations of tinting zones would apply using a similar method.

In the first scenario shown in FIG. 24A, for example, neither of the two-dimensional light projections 2416, 2416 through the tinting zones 2412, 2414 intersects the occupancy region 2450. In this case, the tinting zones 2412, 2414 are placed in a clear state.

In the second scenario shown in FIG. 24B, the first two-dimensional light projection 2420 intersects the occupancy region 2450 and the second two-dimensional light projection 2422 does not intersect the occupancy region 2450. In this scenario, the first tinting zone 2412 is placed in a darkened tint state to avoid a glare scenario. Since the second two-dimensional light projection 2422 does not intersect the occupancy region 2450, the second tinting zone 2414 is placed in a clear state.

In the third scenario shown in FIG. 24C, both the first two-dimensional light projection 2426 and the second two-dimensional light projection 2428 intersect the occupancy region 2450. In this scenario, the first tinting zone 2412 and the second tinting zone 2414 are placed in a darkened tint state to avoid a glare scenario on the occupancy region 2450.

Although the illustrated example in FIGS. 24A, 24B, and 24C includes a multi-zone tintable window, a similar technique would also apply to separate and adjacent tintable windows. For example, a room may have two separate and adjacent tintable windows in a vertical wall between the outside of a building and the inside of the room. Using control logic, a three-dimensional projection of light from each tintable window is directed through the room based on the position of the sun. The control logic determines a two-dimensional light projection through each window at the plane of the occupancy region. The control logic then determines whether a two-dimensional light projection from each window intersects the occupancy region. If the two-dimensional light projection intersects the occupancy region, the control logic places (holds or transitions to) the corresponding window in a darkened tint state.

G. Control Logic for Controlling Glare, Ambient Light Level and Color, and/or Contrast Ratio Certain embodiments pertain to control logic that adjusts artificial lighting and/or tint of the tintable window(s) to provide a relatively constant light level and ambient spectral content in an occupancy region. Typically, the control logic adjusts artificial lighting and/or tint of the tintable window(s) so that the combined light impinging the surfaces of objects in the occupancy region is similar to a natural light spectrum so that the illuminated objects reflect their true color. Although typically set to a natural light spectrum, alternatively the ambient spectral content can be customized for the current occupant(s) to provide, e.g., calming light, light therapy to adjust circadian rhythm or provide restorative healing, etc. By adjusting tint states of the tintable window(s), the control logic can control the direct sunlight (glare) passing through the tintable window(s) and color (e.g., blue light) imparted by light projections through the window(s). By adjusting the artificial lighting, the control logic can offset the effects of glare and adjust the ambient color. The combined control of the tint states and artificial lighting can provide a relatively constant ambient light level and spectral content at the desired levels in the occupancy region.

In one aspect, the control logic can control a tunable artificial lighting to tune the color (wavelength range) of the illumination, the level of illuminance, and/or the direction of illumination. These adjustments can be selected to increase occupant comfort by reducing glare and improving the ambient spectral content and/or diminish the contrast ratio in an occupancy region. For example, the control logic can control the wavelength and lumen/lux settings of the tunable artificial lighting to offset the contrast ratio in the occupancy region. An example of tunable indoor artificial lighting is the BLT series tunable white LED sold by Lithonia Lighting®, which can be dimmed to different lux levels varying between 0-1000 lux (100%) and color tuned between 2700 and 6500 Kevin. In addition or alternatively, the tunable artificial lighting may have multiple light sources at different locations and/or have a light source that can be moved to change the direction of light. The control logic can control the various light sources of the artificial lighting to illuminate certain areas. For example, indoor artificial lighting that can be adjusted to direct light to an occupancy region with an occupant affected by external glare through a tinted window. The reflected light is a combination of light reflected from the artificial light and the light projection to generate a more uniform intensity and color in the occupancy region. This can reduce the glare perceived by the occupant, which can increase occupant comfort and productivity.

As used herein, a "negative setting" refers to a setting of a tunable artificial light source that provides illumination in a wavelength range that offsets the color from light passing through a tinted window. For example, if a tintable window in its darkest state imparts a blue color to light passing through the window, the offset color of the negative setting would be a red light or a combination of red and yellow light. In this example, the tunable artificial light source in the negative setting would provide illumination in red light or red and yellow light. In one aspect, control logic activates a negative setting on a tunable indoor artificial lighting to direct light to an occupancy region that has a light projection through a tinted window to offset the effects of glare and color from the light projection.

Diminishing sharp contrasts at interfaces between portions of a surface illuminated by different illumination sources of different intensities can improve visual comfort to an occupant. In certain implementations, the control logic adjusts functions of the building systems based on a current contrast ratio in an area determined from feedback from the building systems. For example, the contrast ratio in an area such an occupancy region or other surrounding region can be determined based on the current illuminance and/or color of light in the area. The current illuminance and color can be determined by one or more of: measurements from one or more sensors in a building (e.g., camera, thermal sensors, etc.), current setting and location of artificial lighting, etc. An example of a device with sensors that can measure illuminance and color of ambient light is a spectrometer such as, for example, the commercially-available C-7000 spectromaster made by Sekonic®. The control logic adjusts the functions of the building systems to adjust the contrast ratio(s) in the area to acceptable levels. For example, the building systems may be adjusted so that the contrast ratio is below within an acceptable range or below a maximum limit. As another example, the building systems may be adjusted so that the contrast ratio is maintained within acceptable levels based on a lookup table of illuminance and color of artificial lighting that can be used to offset reflected light from light projections through electrochromic windows having different tint levels.

Figure 25:
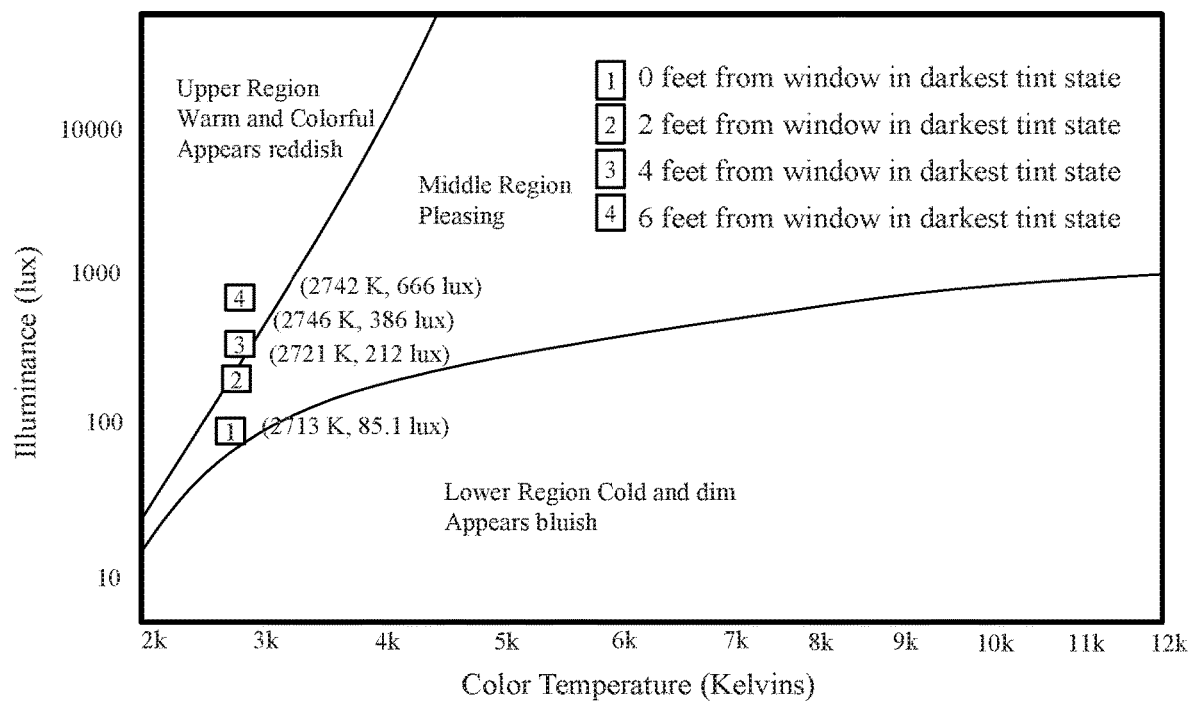
FIG. 25 is a graph of measured illuminance vs. measured color temperature, according to an implementation.

FIG. 25 is a graph of measured illuminance (lux) vs. measured color temperature (Kelvins), according to an implementation. The graph shows three different regions: an upper region described as warm and colorful, appearing reddish, a middle region described as pleasing and a lower region described as cold and dim, appearing bluish. The graph includes the four points of measurements of illuminance and color temperature taken at four distances, 0 feet, 2 feet, 4 feet, and 6 feet, from a window in the darkest tint state at 12:30 pm when the artificial lighting is on at full illumination level and set at 2700 Kelvins. If the artificial lighting were turned off, the illuminance and color temperature would likely lie in the lower region. As shown, the measurements with the artificial lighting turned on offset the blue light bringing the measured illuminance and color temperature into the middle and upper regions. An example of a lookup table includes internal artificial light settings (color temperature in Kelvins and light level in lux) that will maintain a contrast ratio within acceptable levels in occupancy regions at different distances from the tinted window for different tint states at a particular time of day. In one aspect, control logic can use such a lookup table to determine settings for an internal artificial light that will maintain the contrast ratio within an acceptable level.

In certain implementations, control logic makes adjustments to settings of artificial lighting and to tint states of tintable window(s) based on feedback received from the building systems in order to provide a light level and ambient spectral content in the occupancy region that is specifically designed for the occupant or more generally to the workplace. The feedback can include, for example, current tint state of the tintable windows, data regarding the presence or likely presence of an occupant in the occupancy region or workplace, measured level of illuminance and color of ambient light, data about the occupant such as age, gender, and circadian rhythm, information about the occupancy region or workplace, etc. This feedback information can come from readings or determinations regarding data taken by the building systems or can be from scheduling information based on historical data. The control logic can adjust the artificial lighting and tints to generate particular spectral content and light level customized for the occupant or a use setting (e.g., living, general, commercial) for the workplace. More details regarding this control logic will be described in the next section.

In one aspect, a method similar to the one described with reference to FIG. 22 can be used to implement logic for controlling the contrast ratio in an occupancy region of a room having one or more tintable windows. In this method, the control logic uses one or more of Modules A, B, and C to calculate tint levels for one or more tintable window(s) in a room at a time in the future. In one case, the future time used in the calculations may be a time sufficiently far into the future to allow transition of the windows to be complete after receiving control signals with tint instructions. Module A, B, and C output tint levels for the one or more tintable window(s) at a future time, sensor readings (interior and/or exterior), window configuration including orientation, time of day, day of year, optionally weather conditions, and other data used by the modules. The predictive control logic determines the acceptable contrast ratio at the future time. The control logic then determines adjustments to the interior lighting and/or tint states of the tintable windows to obtain a contrast ratio below or at the acceptable level in the room. For example, the control logic may determine the types of lights to activate, color or colors or light to activate, the intensity level settings of the activated lights, location of the lights activated, number and arrangement of lights to activate, etc. Once the adjustments are determined, the control logic sends control signals for adjusting the artificial interior lighting in the room and/or tint state of the tintable windows and then the method iterates back to Modules A, B, and C.

H. Control Logic for Occupant-Designed Scenes

Certain embodiments pertain to control logic that maintains a scene of environmental factors designed to provide occupant satisfaction and comfort levels in the workplace such as visual comfort, thermal comfort, acoustic comfort, and air quality. The control logic maintains the environmental factors by making adjustments to the settings of the building systems. The control logic designs the environmental factors based on various feedback received from, for example, the building systems, the occupant, the building management system, etc. Some examples of feedback that can be used include current tint state of the tintable windows, data regarding the presence or likely presence of an occupant, measured level of illuminance and color of ambient light, data about the occupant such as age, gender, and circadian rhythm, noise data, ambient temperature data, air quality data, data regarding available building systems, etc. With the feedback, the control logic determines occupancy which includes the presence and location of an occupant or occupants in a workplace. The control logic determines occupancy based on information such as scheduling information, sensor measurements, input from the occupant, or data from a mapping system. An example of such a mapping system includes transmitters and receivers for communicating radio frequency, microwave, or other electromagnetic waves. The received transmissions can be used to map the current location of occupants and other objects in the workplace. The control logic also develops a use case for each occupant and/or workplace to determine the parameters used to determine the scene such as the type of occupant, type of workplace, temporal composition of the ambient environment (illuminance level, ambient light color, noise level, air quality, etc.), duration of stay, building considerations such as energy and cost, and the existing building systems available to change the ambient environment. Based on the use case, the control logic designs a scene including all of the environmental factors, or some portion of the environmental factors, depending on which technologies or controls are in place at the workplace. Environmental factors can be grouped into categories such as, e.g., thermal settings, visual settings, acoustic settings, and air quality settings. Duration of stay in the workplace is a consideration for some environmental factors such as noise and air quality. For each occupant and/or workplace, the control logic determines the environmental factors that will be used in the scene and determines the target levels of the environmental factors in question. These levels are designed to meet occupant needs or expectations by determining levels that are designed for the use case. The control logic then determines any new control settings for the building systems and communicates the new settings to the building systems, e.g., via a BMC or BAC.

In one aspect, the scenes for particular use cases are initialized using data from industry best practices and then revised based on the feedback from an occupant(s), the building management system, and/or industry. The control logic revises or updates the scenes based on the new environmental factors. For example, the control logic may receive feedback from the building with unexpected settings that provide non-intuitive "delight" that better match or exceed the occupant(s) expectations for the workplace setting.

In another aspect, the control logic may initialize a scene for a particular use case based on input from the current occupant such as based on a series of queries at a user interface to the occupant.

In one aspect, the scenes for particular use cases are revised based on the feedback from the occupant, building systems, building management system, industry, and any other suitable sources of feedback. For example, the control logic may receive overrides or positive or negative feedback from the occupant regarding environmental factors for a particular scene. The control logic may determine new levels for the environmental factors of a scene based on the feedback.

Figure 26:
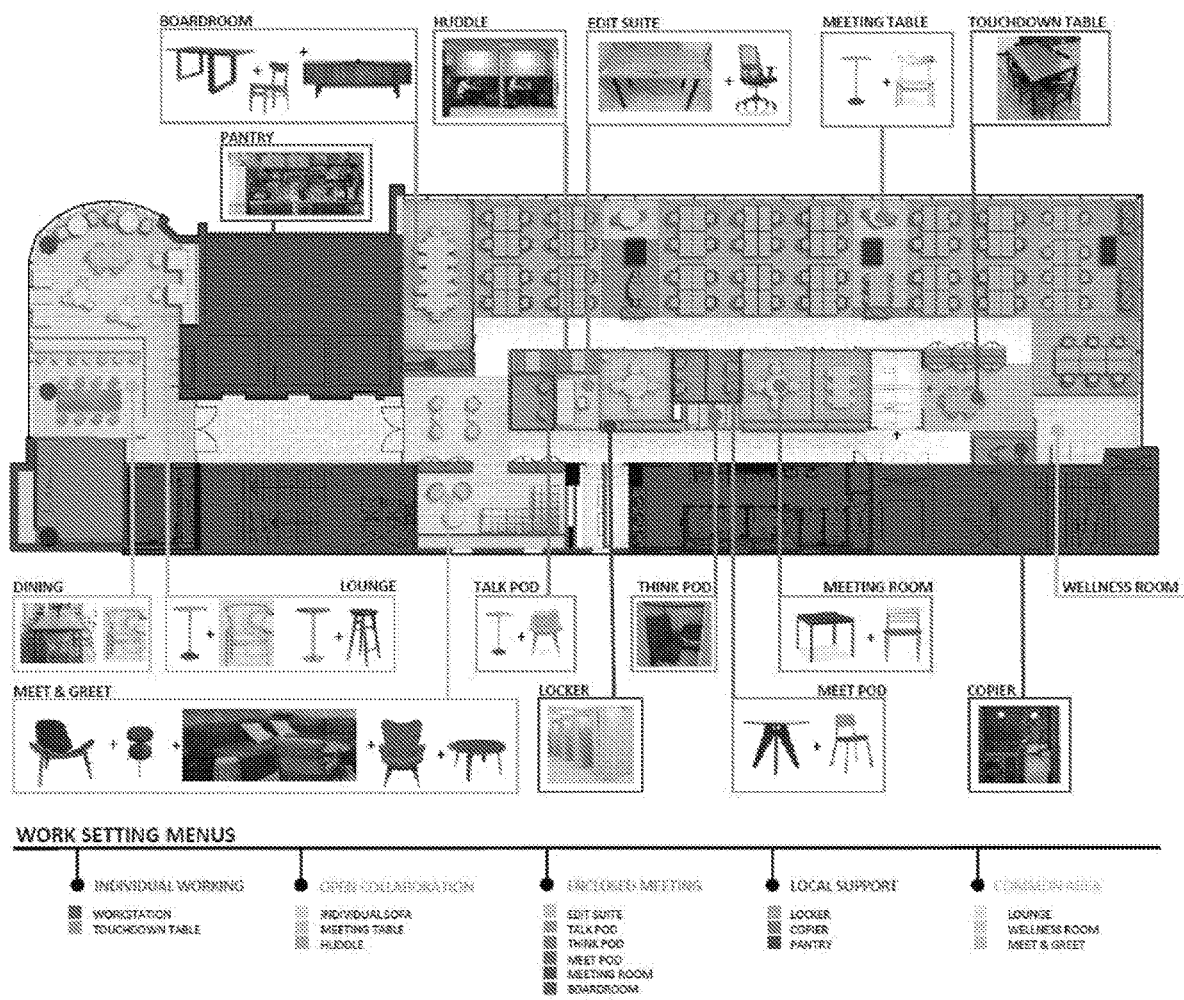
FIG. 26 is a schematic illustration of a building showing various types of workplaces, according to an implementation.

Some examples of types of workplaces include private office, haven, nook, focused thinking, think pod, huddle space, open office, hive, jump space, landing, meeting or conference room, creative thinking space, lobby, plaza, cantina, and office commons. FIG. 26 is a schematic illustration of a building showing various types of workplaces, according to an implementation. In the illustrated example, the workplaces are grouped into "individual working workplaces" including workstation and touchdown table, "open collaboration workplaces" including individual sofa, meeting table and huddle, "enclosed meeting workplaces" including edit suite, talk pod, think pod, meet pod, meeting room, and boardroom, "local support workplaces" including locker, copier, and pantry, and "common area workplaces" including lounge, wellness room and meet and greet.

The control logic determines the use case, in part, based on the type of workplace. For example, a private office is typically used for focused tasks or creative activities. As a result, a private office requires scenes with environmental settings of warm temperatures and warm color ambient light. Beyond designing the scene for maximum performance, the scene is also designed to match the occupant's expectation for a thoughtful workplace. For example, a cantina requires a scene with a level of light (illuminance) and background noise that are energizing and encourage communication and socializations. In this example, the expectation of the occupant for the scene in a cantina would be for brighter, louder, and cooler.

A private office generally refers to an area for focused work or recharge without distraction. A private office can be, for example, an enclosed room, semi-sheltered, or screened-in space in an open plan. An example of environmental factors for a scene designed for visual comfort in a private office includes light level of 500-700 lux (Low) and color temperature of 4000K (warm). Another example of environmental factors for a scene designed for visual comfort in a private office includes light level of 1000-2000 lux (High) and color temperature of 6000K (Cold). An example of an environmental factor for a scene designed for thermal comfort in a private office includes a temperature of 25° C. (Warm). An example of environmental factors designed for acoustic comfort in a private office includes sound level of 45 dB and privacy index of 75%. Another example of environmental factors for a scene designed for acoustic comfort in a private office includes sound level of 35 dB and privacy index of 95%. An example of an environmental factor for a scene designed for air quality in a private office includes a $CO_2$ level of 500 ppm.

Similar to a private office, a think pod or huddle space also refers to an area for focused work or recharge without distraction. The think pod or huddle space is designed with less privacy for an occupant than a private office. The think pod or huddle space can also be an enclosed room, semi-sheltered, or screened-in space in an open plan. An example of environmental factors for a scene designed for visual comfort in a think pod or huddle space includes light level of 1000-2000 lux (High) and color temperature of 6000K (Cold). An example of environmental factors for a scene designed for thermal comfort in a think pod or huddle space includes a light level of 22-25° C. (Medium). An example of environmental factors for a scene designed for acoustic comfort in a think pod or huddle space includes sound level of 55-75 dB and privacy index of 55%. An example of environmental factors for a scene designed for air quality control in a think pod or huddle space includes a $CO_2$ level of 500 ppm.

A jump space or landing generally refers to an area for waiting/gathering adjacent to a meeting space and/or a private office. The jump space or landing is designed for short stays with visibility and semi-private communication. An example of environmental factors for a scene designed for visual comfort in a jump space or landing includes light level of 500-1500 lux (High) and color temperature of 4500-6000K (Cool). An example of an environmental factor for a scene designed for thermal comfort in a jump space or landing includes a light level of 22-25° C. (Medium). An example of environmental factors for a scene designed for acoustic comfort in a jump space or landing includes sound level of 55 dB and privacy index of 50-75%. An example of environmental factors for a scene designed for air quality control in a in a jump space or landing includes a $CO_2$ level of 1500 ppm.

A meeting or conference room generally refers to an area for sharing and discussion that requires appropriate light, and high signal to noise ratio. An example of environmental factors for a scene designed for visual comfort in a meeting or conference room includes light level of 500-1500 lux (High) and color temperature of 3500-4500K (Medium). An example of an environmental factor for a scene designed for thermal comfort in a meeting or conference room is a light level of 20-23° C. (Medium). An example of environmental factors for a scene designed for acoustic comfort in a meeting or conference room include sound level of 44-55 dB and privacy index of 80-95%. An example of an environmental factor for a scene designed for air quality control in a meeting or conference room includes a $CO_2$ level of 1000 ppm.

A common office, lobby, or social generally refers to a dynamic, social setting at major traffic intersections of the building where mixing and connecting are prioritized over privacy or work output. An example of environmental factors for a scene designed for visual comfort in a common office, lobby, or social includes light level of 500-1500 lux (High) and color temperature of 4000-6000K (Medium). An example of an environmental factor for a scene designed for thermal comfort in a common office, lobby, or social is a light level of 22-25° C. (Medium). An example of environmental factors for a scene designed for acoustic comfort in a common office, lobby, or social includes sound level of 55-70 dB and privacy index of 25%. An example of an environmental factor for a scene designed for air quality control in a common office, lobby, or social is a $CO_2$ level of 1500-3000 ppm.

Figure 27:
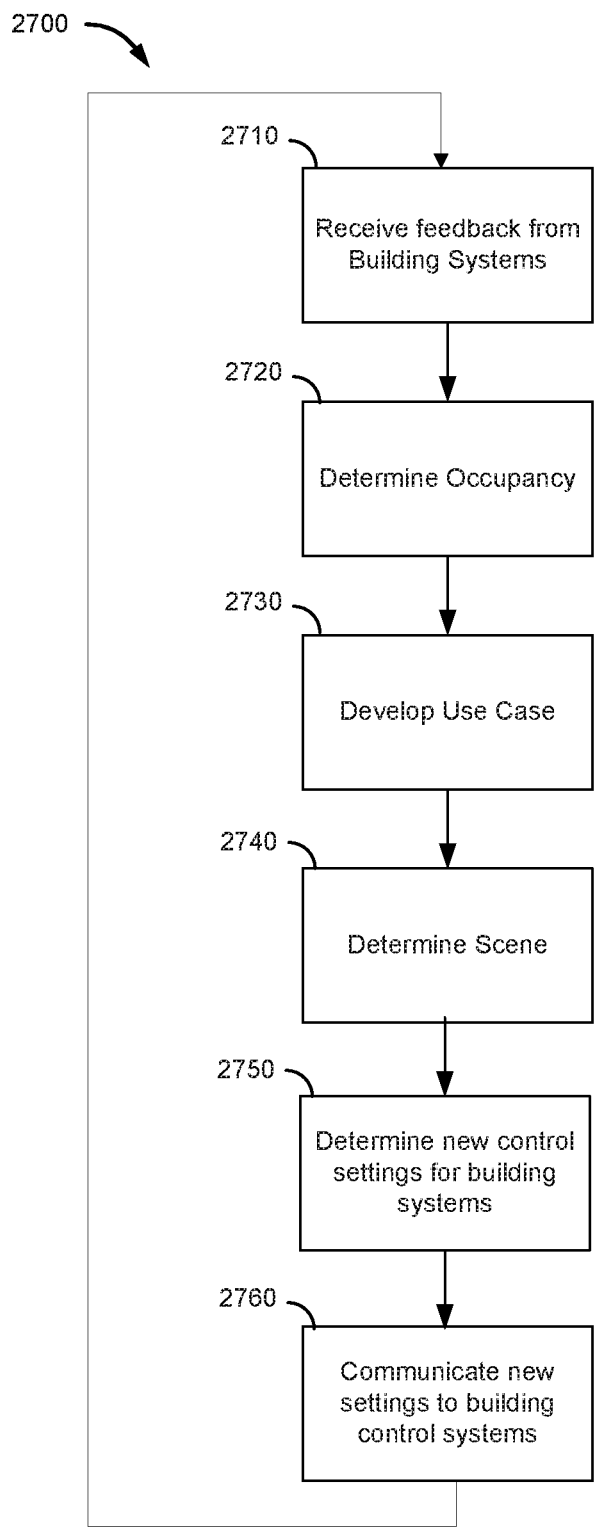
FIG. 27 is a flowchart depicting control logic for a method that designs and maintains a scene of environmental levels that provide occupant satisfaction and comfort levels in the workplace, according to an implementation.

FIG. 27 is a flowchart 2700 depicting control logic for a method that designs and maintains a scene of environmental factors that provide occupant satisfaction and various comfort levels in a workplace such as, e.g., visual comfort, thermal comfort, acoustic comfort, and air quality. The control logic may be performed by one or more controllers. The workplace may be a room or an area in a room in a building. At operation 2710, the control logic receives feedback from the occupant, assets within the building, or the building systems such as, e.g., window controller(s) for controlling tint states for one or more tintable windows in the workplace, an HVAC system, a lighting system for controlling the artificial lighting (interior and/or exterior), a security system, one or more sensors, a mapping system, noise and sound control system, etc. For example, feedback can be received from an asset accompanying the occupant such as a smartphone or other smart device. As another example, the occupant may enter feedback to the control logic via a smart device, a manual control panel (e.g., device shown in FIG. 23), or other device. Some examples of feedback that can be used by the control logic include current tint state(s) of the one or more tintable windows in the workplace, data regarding the presence or likely presence of an occupant or occupants in the workplace, a measurement of illuminance and color of ambient light or other sensor readings, occupant(s) data, ambient temperature data, air quality data, noise or other acoustic data, information about the available building systems, etc. In one aspect, the tint state of the one or more tintable windows may be determined predictive control logic of one or more modules such as described with reference to FIG. 22. Some examples of occupant data include age, gender, profession, circadian rhythm, activity, vital signs, etc. In one aspect, the control logic determines the circadian rhythm of the occupant using the vital signs. Some examples of building systems are described in detail with reference to FIG. 16 and FIG. 18. Some examples of window controllers are described in detail with reference to FIG. 15, FIG. 19, and FIG. 20. Feedback from building systems is generally received via a communication network.

Based on feedback received at operation 2710, the control logic determines occupancy including the presence and location of an occupant or occupants in the workplace (2720). The control logic may determine occupancy based on information such as current time, scheduling data, sensor data, input from the occupant, data in a signal from an asset with the occupant, and data from a mapping system. In one aspect, a mapping system of transmitters and receivers of radio frequency, microwave, or other electromagnetic waves in a building can be used to map the current location of occupants and other objects present in the workplace. An example of such a mapping system based on window antennas is described in U.S. patent application Ser. No. 15/709,339, filed on Sep. 19, 2017, titled "WINDOW ANTENNAS FOR EMITTING RADIO FREQUENCY SIGNALS," which is hereby incorporated by reference in its entirety. In another aspect, the control logic may determine there is a high probability that an occupant is in the workplace based on scheduling data and the current time. In another aspect, an asset (e.g., cellphone) with a particular occupant has a transmitter that sends radio frequency signals that are received at a receiver in the building. Based on the signal received, the building management system or other controller determines the presence and location of the occupant and conveys a signal with this information to the controller(s) implementing the control logic.

At operation 2730, the control logic develops a use case for the particular occupant and/or workplace. The use case includes one or more of the type of occupancy in the workplace, the type of activity in the workplace, the type of workplace, the temporal composition of the ambient environment, the duration of stay for the occupant(s), any building considerations such as energy conservation, the types and availability of control of building systems or other technologies available to change environmental factors. The type of occupancy includes information such as age, gender, profession, circadian rhythm, and vital signs of the one or more occupants. The type of activity may be, for example, working, painting, drawing, meeting, dining, private thinking, sleeping, resting, lounging, waiting, gathering, etc. Temporal composition of the ambient environment includes parameters such as illuminance and color of ambient light, contrast ratios, noise, temperature, humidity, and air quality.

At operation 2740, the control logic determines, for the use case, a scene of environmental factors designed for increasing occupant satisfaction and comfort (e.g., visual, thermal, acoustic, and/or air quality) in the workplace. In one aspect, building considerations are also taken into account in addition to occupant satisfaction and comfort. The control logic determines which environmental factors to be included in the scene based, at least in part, on the types and controls of building systems or other technologies that are available for use to change the ambient environment. In one aspect, the control logic also considers duration of stay when determining whether to include noise and air quality factors. For example, if the duration of stay is less than 5 minutes, the control logic may not include noise and air quality environmental factors. For each environmental factor in the scene, the control logic determines a target setting or level. Environmental factors are grouped into categories including, e.g., thermal settings, visual settings, acoustic settings, and air quality settings. Examples of thermal settings include target levels for temperature, air flow, and humidity. Some examples of visual settings include target levels for illuminance and color of ambient light, contrast ratio, and glare. For example, the target level of the contrast ratio could be to remain below a maximum acceptable contrast or a value within an acceptable range. The acoustic settings include a sound or noise level and a privacy index which is a factor of the walls and open spaces in the room. The privacy index reflects the ability to have confidentiality of conversations in the workspace. Some examples of air quality settings include the levels of, for example, $CO_2$ and/or one or more pollutants such as CO, $O_3$, $NO_2$, $SO_2$, $PM_{10}$, $PM_{2.5}$, and Lead. Some examples of scenes including target environmental factors for light (illuminance) level, color temperature, sound level, privacy index, and air quality for a various types of workspaces are provided above.

The control logic determines the scene of environmental factors for the particular use case by matching all or most of the parameters of the use case with a use case associated with a scene stored in a database. If the database does not have a matching scene, the control logic initializes the environmental factors for the scene. In one example, the control logic initializing environmental factors for a scene for a particular use case using data from industry best practices. In another example, the control logic initializes the scene using data from the occupant, for example, by querying the occupant for preferred environmental settings. In another example, the control logic initializes the scene using data from an occupant with a similar set of parameters in the use case. In one implementation, after the control logic determines the first scene of environmental factors for the particular use case, the control logic further revised the environmental factors to generate a second scene based on additional feedback from the building with unexpected settings that provide non-intuitive "delight" that better match or exceed the occupant(s) expectations for the workplace setting. The scenes determined at operation 2740 are saved to the database.

In one aspect, the scenes for particular use cases are revised based on the feedback from the occupant, building systems, building management system, industry, and any other suitable sources of feedback. For example, the control logic may receive overrides or positive or negative feedback from the occupant regarding environmental levels for a particular scene. The control logic may determine new levels for the environmental factors of a scene based on the feedback.

At operation 2750, the control logic determines the control settings for the various building systems that will generate the targeted environmental levels of the scene designed for the occupant(s) or workplace in operation 2740. For example, the control logic may use lookup tables, to determine the appropriate control settings that will generate the targeted environmental factors.

At operation 2760, the control logic communicates the control settings to controllers of the various building systems building systems or to a building management system or building administration system. The control logic then returns to operation 2710.

Although certain embodiments are described herein with respect to independently controlling multiple tinting zones of a multi-zone tintable window, it would be understood that similar techniques could apply to controlling multiple tintable windows (multi-zone or single-zone) of set of tintable windows. For example, a building could have an assembly of tintable windows on a facade of a building or in a room. The techniques described herein could be used to independently control the tintable windows of the assembly. That is, each tintable window may have one or more tinting zones and the techniques independently control the tinting zones of the tintable windows in the assembly.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A method of controlling color of light in a room having one or more tintable windows, the method comprising:
   determining a tint state for at least one of the one or more tintable windows using at least a clear sky irradiance value predicted to occur at a future time during clear sky conditions;
   calculating a current internal color rendering index (CRI) value in the room using an external CRI value and the tint state of the at least one of the tintable windows;
   using the current internal CRI value to determine one or more new settings for artificial interior lighting in the room, wherein the one or more new settings are determined to obtain a desired color of light in the room; and sending control signals over a communication network to adjust the artificial interior lighting to the one or more new settings.

2. The method of claim 1, wherein the one or more new settings are configured to provide a desired CRI value.

3. The method of claim 1, further comprising determining whether to use one or more external sensors or one or more internal sensors for use in determining the one or more new settings for the artificial interior lighting.

4. The method of claim 1, wherein the one or more new settings include one or more of
   (i) selecting color or colors,
   (ii) activating lights in one or more areas, and
   (iii) selecting one or more light intensity levels.

5. The method of claim 1, wherein each of the one or more tintable windows is an electrochromic window.

6. The method of claim 1, wherein adjusting the artificial interior lighting to the one or more new settings is configured to obtain a contrast ratio in an occupancy region that is within an acceptable range or below a maximum contrast ratio.

7. The method of claim 1, wherein the one or more new settings are configured to generate illumination from the artificial interior lighting with a first wavelength range complementary to a second wavelength range of light transmitted through at least one of the tintable windows in the tint state.

8. The method of claim 1, wherein the one or more new settings for the artificial interior lighting are configured to generate illumination that in combination with light transmitted through at least one of the tintable windows in the tint state generates the desired color of light in the room.

9. The method of claim 1, wherein the desired color of light in the room includes (i) wavelengths of red light, blue light, and green light or (ii) a spectral content of natural light.

10. The method of claim 1, further comprising:
    determining a new tint state for the one or more tintable windows; and
    sending control signals over the communication network to adjust the one or more tintable windows to the new tint state;
    wherein adjustments of the artificial interior lighting to the one or more new settings and the one or more tintable windows to the new tint state generate a combined illumination impinging a surface in an occupancy region, the combined illumination having (i) a spectral content of red light, blue light, and green light or (ii) of natural light.

11. The method of claim 2, further comprising:
    calculating the external CRI value using (i) measurements taken by one or more external sensors or (ii) the predicted clear sky irradiance value;
    wherein the one or more new settings are configured to change the current internal CRI value to the desired CRI value.

12. The method of claim 2, wherein the one or more new settings are determined using a current internal CRI value in the room and the current internal CRI value is determined using weather feed data.

13. The method of claim 2, wherein the one or more new settings are determined using a current internal CRI value in the room and the current internal CRI value is determined using measurements taken by one or more internal sensors.

14. The method of claim 2, wherein the desired CRI value is determined using historical data from user input.

15. The method of claim 2, wherein the desired CRI value is determined from user input received at a wall unit or a remote control.

16. The method of claim 2, further comprising:
    calculating an external CRI value using the predicted clear sky irradiance value; and
    transforming the external CRI value to a current internal CRI value using the current tint state of the at least one of the one or more tintable windows, wherein the one or more new settings are determined to change the current internal CRI value to the desired CRI value.

17. The method of claim 2, further comprising:
    determining a new tint state for the one or more tintable windows using the desired CRI value; and
    providing instructions over the communication network to transition tint of the one or more tintable windows to the new tint state.

18. The method of claim 11, wherein the one or more external sensors are part of a multi-sensor device mounted to a roof of a building comprising the room or on a facade of the building, including the one or more tintable windows.

19. The method of claim 11, further comprising determining the predicted clear sky irradiance value using at least a calculated sun position and a window configuration.

20. The method of claim 13, wherein the one or more internal sensors are located in an activity area of an occupant in the room during operation or at or near the artificial interior lighting.

21. At least one controller for controlling color of light in a room having one or more tintable windows, the at least one controller comprising:
    a computer readable medium having control logic; and
    circuitry in communication with the computer readable medium and with the one or more tintable windows,
    wherein the control logic is configured to:
        determine, or direct determination of, a tint state for at least one of the one or more tintable windows using at least a clear sky irradiance value predicted to occur at a future time during clear sky conditions;
        calculate, or direct calculation of, a current internal color rendering index (CRI) value in the room using an external CRI value and the tint state of the at least one of the tintable windows;
        using the current internal CRI value to determine, or direct determination of, one or more new settings for artificial interior lighting in the room, wherein the one or more new settings are determined to obtain a desired color of light in the room; and
        send, or direct sending of, control signals to adjust the artificial interior lighting to the one or more new settings.

22. The method of claim 1, wherein the tint state for at least one of the one or more tintable windows is determined based at least in part on the predicted clear sky irradiance value and a measured irradiance from one or more sensor readings.

23. The at least one controller of claim 21, wherein the tint state for at least one of the one or more tintable windows is determined based at least in part on the predicted clear sky irradiance and a measured irradiance from one or more sensor readings.

24. The method of claim 22, further comprising calculating the predicted clear sky irradiance value predicted to occur at a future time.

25. The at least one controller of claim 23, further comprising calculating, or directing calculation of, the predicted clear sky irradiance predicted to occur at a future time.

* * * * *